US010906602B2

(12) United States Patent
Laberge et al.

(10) Patent No.: US 10,906,602 B2
(45) Date of Patent: Feb. 2, 2021

(54) FAMILY OF THREE-WHEELED STRADDLE-SEAT VEHICLES

(71) Applicant: BOMBARDIER RECREATIONAL PRODUCTS INC., Valcourt (CA)

(72) Inventors: Nicolas Laberge, Valcourt (CA); Emile Maltais-Larouche, Valcourt (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 176 days.

(21) Appl. No.: 16/073,638

(22) PCT Filed: Jan. 30, 2017

(86) PCT No.: PCT/IB2017/050494
§ 371 (c)(1),
(2) Date: Jul. 27, 2018

(87) PCT Pub. No.: WO2017/130174
PCT Pub. Date: Aug. 3, 2017

(65) Prior Publication Data
US 2019/0039668 A1  Feb. 7, 2019

Related U.S. Application Data

(60) Provisional application No. 62/289,156, filed on Jan. 29, 2016.

(51) Int. Cl.
*B62D 65/10* (2006.01)
*B62K 5/05* (2013.01)
(Continued)

(52) U.S. Cl.
CPC .............. *B62D 65/10* (2013.01); *B60K 5/02* (2013.01); *B62D 65/14* (2013.01); *B62D 65/16* (2013.01);
(Continued)

(58) Field of Classification Search
CPC ........ B62D 65/10; B62D 65/16; B62D 65/14; F01B 21/02; B62J 35/00; B62J 25/00;
(Continued)

(56) References Cited

U.S. PATENT DOCUMENTS 5,639,075 A * 6/1997 Tyree .................... B62K 11/04
267/140.12
5,836,412 A   11/1998 Lyles et al.
(Continued)

FOREIGN PATENT DOCUMENTS

EP   2348201 A1   7/2011
GB    145951 A    7/1920
(Continued)

OTHER PUBLICATIONS

William Harris "How Motorcycles Work" Nov. 18, 2005. HowStuffWorks.com. <https://auto.howstuffworks.com/motorcycle.htm (Year: 2005).*
(Continued)

Primary Examiner — Darlene P Condra
(74) Attorney, Agent, or Firm — BCF, LLP

(57) ABSTRACT

A method and system for assembling a vehicle of a family of vehicles includes providing a group of engines. A first engine including a first number of cylinders corresponds to a first vehicle. A second engine including a second number of cylinders corresponds to a second vehicle. The second number is greater than the first number which is at least one. A cylinder plane extends vertically and longitudinally. At least one cylinder is disposed at least partly forward of a front wheel plane. The transmission assembly is rearward of the selected engine and one of the transmission assembly and the selected engine is in a same location whether the selected engine is the first or the second. The seat is at least in part longitudinally rearward of the transmission assembly.

(Continued)

The selected engine is laterally disposed between the centers of the footrests.

20 Claims, 37 Drawing Sheets

(51) Int. Cl.
| | |
|---|---|
| *F02B 75/20* | (2006.01) |
| *F02B 73/00* | (2006.01) |
| *B60K 5/02* | (2006.01) |
| *F01B 21/02* | (2006.01) |
| *B62D 65/14* | (2006.01) |
| *B62D 65/16* | (2006.01) |
| *B62J 1/12* | (2006.01) |
| *B62J 25/00* | (2020.01) |
| *B62J 35/00* | (2006.01) |
| *B62K 5/027* | (2013.01) |
| *B62K 5/08* | (2006.01) |
| *B62M 9/08* | (2006.01) |
| *B62M 17/00* | (2006.01) |
| *B62K 25/24* | (2006.01) |
| *B62K 21/00* | (2006.01) |
| *B60K 15/063* | (2006.01) |
| *F02B 75/18* | (2006.01) |

(52) U.S. Cl.
CPC ............... *B62J 1/12* (2013.01); *B62J 25/00* (2013.01); *B62J 35/00* (2013.01); *B62K 5/027* (2013.01); *B62K 5/05* (2013.01); *B62K 5/08* (2013.01); *B62M 9/08* (2013.01); *F01B 21/02* (2013.01); *F02B 73/00* (2013.01); *F02B 75/20* (2013.01); *B60K 15/063* (2013.01); *B60Y 2200/122* (2013.01); *B60Y 2400/72* (2013.01); *B62K 21/005* (2013.01); *B62K 25/24* (2013.01); *B62M 17/00* (2013.01); *F02B 2075/1808* (2013.01); *F02B 2075/1812* (2013.01)

(58) Field of Classification Search
CPC .. B62J 1/12; B60Y 2200/122; B60Y 2400/72; F02B 2075/1812; F02B 2075/1808; F02B 73/00; F02B 75/20; B60K 15/063; B60K 5/02; B62K 21/005; B62K 25/24; B62K 5/08; B62K 5/027; B62K 5/05; B62M 17/00; B62M 9/08
See application file for complete search history.

(56) References Cited

U.S. PATENT DOCUMENTS

| | | | |
|---|---|---|---|
| 6,948,581 B2 | 9/2005 | Fecteau et al. | |
| 7,237,637 B2 | 7/2007 | Fecteau et al. | |
| 7,416,046 B2 | 8/2008 | Aube et al. | |
| 7,464,781 B2 | 12/2008 | Guay et al. | |
| 7,543,672 B2 | 6/2009 | Codere et al. | |
| 7,568,541 B2 | 8/2009 | Pfeil et al. | |
| 7,571,787 B2 | 8/2009 | Saiki | |
| 7,588,110 B2 | 9/2009 | Martino | |
| 7,610,979 B1 | 11/2009 | Dykowski et al. | |
| 7,665,742 B2 | 2/2010 | Haerr et al. | |
| 7,770,683 B2 | 8/2010 | Keogh et al. | |
| 7,806,215 B2 | 10/2010 | Codere et al. | |
| 7,845,452 B2 | 12/2010 | Bennett et al. | |
| 7,926,607 B2 | 4/2011 | Seiter | |
| 7,997,372 B2 | 8/2011 | Maltais | |
| 8,074,759 B2 | 12/2011 | Rasidescu et al. | |
| 8,086,382 B2 | 12/2011 | Dagenais et al. | |
| 8,091,446 B2 * | 1/2012 | Ennsmann | F16H 61/18 74/337.5 |
| 8,260,535 B2 | 9/2012 | Dagenais | |
| 8,438,942 B2 * | 5/2013 | Wilflinger | F16H 61/18 74/337.5 |
| 8,544,587 B2 | 10/2013 | Holroyd et al. | |
| 8,577,588 B2 | 11/2013 | Dagenais | |
| 8,655,565 B2 | 2/2014 | Dagenais et al. | |
| 8,695,746 B2 | 4/2014 | Holroyd et al. | |
| 9,004,214 B2 | 4/2015 | Holroyd et al. | |
| 9,020,744 B2 | 4/2015 | Dagenais | |
| 9,043,111 B2 | 5/2015 | Dagenais et al. | |
| 2003/0106733 A1 * | 6/2003 | Keller | B62K 11/04 180/228 |
| 2003/0221890 A1 | 12/2003 | Fecteau et al. | |
| 2005/0126842 A1 | 6/2005 | Rasidescu et al. | |
| 2005/0263334 A1 * | 12/2005 | Okabe | B62K 11/06 180/219 |
| 2006/0254842 A1 | 11/2006 | Dagenais et al. | |
| 2007/0251745 A1 | 11/2007 | Codere et al. | |
| 2007/0256882 A1 | 11/2007 | Bedard et al. | |
| 2008/0041650 A1 * | 2/2008 | Gilbert | B62K 11/04 180/226 |
| 2008/0257298 A1 * | 10/2008 | Inui | F02B 61/02 123/195 R |
| 2009/0007878 A1 | 1/2009 | Korenjak et al. | |
| 2009/0152940 A1 | 6/2009 | Mercier et al. | |
| 2009/0224497 A1 | 9/2009 | Seiter | |
| 2009/0321169 A1 | 12/2009 | Bedard et al. | |
| 2010/0263956 A1 | 10/2010 | Bedard et al. | |
| 2011/0168473 A1 | 7/2011 | Bedard et al. | |
| 2013/0186701 A1 | 7/2013 | Bedard et al. | |
| 2015/0122567 A1 | 5/2015 | Marois et al. | |
| 2015/0175209 A1 | 6/2015 | Holroyd et al. | |
| 2015/0274213 A1 | 10/2015 | Rudwal et al. | |

FOREIGN PATENT DOCUMENTS

| | | |
|---|---|---|
| GB | 2512435 A | 10/2014 |
| JP | S60157921 | 8/1985 |
| JP | S63223330 | 9/1988 |
| JP | H0265934 | 3/1990 |
| WO | 2015036983 A2 | 3/2015 |
| WO | 2015036984 A1 | 3/2015 |
| WO | 2015036985 A1 | 3/2015 |
| WO | 2015079425 A1 | 6/2015 |
| WO | 2015079426 A1 | 6/2015 |

OTHER PUBLICATIONS

International Search Report of PCT/IB2017/050494 dated Jun. 7, 2017; Shane Thomas.
English Abstract of JPS63223330; Retrieved on Nov. 15, 2019; Retrieved from www.worldwide.espacenet.com.
English Abstract of JPS60157921; Retrieved on Nov. 15, 2019; Retrieved from www.worldwide.espacenet.com.
English Abstract of JPH0265934; Retrieved on Nov. 15, 2019; Retrieved from www.worldwide.espacenet.com.
Supplementary European Search Report of 17743830.6; The Hague; dated Aug. 27, 2019; Booij, Nico.

* cited by examiner

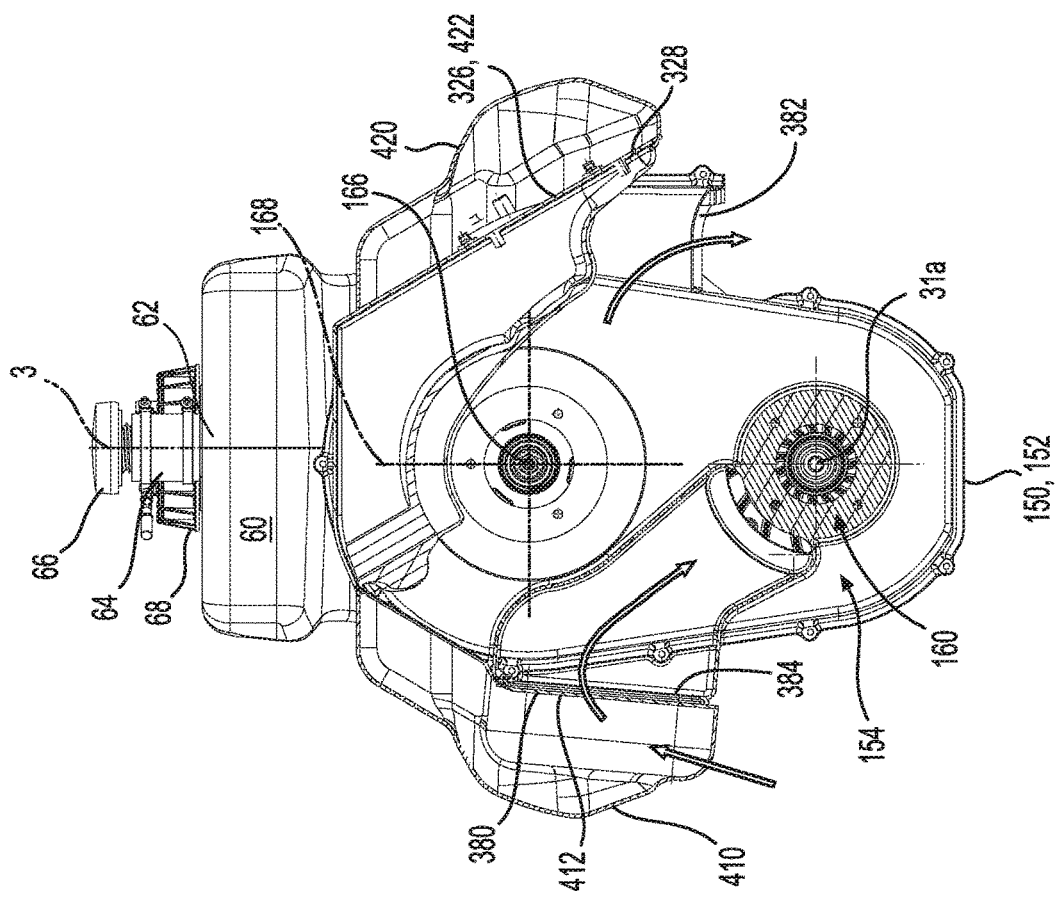
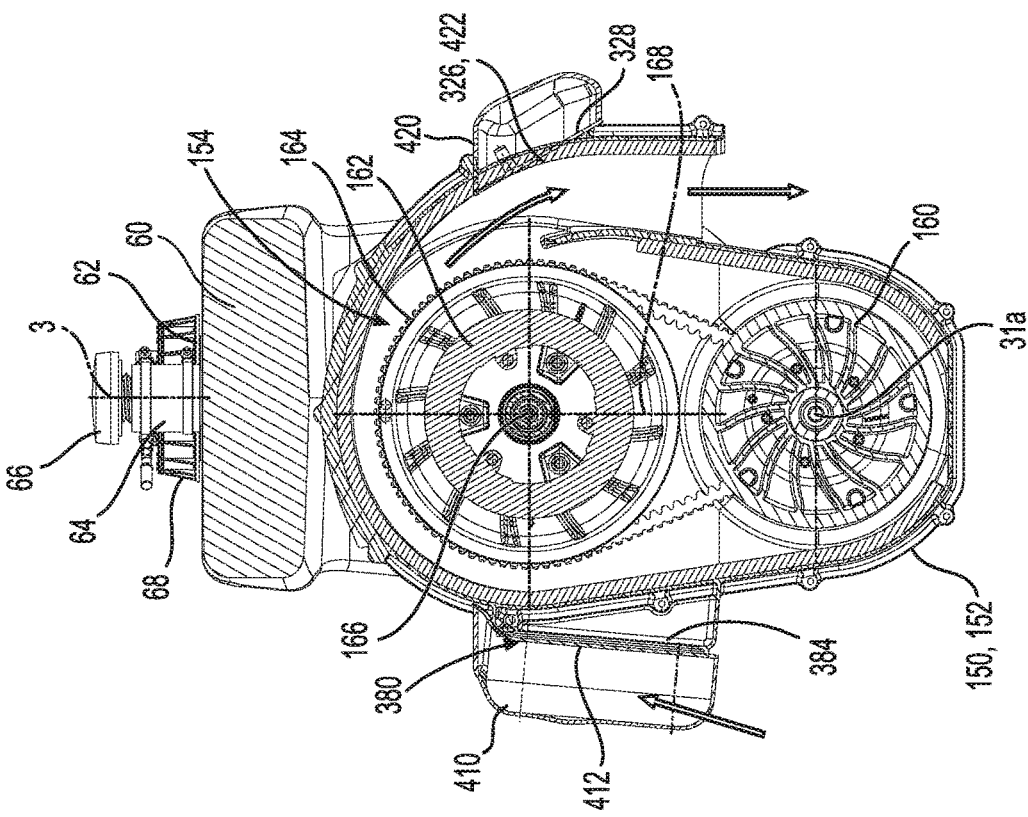

FAMILY OF THREE-WHEELED STRADDLE-SEAT VEHICLES

CROSS-REFERENCE

The present application claims priority to U.S. Provisional Patent Application No. 62/289,156 filed on Jan. 29, 2016, the entirety of which is incorporated herein by reference.

FIELD OF TECHNOLOGY

The present technology relates to three-wheeled straddle-seat vehicles.

BACKGROUND

Three-wheeled straddle-seat vehicles have been developed for use on roads. Three-wheeled straddle-seat vehicles have been developed as performance vehicles with a desire to overcome some of the deficiencies experienced in four wheeled automobiles and two wheeled motorcycles. For example, automobiles are inherently more stable than motorcycles due to the presence of four wheels, but motorcycles have greater maneuverability due to the smaller size and weight of motorcycles and are considered by some to provide a better driving performance when compared to automobiles. Three-wheeled straddle-seat vehicles are more stable than motorcycles while providing a similar driving experience. Three-wheeled straddle-seat vehicles are therefore quite popular for touring and sport purposes. Further improvement in the driving experience provided by three-wheeled straddle-seat vehicles is desired. In addition, the dynamics of non-leaning three-wheeled straddle seat road vehicles differ significantly to the dynamics of other straddle-seat vehicles, such as motorcycles, which are leaning vehicles, and all-terrain vehicles, which are off-road vehicles designed to handle rugged and uneven terrain. These differences in usage entail differences in vehicle construction related to, inter alia, optimal weight distribution, ergonomic constraints and the layout of components. It is desirable to reduce the cost of manufacture and assembly of three-wheeled straddle-seat vehicles so as to make these vehicles more affordable to a greater segment of the population. It is also quite desirable to offer a variety of three-wheeled straddle-seat vehicles without increasing the cost of manufacture and assembly of such vehicles.

SUMMARY

It is an object of the present technology to ameliorate at least some of the inconveniences mentioned above.

In accordance with one aspect, there is provided a method for assembling a vehicle of a family of vehicles including at least a first vehicle and a second vehicle. The method includes providing a vehicle frame defining an engine cradle. A left front wheel, a right front wheel, and a rear wheel are provided. A group of engines including at least a first engine and a second engine is provided. The first engine corresponds to the first vehicle and the second engine corresponds to the second vehicle. The first engine includes a first number of cylinders. The second engine includes a second number of cylinders. The second number is greater than the first number. The first number is at least one. A transmission assembly is provided. A straddle seat, a left footrest and a right footrest are provided. The vehicle of the family of vehicles is formed by mounting each of the left front wheel, the right front wheel, and the rear wheel to the vehicle frame. An engine corresponding to the vehicle is selected from the group of engines. The engine is a selected engine. The selected engine is mounted to the engine cradle such that a crankshaft rotation axis of a crankshaft of the selected engine extends generally longitudinally. A cylinder plane extends generally vertically and longitudinally. The cylinder plane contains a respective cylinder axis of each cylinder of the selected engine and one of: a line disposed parallel to the crankshaft rotation axis and the crankshaft rotation axis. At least one cylinder of the selected engine is disposed at least in part forward of a front wheel plane, the front wheel plane extending laterally, vertically and tangentially to a rear edge of the left and right front wheels when the left and right front wheels are mounted to the frame and disposed in a steered straight ahead configuration. The transmission assembly is mounted to the vehicle frame so as to be disposed rearward of the selected engine when the selected engine is mounted to the vehicle frame. One of the transmission assembly and a front of the engine is disposed in a same location with respect to the vehicle frame when the selected engine is the first engine and when the selected engine is the second engine. The transmission assembly is operatively connected to the crankshaft. The rear wheel is operatively connected to the transmission assembly. The straddle seat is mounted to the vehicle frame such that the straddle seat is disposed at least in part longitudinally rearward of the transmission assembly when the transmission assembly is mounted to the vehicle frame. The left footrest and the right footrest are mounted to the vehicle frame such that the selected engine is laterally contained between a center of the left footrest and a center of the right footrest in the lateral direction when the selected engine is mounted to the vehicle frame.

In some implementations, an engine output shaft is provided. The engine output shaft is operatively connected to the crankshaft of the selected engine such that the engine output shaft extends generally rearwardly from the engine. Operatively connecting the transmission assembly to the crankshaft comprises operatively connecting the transmission assembly to the engine output shaft.

In some implementations, the front of the selected engine extends further longitudinally forwardly with respect to the vehicle frame when the selected engine is the second engine than when the selected engine is the first engine and the transmission assembly is disposed in the same location with respect to the vehicle frame when the selected engine is the first engine and when the selected engine is the second engine.

In some implementations, the vehicle frame includes an engine mounting bracket. When the selected engine is the first engine, mounting the selected engine to the engine cradle includes disposing the first engine in the engine cradle with a front portion of the first engine being spaced from the engine mounting bracket and connecting the first engine to the engine mounting bracket via a spacer. When the selected engine is the second engine, mounting the selected engine to the engine cradle includes disposing the second engine adjacent the engine mounting bracket and connecting the second engine to the engine mounting bracket without the spacer. The engine mounting bracket being disposed in the same location in the engine cradle when the selected engine is the first engine and when the selected engine is the second engine.

In some implementations, a vibration damping element is provided. Mounting the selected engine to the engine cradle further includes mounting the selected engine to the engine mounting bracket via the vibration damping element.

In some implementations, the vehicle frame further includes a rear mounting bracket and the method further includes mounting one of the engine and the transmission assembly to the rear mounting bracket.

In some implementations, a vibration damping element is provided and mounting the one of the engine and the transmission assembly to the rear mounting bracket includes mounting the one of the engine and the transmission assembly to the rear mounting bracket via the vibration damping element.

In some implementations, a cylinder axis of a rearward-most cylinder of the selected engine is in a same longitudinal position when the selected engine is the first engine and when the selected engine is the second engine.

In some implementations, the vehicle frame includes a front engine mounting bracket, a rear mounting bracket and a spacer. When the transmission assembly is disposed in the same location with respect to the vehicle frame when the selected engine is either one of the first engine or the second engine, mounting the first engine to the engine cradle comprises disposing the first engine in the engine cradle with a front portion of the first engine being spaced from the front engine mounting bracket and connecting the first engine to the front engine mounting bracket via the spacer. When the transmission assembly is disposed in the same location with respect to the vehicle frame when the selected engine is either one of the first engine or the second engine, mounting the second engine to the engine cradle comprises disposing the second engine adjacent the front engine mounting bracket, and connecting the second engine to the front engine mounting bracket without the spacer. When the transmission assembly is disposed in the same location with respect to the vehicle frame when the selected engine is either one of the first engine or the second engine, one of the selected engine and the transmission assembly is mounted to the rear mounting bracket. When the front of the engine is disposed in the same location with respect to the vehicle frame when the selected engine is either the first engine or the second engine, mounting the selected engine to the engine cradle includes disposing the selected engine adjacent the front engine mounting bracket and connecting the selected engine to the front engine mounting bracket without the spacer. When the front of the engine is disposed in the same location with respect to the vehicle frame when the selected engine is either the first engine or the second engine, mounting the first engine includes mounting one of the first engine and the transmission assembly to the rear mounting bracket via the spacer. When the front of the engine is disposed in the same location with respect to the vehicle frame when the selected engine is either the first engine or the second engine, mounting the second engine includes mounting one of the second engine and the transmission assembly to the rear mounting bracket without the spacer.

In some implementations, the transmission assembly includes a continuously variable transmission (CVT) including a primary pulley having a primary pulley rotation axis, a secondary pulley including a rotation axis and a belt configured to be wrapped around the primary pulley and the secondary pulley for rotating the secondary pulley. Mounting the transmission assembly to the vehicle frame comprises mounting the CVT to the vehicle frame such that each of the primary pulley rotation axis and the secondary pulley rotation axis extends generally longitudinally and horizontally in a CVT plane extending generally longitudinally and vertically, the primary pulley rotation axis being disposed vertically lower than the secondary pulley rotation axis.

In some implementations, a fuel tank is provided and the fuel tank is mounted to the vehicle frame such that at least a portion of the fuel tank is disposed between the transmission assembly and the straddle seat when the transmission assembly and the straddle seat are each mounted to the vehicle frame.

In some implementations, a steering assembly is provided. The steering assembly includes a steering column and a handlebar connected thereto. The steering assembly is mounted to the vehicle frame such that the selected engine is disposed longitudinally forward of the handlebar when the selected engine is mounted to the vehicle frame, and the steering column is operatively connected to the left and right front wheels for steering the vehicle.

In some implementations, a left front suspension assembly and a right front suspension assembly are provided. Mounting the left front wheel, the right front wheel and the rear wheel to the vehicle frame includes mounting the left front suspension assembly to the vehicle frame at a left front suspension mounting point and mounting the right front suspension assembly to the vehicle frame at a right front suspension mounting point such that the each cylinder of the selected engine is laterally disposed between the left and right front suspension mounting points in the lateral direction when the selected engine is mounted to the vehicle frame. The left front wheel is mounted to the left front suspension assembly and the right front wheel is mounted to the right front suspension assembly.

In some implementations, a radiator is provided and the radiator is mounted to the vehicle frame such that the radiator is disposed in front of the selected engine when the selected engine is mounted to the vehicle frame.

In some implementations, a radiator and an engine mounting bracket are provided. The radiator is mounted to the vehicle frame such that the radiator is disposed in front of the selected engine when the selected engine is mounted to the vehicle frame. The engine mounting bracket is mounted to the vehicle frame in the engine cradle. Mounting the selected engine to the vehicle frame includes mounting the selected engine to the engine mounting bracket. Mounting the radiator includes mounting the radiator to the vehicle frame such that the radiator is disposed longitudinally forward of the engine mounting bracket.

In some implementations, an exhaust system including a muffler is provided, and the muffler is mounted to the vehicle frame such that the muffler is disposed under the straddle seat when the straddle seat is mounted to the vehicle frame.

In some implementations, providing the exhaust system includes providing a group of exhaust manifolds including at least a first exhaust manifold and a second exhaust manifold. The first exhaust manifold has the first number of inlets, each inlet of the first exhaust manifold being configured to fluidly connect to a corresponding one of the first number of cylinders of the first engine. The second exhaust manifold has the second number of inlets, each inlet of the second exhaust manifold being configured to fluidly connect to a corresponding one of the second number of cylinders of the second engine. An exhaust manifold of the group of exhaust manifolds corresponding to the selected engine is selected, the exhaust manifold being a selected exhaust manifold. Each inlet of the selected exhaust manifold is fluidly connected to a corresponding cylinder of the selected engine.

In some implementations, the second number is greater than the first number by one.

In accordance with one aspect, there is provided a system for assembling a vehicle of a family of vehicles including at least a first vehicle and a second vehicle. The system includes a vehicle frame defining an engine cradle, a left front wheel, a right front wheel, and a rear wheel. A group of engines includes at least a first engine and a second engine. The first engine corresponds to the first vehicle and the second engine corresponds to the second vehicle. The first engine includes a first number of cylinders. The second engine includes a second number of cylinders. The second number is greater than the first number, and the first number is at least one. The system also includes a transmission assembly, a straddle seat, a left footrest and a right footrest. When the first vehicle is assembled using the first engine, the left and front wheels and the rear wheel are mounted to the vehicle frame. The first engine is disposed in the engine cradle, a first engine crankshaft of the first engine is disposed such that a first engine crankshaft rotation axis of the first engine extends longitudinally. A first engine cylinder plane extends generally vertically and longitudinally, the first engine cylinder plane containing a respective cylinder axis of each cylinder of the first engine and one of: the first engine crankshaft rotation axis and a line disposed parallel to the first engine crankshaft rotation axis. At least a portion of at least one cylinder of the first engine is disposed forward of a first engine front wheel plane, the first engine front wheel plane extending laterally, vertically and tangentially to a rear edge of the left front wheel and the right front wheel when the first vehicle is steered straight ahead. A transmission assembly is mounted to the vehicle frame so as to be disposed rearward of the first engine, the transmission assembly being operatively connected to the first engine crankshaft. The rear wheel is operatively connected to the transmission assembly. The straddle seat is mounted to the vehicle frame so as to be disposed at least in part longitudinally rearward of the transmission assembly. The left and right footrests are mounted to the vehicle frame, and the first engine is disposed between a center of the left footrest and a center of the right footrest in the lateral direction. When the second vehicle is assembled using the second engine, the left front wheel is mounted to the vehicle frame, the left and front wheels and the rear wheel are mounted to the vehicle frame. The second engine is disposed in the engine cradle. A second engine crankshaft of the second engine is disposed such that a second engine crankshaft rotation axis of the second engine extends longitudinally. A second engine cylinder plane extends generally vertically and longitudinally, the second engine cylinder plane containing a respective cylinder axis of each cylinder of the second engine and one of: a line parallel to the second engine crankshaft rotation axis and the second engine crankshaft rotation axis. At least a portion of at least one cylinder of the second engine is disposed forward of a second engine front wheel plane, the second engine front wheel plane extending laterally, vertically and tangentially to a rear edge of the left front wheel and the right front wheel when the second vehicle is steered straight ahead. A transmission assembly is mounted to the vehicle frame so as to be disposed rearward of the second engine, the transmission assembly being operatively connected to the second engine crankshaft rotation axis. The rear wheel is operatively connected to the transmission assembly. The straddle seat is mounted to the vehicle frame so as to be disposed at least in part longitudinally rearward of the transmission assembly. The left and right footrests are mounted to the vehicle frame. The second engine is disposed between a center of the left footrest and a center of the right footrest in the lateral direction. One of the transmission assembly and the engine is disposed in a same location with respect to the vehicle frame in the first vehicle and in the second vehicle.

In some implementations, a front of the second engine extends further forward in the second vehicle with respect to the vehicle frame than the first engine in the first vehicle and the transmission assembly is disposed in the same location with respect to the vehicle frame in the first vehicle and in the second vehicle.

In some implementations, the second number is greater than the first number by one.

In accordance with one aspect, there is provided a vehicle of a family of vehicles including at least a first vehicle and a second vehicle. The vehicle includes a vehicle frame defining an engine cradle, a left front wheel, a right front wheel, and a rear wheel. A engine selected from a group of engines includes at least a first engine and a second engine, the first engine corresponding to the first vehicle and the second engine corresponding to the second vehicle of the family of vehicles. The first engine includes a first number of cylinders and the second engine includes a second number of cylinders. The second number is greater than the first number, the first number being at least one. The selected engine is disposed in the engine cradle such that: a crankshaft rotation axis of a crankshaft of the selected engine extends generally longitudinally. A cylinder plane extends generally longitudinally and vertically, the cylinder plane contains a respective cylinder axis of each cylinder of the selected engine and one of: a line disposed parallel to the crankshaft rotation axis and the crankshaft rotation axis. At least one cylinder of the selected engine is disposed at least in part forward of a front wheel plane, the front wheel plane extending laterally, vertically and tangentially to a rear edge of the left and right front wheels when vehicle is steered straight ahead. A transmission assembly is disposed rearward of the selected engine and operatively connected to the crankshaft, the rear wheel being operatively connected to the transmission assembly. One of the transmission assembly and the selected engine is disposed in a same location with respect to the vehicle frame when the selected engine is the first engine and when the selected engine is the second engine. A straddle seat is disposed at lest in part rearward of the transmission assembly. A left footrest and a right footrest are mounted to the vehicle, the selected engine being disposed laterally between a center of the left footrest and a center of the right footrest.

In some implementations, a front of the second engine extends further forward in the second vehicle with respect to the vehicle frame than the first engine in the first vehicle and the transmission assembly is disposed in the same location with respect to the vehicle frame when the selected engine is the first engine and when the selected engine is the second engine.

In some implementations, the second number is greater than the first number by one.

For the purpose of this application, terms related to spatial orientation such as downwardly, rearward, forward, front, rear, left, right, above and below are as they would normally be understood by a driver of the vehicle sitting thereon in an upright position with the vehicle in a straight ahead orientation (i.e. not steered left or right), and in an upright position (i.e. not tilted).

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 11E is a cross-sectional view of the seat, fuel tank, CVT, CVT air duct and engine air duct of FIG. 11A, taken along the line A-A of FIG. 11B; and FIG. 11F is a cross-sectional view of the seat, fuel tank, CVT, CVT air duct and engine air duct of FIG. 11A, taken along the line B-B of FIG. 11B.

DETAILED DESCRIPTION

Figure 1A:
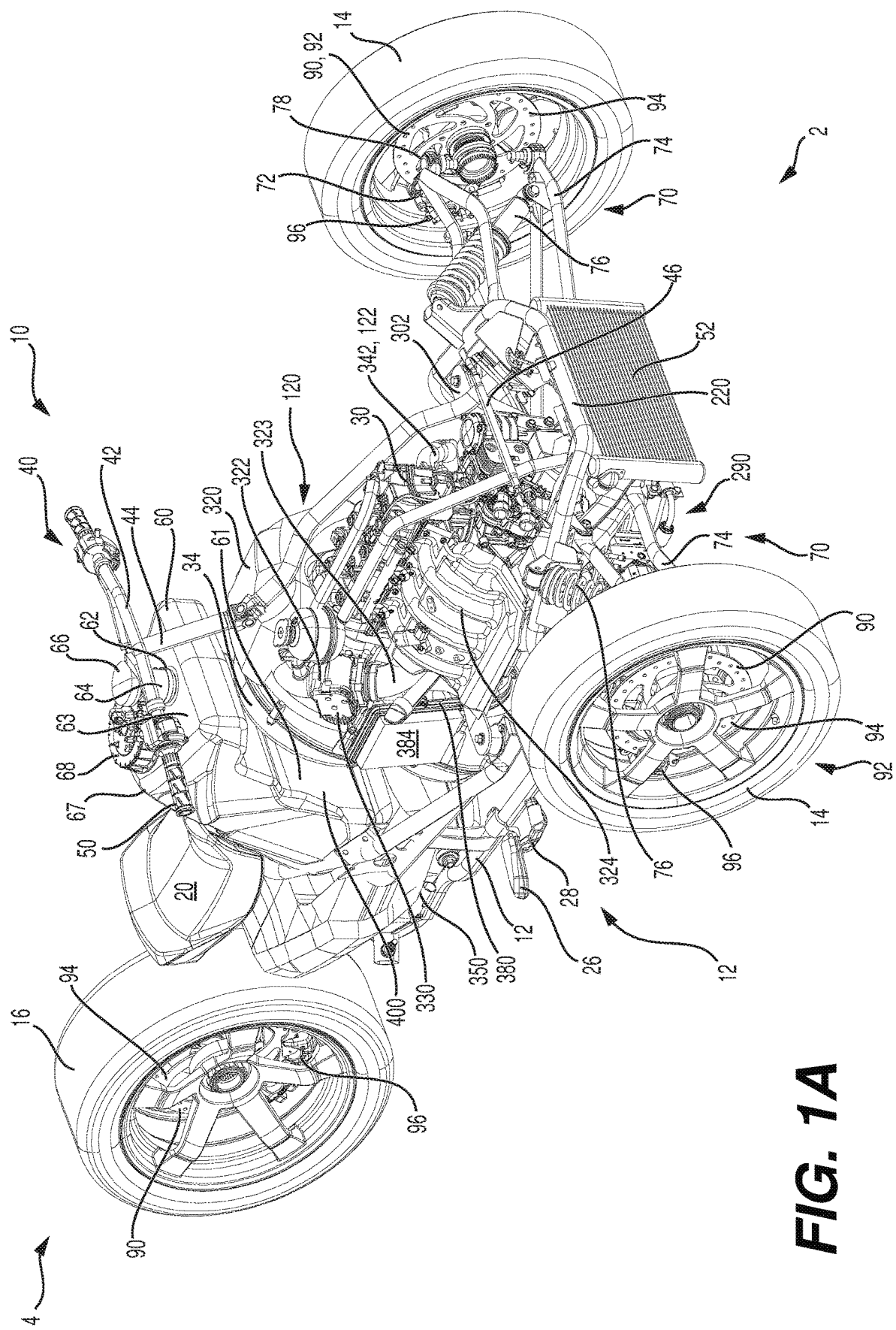
FIG. 1A is a perspective view, taken from a front, top and right side, of a three-wheeled straddle-seat vehicle in accordance with one implementation of the present technology with the fairings thereof being removed for clarity.

The present technology is being described with respect to a three-wheeled straddle-type vehicle 10.

General Description

With reference to FIGS. 1A to 1H, a vehicle 10 has a front end 2 and a rear end 4 defined consistently with the forward travel direction of the vehicle 10. The vehicle 10 has a frame 12 defining a longitudinal centerplane 3 (FIGS. 1D to 1G).

The vehicle 10 is a three-wheeled vehicle 10 including a left front wheel 14 mounted to the frame 12 by a left front suspension assembly 70, a right front wheel 14 mounted to the frame 12 by a right front suspension assembly 70, and a single rear wheel 16 mounted to the frame 12 by a rear suspension assembly 80. The left and right front wheels 14 and the rear wheel 16 each have a tire secured thereto. It is contemplated that both front wheels 14 and/or the rear wheel 16 could have more than one tire secured thereto. The front wheels 14 are disposed equidistant from the longitudinal centerplane 3, and the rear wheel 16 is centered with respect to the longitudinal centerplane 3. The front wheels 14 each rotate about a corresponding rotation axis 14a. The rear wheel 16 rotates about a rotation axis 16a. In the illustrated implementation of the vehicle 10, each of the rotation axes 14a, 16a of the wheels 14, 16 is disposed horizontally. When the vehicle is placed on level ground and without a driver, passenger, and/or any cargo loaded thereon, the rotation axes 14a, 16a of the wheels 14, 16, are all contained in a common generally horizontal plane 15, referred to hereinafter as a rotation plane 15 (FIG. 1B, 1C). It is contemplated that each of the rotation axes 14a of the front wheels 14 could be disposed at an angle with respect to the horizontal, and therefore not disposed in the common plane 15 extending generally horizontal plane. It is contemplated that the rotation axis 16a of the rear wheel 16 could be vertically higher than the axes of rotation 14a of the front wheels 14. In this case, the rotation plane 15 is defined as a plane perpendicular to the longitudinal centerplane 3 and passing through the centers of the wheels 14, 16. A front wheel plane 18 is defined as a plane extending normal to the longitudinal centerplane 3 and being disposed tangentially to the rear edges of the left and right front wheels 14 when the vehicle 10 is steered straight ahead.

In the illustrated implementation, each front suspension assembly 70 is a double A-arm type suspension, also known as a double wishbone suspension. It is contemplated that other types of suspensions, such as a McPherson strut suspension, or swing arm could be used. Each front suspension assembly 70 includes an upper A-arm 72, a lower A-arm 74 and a shock absorber 76. The right front suspension assembly 70 is a mirror image of the left front suspension assembly 70, and as such only the left front suspension assembly 70 will be described herein. Each A-arm 72, 74 has a front member and a rear member. The laterally outer ends of the front and rear members are connected to each other while the laterally inner ends of the front and rear members of each A-arm 72, 74 are spaced apart from each other. The lower end of the shock absorber 76 is connected to the front and rear members of the lower A-arm 74 slightly laterally inward of the laterally outer ends. The laterally inner ends of the upper and lower A-arms 72, 74 are pivotally connected to the frame 12 as will be described below. The laterally outer ends of the upper and lower A-arms 72, 74 are pivotally connected to the top and bottom respectively of a spindle 78 (FIG. 2A) as can be seen best in FIGS. 1A and 2A. The spindle 78 also defines a steering arm 79 which extends rearwardly and laterally inwardly from the top of the spindle 78. The spindle 78 pivots, relative to the A-arms 72, 74, about a steering axis extending generally vertically. The front wheel 14 is connected to a hub 71 (FIG. 2A) that is connected to the spindle 78 such that the hub 71 and the corresponding front wheel 14 can rotate about the generally vertical steering axis. A sway bar 86 is connected to the front members of both lower A-arms 74 to reduce motion of one of the left and right front wheels 14 with respect to the other of the left and right front wheels 14, and to thereby reduce rolling motion of the vehicle 10.

The rear suspension assembly 80 includes a swing arm 82 and a shock absorber 84. The swing arm 82 is pivotally mounted at a front thereof to the frame 12. The rear wheel 16 is rotatably mounted to the rear end of the swing arm 82 which extends on a left side of the rear wheel 16. The shock absorber 84 is connected between the swing arm 82 and the frame 12.

The vehicle 10 is a straddle-type vehicle having a straddle seat 20 mounted to the frame 12 and disposed along the longitudinal centerplane 3. The straddle seat is disposed longitudinally forward of the rear wheel 16. In the illustrated implementation, the straddle seat 20 is intended to accommodate a single adult-sized rider, i.e. the driver. It is however contemplated that the straddle seat 20 could be configured to accommodate more than one adult-sized rider (the driver and one or more passengers). A driver footrest 26 is disposed on either side of the vehicle 10 and vertically lower than the straddle seat 20 to support the driver's feet. In the implementation of the vehicle 10 illustrated herein, the driver footrests 26 are in the form of foot pegs disposed longitudinally forward of the straddle seat 20. It is also contemplated that the footrests 26 could be in the form of footboards. It is contemplated that the vehicle 10 could also be provided with one or more passenger footrests disposed rearward of the driver footrest 26 on each side of the vehicle 10, for supporting a passenger's feet when the seat 20 is configured to accommodate one or more passengers in addition to the driver. A brake operator 28, in the form of a foot-operated brake pedal, is connected to the right driver footrest 26 for braking the vehicle 10. The brake operator 28 extends upwardly and forwardly from the right driver footrest 26 such that the driver can actuate the brake operator 28 with a front portion of the right foot while a rear portion of the right foot remains on the right driver footrest 26.

A handlebar 42, which is part of a steering assembly 40, is disposed in front of the seat 20. The handlebar 42 is used by the driver to turn the front wheels 14 to steer the vehicle 10. A central portion of the handlebar 42 is connected to an upper end of a steering column 44. From the handlebar 42, the steering column 44 extends downwardly and leftwardly. A lower end of the steering column 44 is connected to a left pitman arm 46 and a right pitman arm 46. A left steering rod 48 connects the left pitman arm 46 to the steering arm 79 of the left suspension assembly 70 and a right steering rod 48 connects the right pitman arm 46 to the steering arm 79 of the right suspension assembly 70 such that turning the handlebar 42 turns the steering column 44 which, through the pitman arm 46 and the steering rods 48, turns the wheels 14. In the illustrated implementation of the vehicle 10, the steering assembly 40 includes a power steering unit (not shown) to facilitate steering of the vehicle 10. It is contemplated that the power steering unit could be omitted.

A left hand grip is placed around the left side of the handlebar 42 near the left end thereof and a right hand grip is placed respectively right sides of the handlebar 42 near the right end to facilitate gripping for turning the handlebar 42 and thereby steering the vehicle 10. In the illustrated implementation, the right hand grip is a throttle operator 50, in the form of a rotatable hand grip, which can be rotated by the driver to control power delivered by the engine 30. It is contemplated that the throttle operator could be in the form of a thumb-operated or finger-operated lever and/or that the throttle operator 50 could be connected near the right end of the handlebar 42. The handlebar 42 has connected thereto various controls such as an engine start-up button and an engine cut-off switch located laterally inwardly of the left and right grips.

The frame 12 supports and houses a motor 30 located forwardly of the straddle seat 20. In the illustrated implementation of the vehicle 10, the motor 30 is in the form of an internal combustion engine. It is however contemplated that the motor 30 could be other than an internal combustion engine. For example, the motor 30 could be an electric motor, a hybrid or the like. The motor 30 will be referred to hereinafter as engine 30 for convenience. In the illustrated implementation of FIG. 1, the engine 30 is an inline three-cylinder four-stroke internal combustion engine. Another implementation of a vehicle 10' having an inline two-cylinder four-stroke internal combustion engine will be discussed later. It is contemplated that other types of internal combustion engines could be used. The engine 30 has a crankshaft 31 (FIGS. 5C and 5D) which rotates about a crankshaft axis 31*a* (FIGS. 5C and 5D) disposed generally longitudinally and horizontally.

The engine 30 is operatively connected to the rear wheel 16 to drive the rear wheel 16. The rear wheel 16 is operatively connected to the crankshaft 31 of the engine 30 via an engine output shaft 32 (FIGS. 5C and 5D), a continuously variable transmission (CVT) 34, a transfer case 36 and a driveshaft 38. It is contemplated that the engine 30 could be connected to the front wheels 14 instead of, or in addition to, the rear wheel 16. The engine 30, engine output shaft 32, continuously variable transmission (CVT) 34, transfer case 36 and driveshaft 38 form part of a vehicle powertrain 100 which will be described below in further detail. As can be seen, the transfer case 36 is disposed rearward of the engine 30, and the CVT 34 is disposed rearward of the transfer case 36. The CVT 34 and the transfer case 36 form a transmission assembly 400 of the vehicle 10. It is contemplated that the vehicle 10 could have a transmission assembly 400 in which the CVT 34 and the transfer case 36 are replaced by a discrete gear transmission.

As can be seen in FIGS. 1A to 1E, a fuel tank 60 disposed behind the CVT 34 supplies fuel to the engine 30. The fuel tank 60 is disposed longitudinally rearward of the CVT 34 and overlapping therewith in the lateral and vertical directions. The straddle seat 20 is disposed behind the fuel tank 60. The straddle seat 20 is disposed longitudinally rearward of the fuel tank 60 and overlapping therewith in the lateral and vertical directions. The fuel tank 60 is mounted rearward of the CVT 34 and spaced therefrom. A front wall 61 of the fuel tank 60 extends rearwardly of the CVT 34 and is formed so as to be congruous with a rear cover 156 thereof. An upper portion of the front wall 61 extends forwardly above the CVT 34 and then upwardly above the CVT 34 to an upper wall 63 of the fuel tank 60. The upper wall 63 of the fuel tank 60 extends rearwardly and generally horizontally. The fill opening 62 of the fuel tank 60 is formed in the upper wall 63 and disposed above the CVT 34. A filler neck 64 extends upwardly from the fill opening 62 and is covered by a cap 66. The fuel pump 68 is mounted to the upper wall 63 of the fuel tank 60 rearward of the filler neck 64 and forward of a rear surface 67 of the fuel tank 60. The straddle seat 20 is disposed rearwardly of the fuel tank 60 in contact with the rear wall 67 thereof. The rear wall 67 slopes rearwardly and downwardly from the upper wall 63 thereof to the straddle seat 20, and then gently forwardly and downwardly below the straddle seat 20.

A radiator 52 is mounted to the vehicle frame 12 and disposed in front of the engine 30. The radiator 52 is disposed longitudinally forward of the engine 30 and overlapping therewith in the lateral and vertical directions. The radiator 52 is fluidly connected to the engine 30 for cooling the engine 30. The radiator 52 is disposed longitudinally forward of the front suspension assemblies 70, 80. The radiator 52 is disposed between the front left and right suspension assemblies 70, 80 in the lateral directions. The front left and right suspension assemblies 70, 80 extend vertically higher than the radiator 52.

Figure 1B:
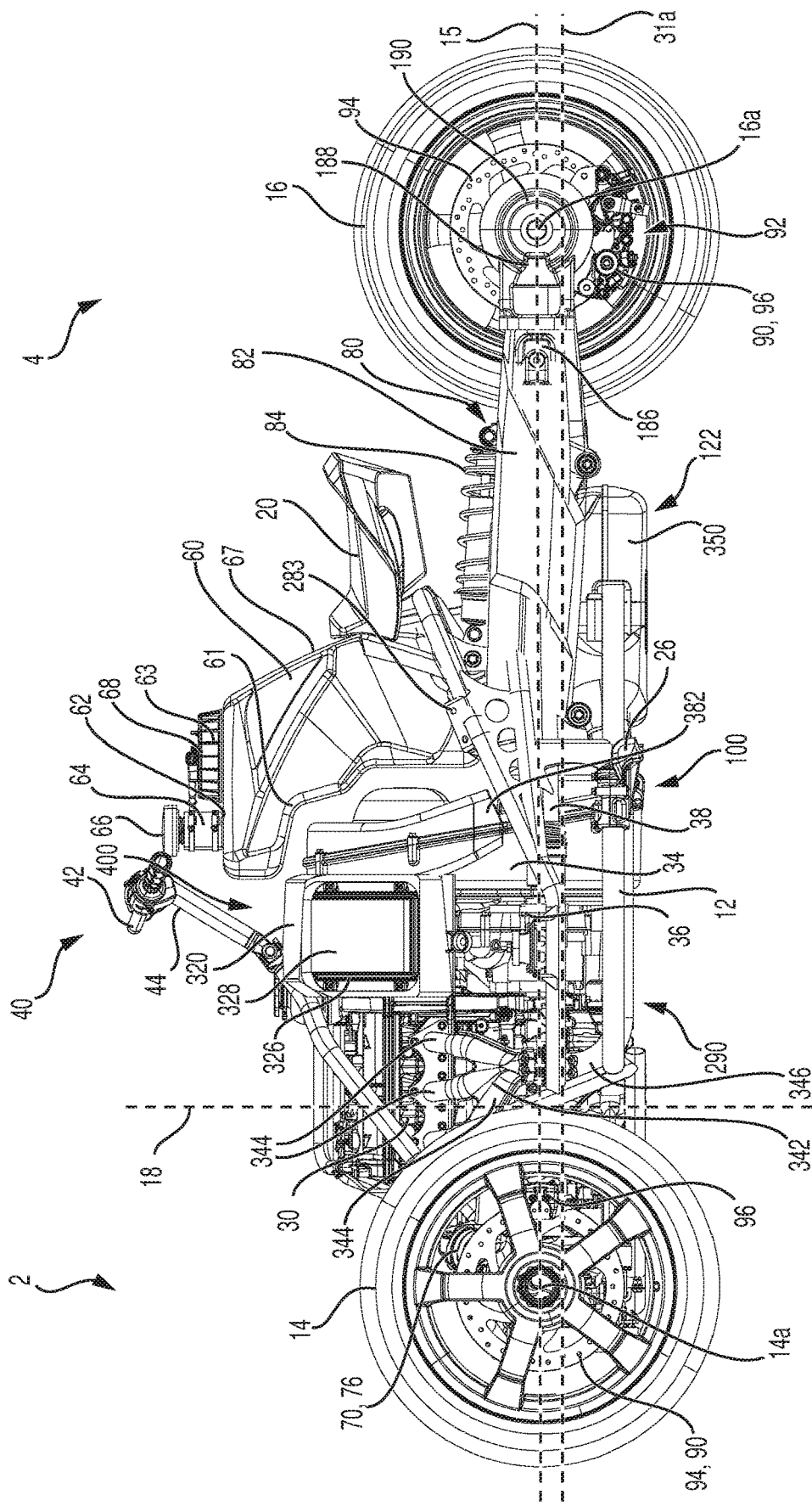
FIG. 1B is a left side elevation view of the vehicle of FIG. 1A.
Figure 1C:
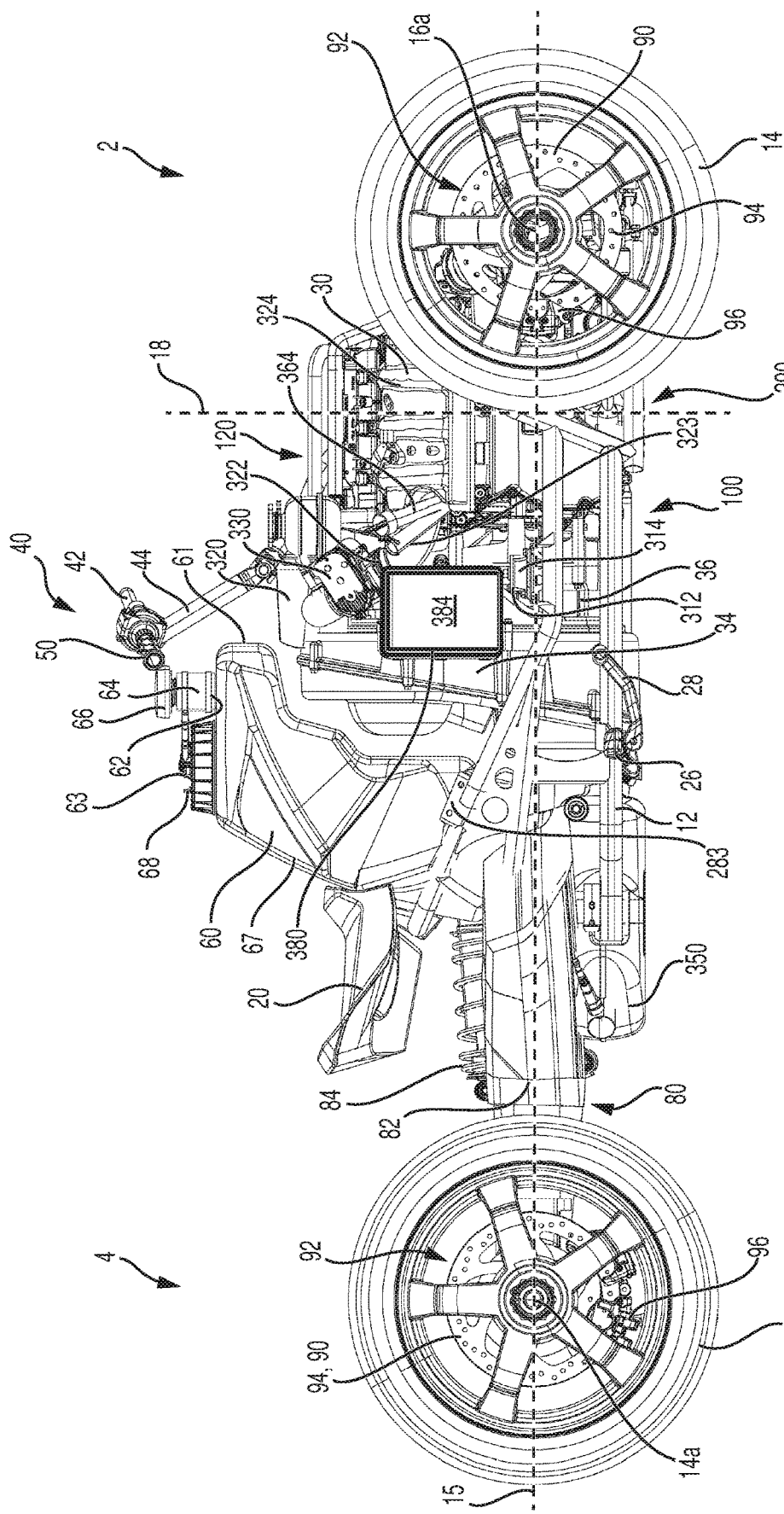
FIG. 1C is a right side elevation view of the vehicle of FIG. 1A.
Figure 1D:
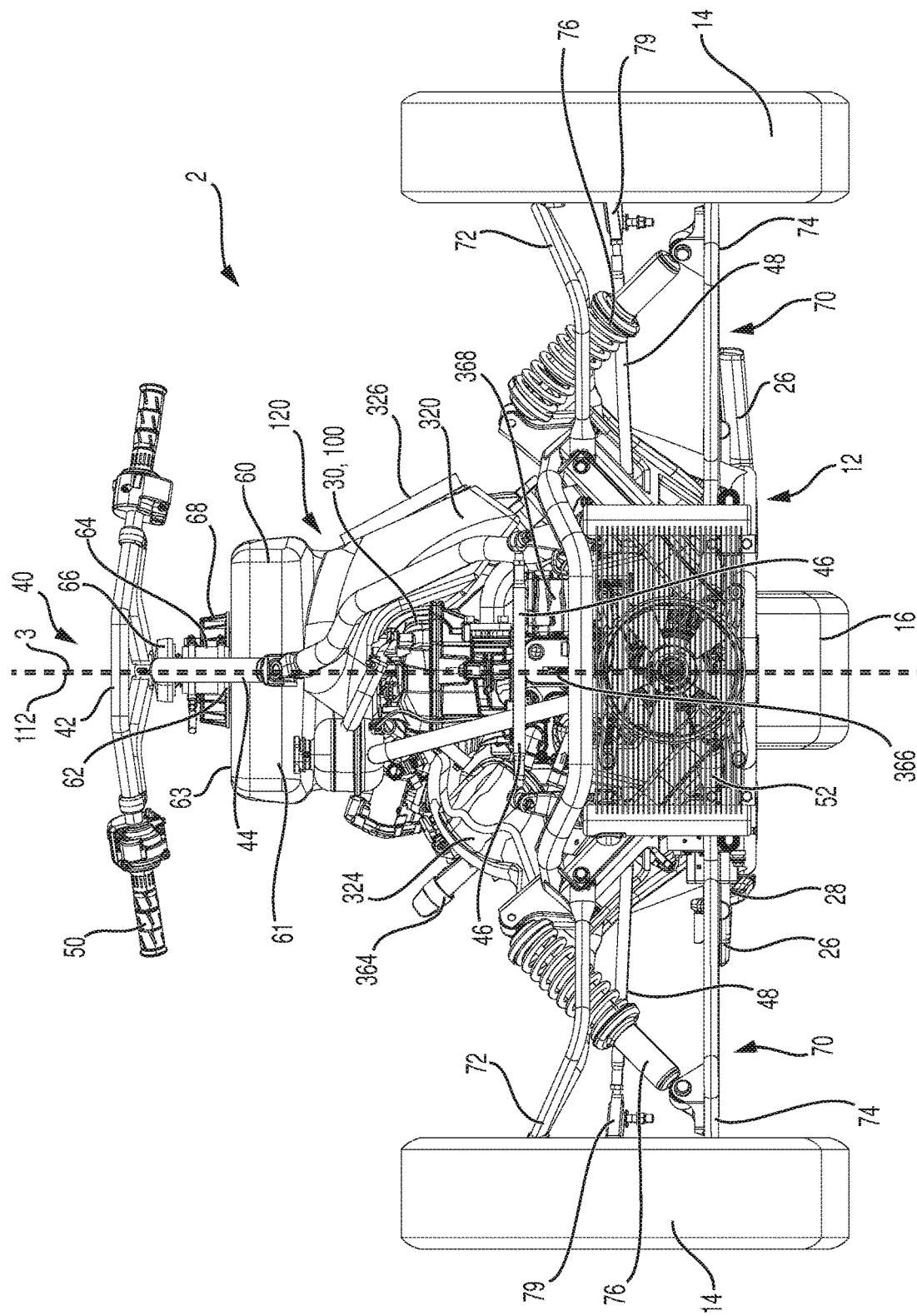
FIG. 1D is a front elevation view of the vehicle of FIG. 1A.
Figure 2A:
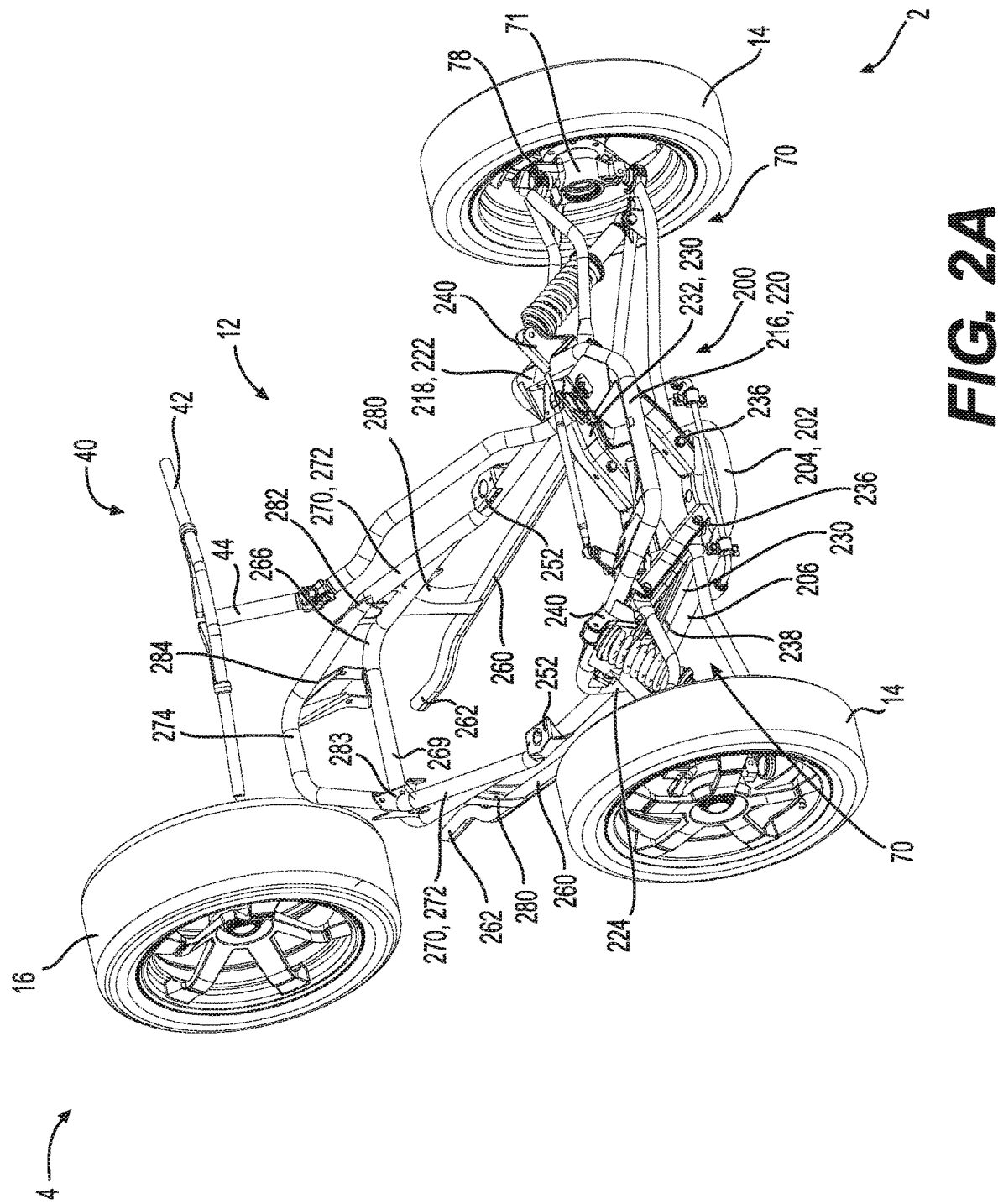
FIG. 2A is a perspective view, taken from a front, top and right side, of the vehicle frame, front and rear wheels, front suspension assemblies, and steering assembly of the vehicle of FIG. 1A.
Figure 2B:
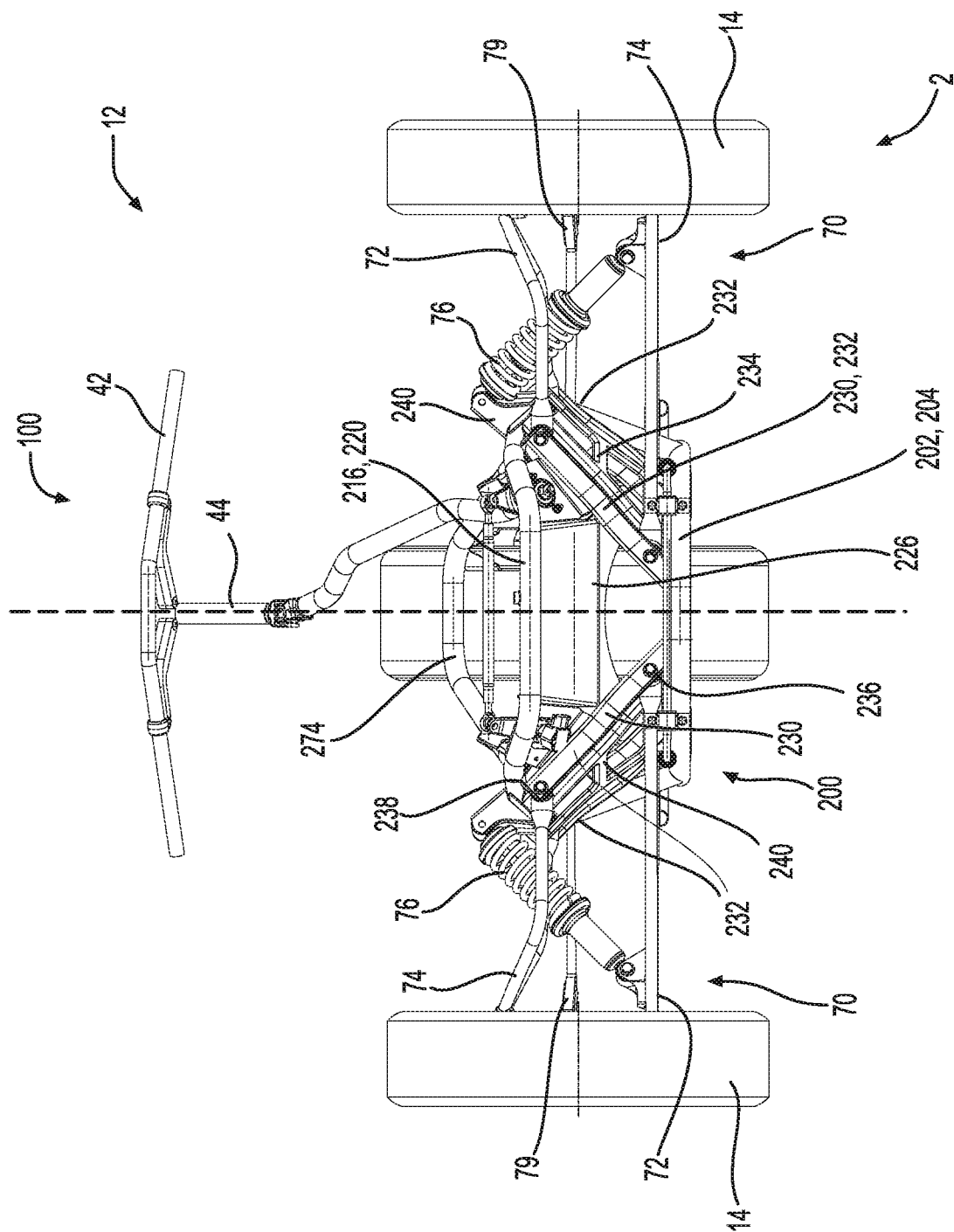
FIG. 2B is a front plan view of the vehicle frame, front and rear wheels, front suspension assemblies, and steering assembly of FIG. 2A.

With reference to FIGS. 1A to 1C, each of the two front wheels 14 and the rear wheel 16 is provided with a brake 90. The brakes 90 of the three wheels 14, 16 form a brake assembly 92. Each brake 90 is a disc-type brake mounted onto a hub of the respective wheel 14 or 16. Other types of brakes are contemplated. Each brake 90 includes a rotor 94 mounted onto the wheel hub and a stationary caliper 96 straddling the rotor 94. The brake pads (not shown) are mounted to the caliper 96 so as to be disposed between the rotor 94 and the caliper 96 on either side of the rotor 45*a*. The foot-operated brake operator 28 is operatively connected to the brakes 90 provided on each of the two front wheels 14 and the rear wheel 16. It is contemplated that the brake operator 28 could be in the form of a hand-operated brake lever connected to the handlebar 42 instead of the foot-operated brake pedal as shown herein. It is contemplated that the brake assembly 92 could be connected to a hand-operated brake lever mounted to the handlebar 42 in addition to the foot-operated brake pedal 28 mounted to the right footrest 26. The brake operator 28 is connected to a hydraulic cylinder (not shown) which is hydraulically connected to a hydraulic piston (not shown) of each brake caliper 96 via brake lines (not shown). When the brake operator 28 is actuated by the driver, hydraulic pressure is applied to the hydraulic cylinder and thereby to the piston of each caliper 96, causing the brake pads to squeeze their respective rotors 94 which, through friction, brakes the wheels 14 and 16. The hydraulic cylinder is also connected to a hydraulic reservoir (not shown) which ensures that adequate pressure is maintained in the brake lines and the hydraulic cylinder. The vehicle 10 also includes a vehicle stability system (not shown) operable to, inter alia, actuate each brake 90 individually in order to improve handling and stability. The vehicle stability system includes a hydraulic pump in fluidic connection with the hydraulic cylinder and each brake caliper 96. The vehicle stability system further includes an on-board computer that controls operation of the hydraulic pump in response to signals received from sensors such as a longitudinal acceleration sensor, a lateral acceleration sensor, a yaw rate sensor, an engine speed sensor or a wheel speed sensor. Examples of such a vehicle stability system are described in U.S. Pat. Nos. 8,086,382, 8,655,565 and 9,043,111, the entirety of which are incorporated herein by reference.

Although not shown, the vehicle 10 includes fairings which are connected to the frame 12 to enclose and protect the internal components of the vehicle 10 such as the engine 30. The fairings include a hood disposed at the front of the vehicle 10 between the front wheels 14, a rear deflector disposed over the rear wheel 16.

Frame

The vehicle frame 12 will now be described with reference to FIGS. 2A to 3D. For simplicity, all of the individual frame members of the vehicle frame 12 have been labeled only in FIGS. 2A to 3D. In the remaining figures, the frame 12 has been indicated generally but the specific labels for the individual frame members have been omitted to avoid crowding the figures.

The vehicle frame 12 includes a forward portion 200 and a rearward portion 201. The forward portion 200 includes a U-shaped lower frame member 202 formed of a tubular brace. The U-shaped frame member 202 has a central portion 204 (FIGS. 2A and 3C) extending generally laterally and horizontally. A left arm 206 (FIG. 3B) of the U-shaped frame member 202 extends rearwardly and laterally outwardly (leftwardly) from the left side of the central portion 204. A right arm 206 (FIG. 3A) of the U-shaped frame member 202 extends rearwardly and laterally outwardly (rightwardly) from the right side of the central portion 204. The left and right arms 206 of the U-shaped frame member 202 extend generally horizontally.

Figure 3A:
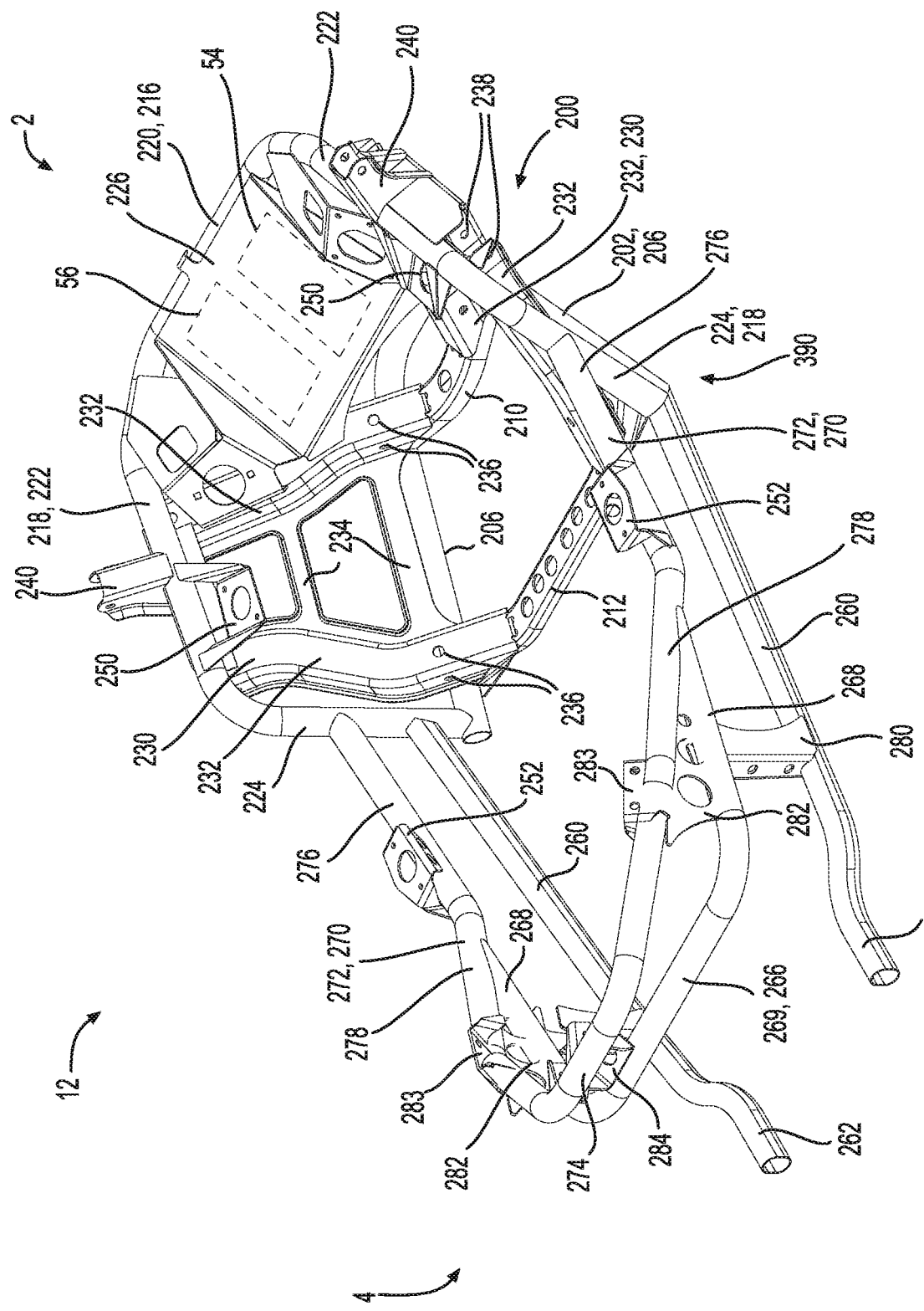
FIG. 3A is a perspective view, taken from a rear, top and right side, of the vehicle frame of FIG. 2A shown in isolation.
Figure 3B:
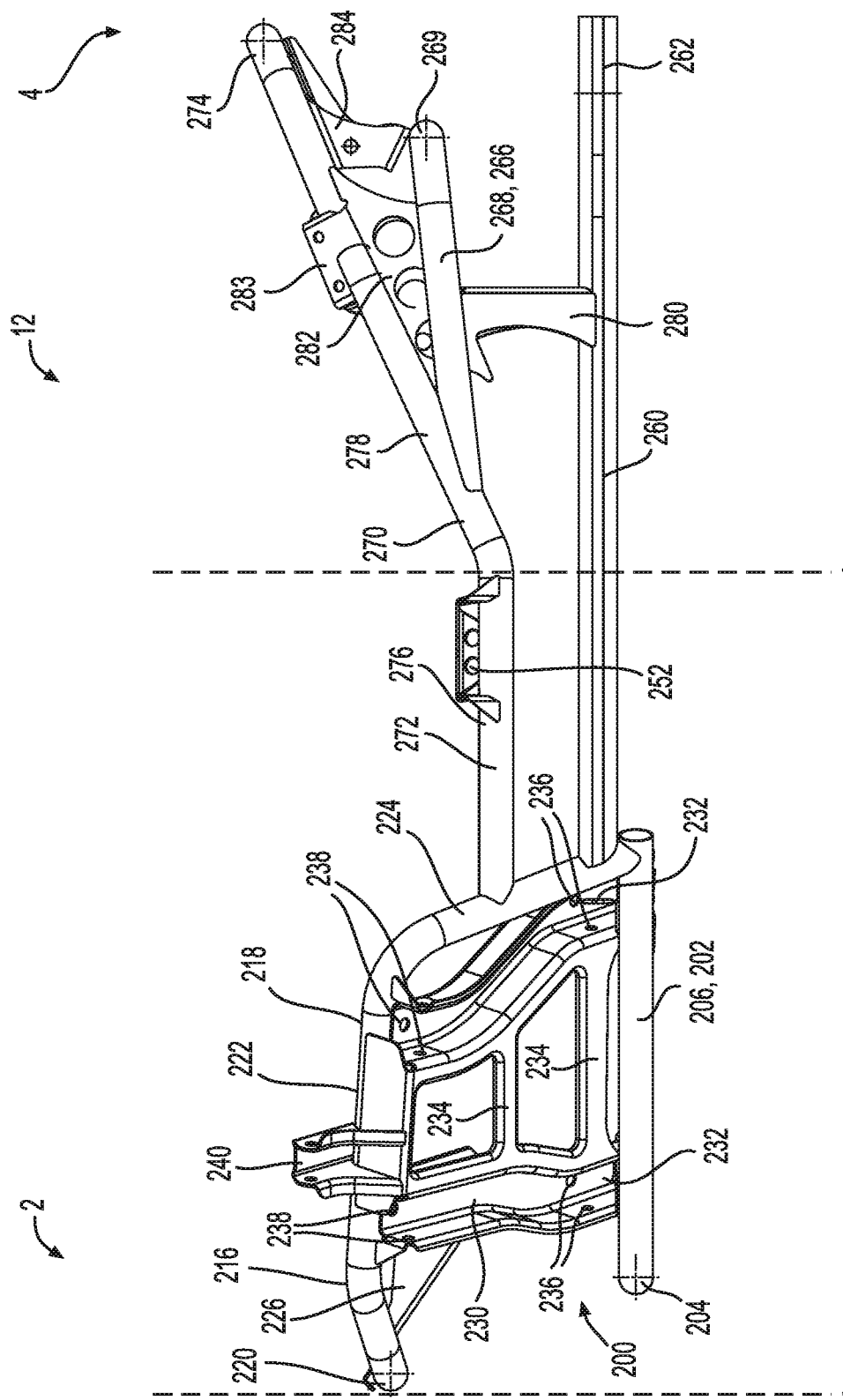
FIG. 3B is a left side elevation view of the vehicle frame of FIG. 3A.
Figure 3C:
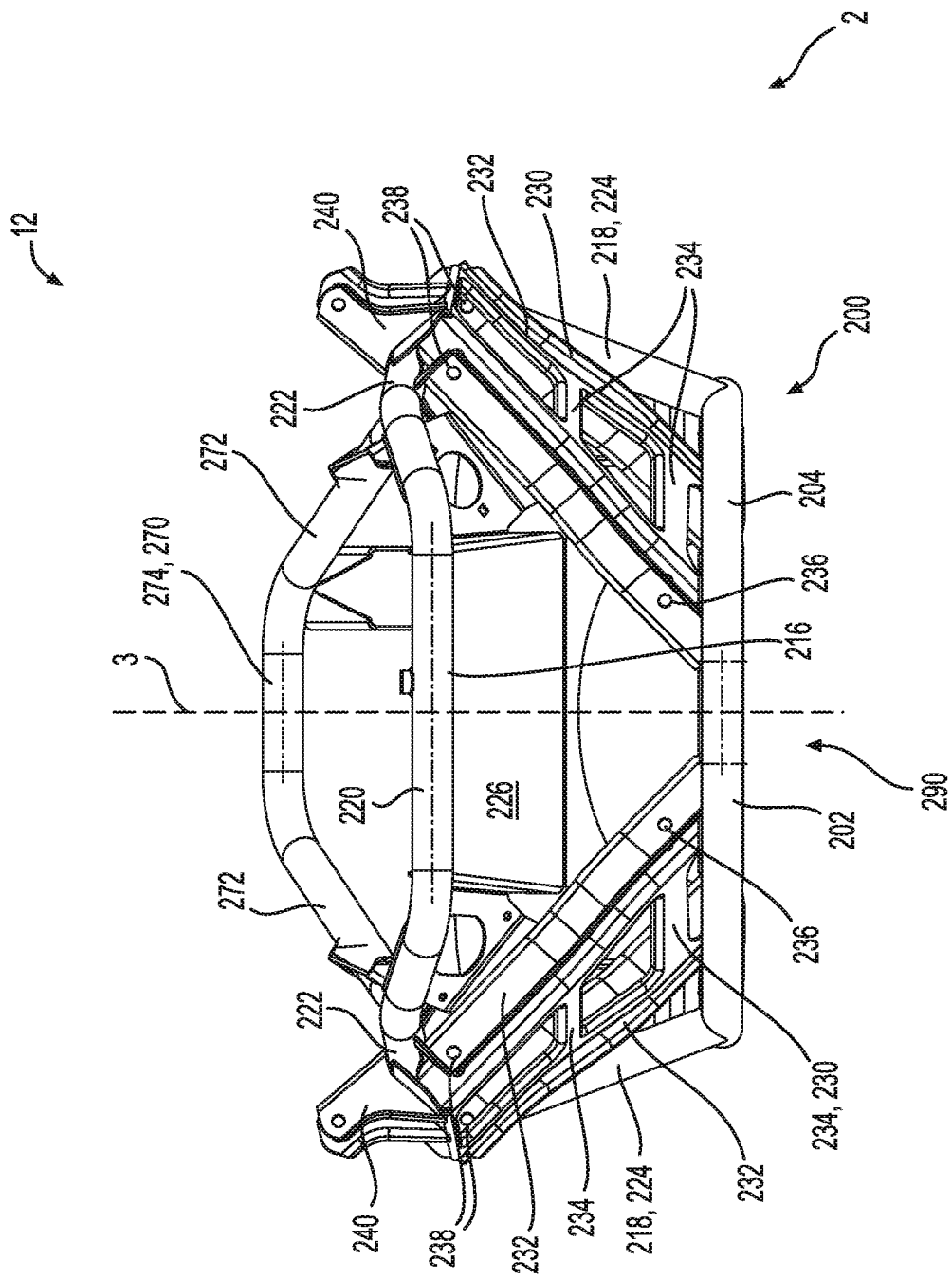
FIG. 3C is a front elevation view of the vehicle frame of FIG. 3A.
Figure 3D:
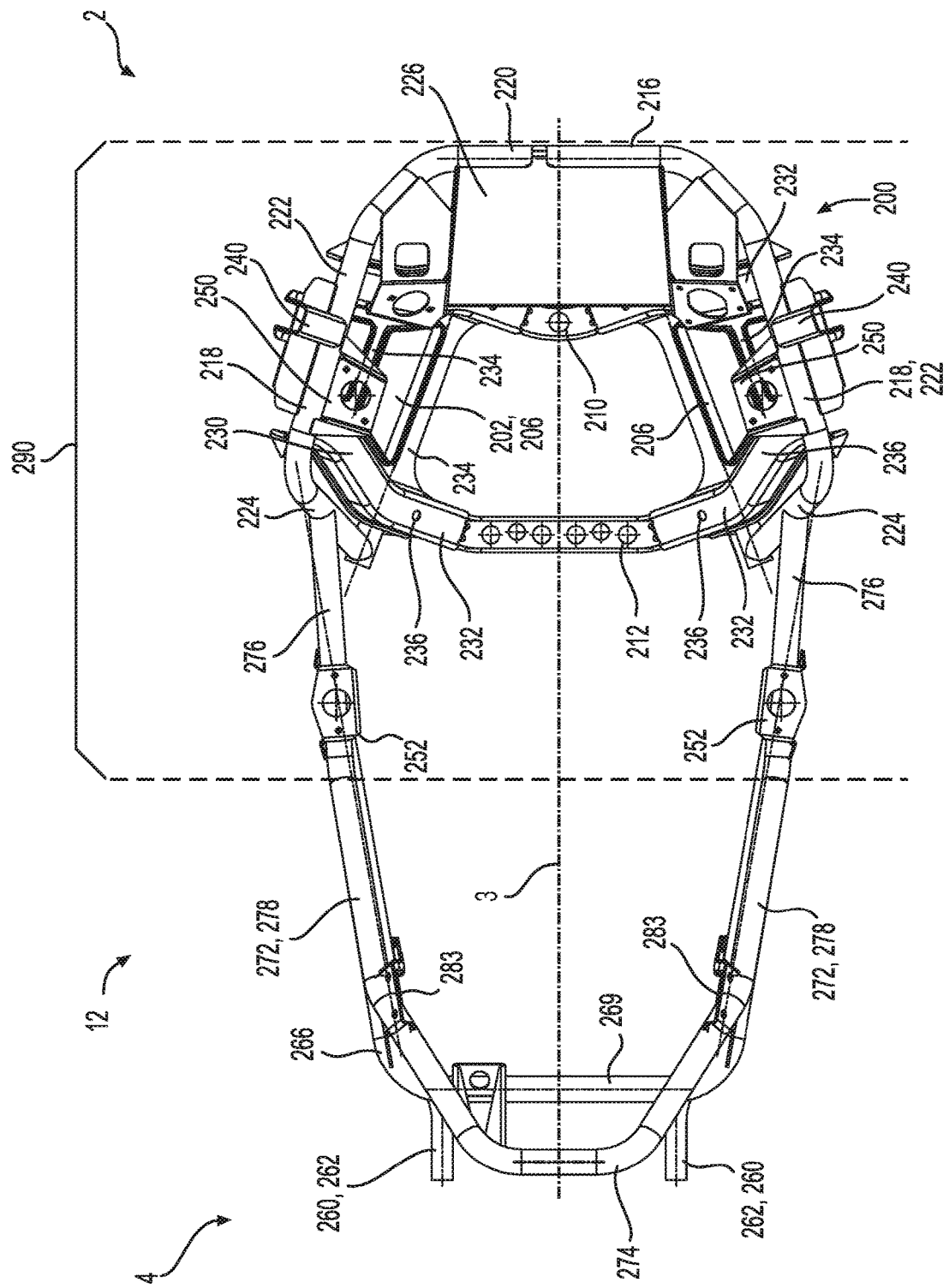
FIG. 3D is a top plan view of the vehicle frame of FIG. 3A.

As can be seen best in FIG. 3A, a front cross-member 210 and a rear cross-member 212 extend laterally between the left and right arms 206 of the U-shaped frame member 202.

A left end of the front cross-member 210 is connected to the left arm 206 just rearwardly of the central portion 204 and a right end of the front cross-member 210 is connected to the right arm 206 just rearwardly of the central portion 204. The rear cross-member 212 has a left end connected to the left arm 206 near the rear end thereof and a right end connected to the right arm 206 near the rear end thereof. The cross-members 210, 212 enhance rigidity of the frame 12. The cross-members 210, 212 are made of stamped metal portions and have holes to reduce weight.

The forward portion 200 also includes an upper frame member 216 extending above the lower frame member 202. The upper frame member 216 has a left arm 218 and a right arm 218 connected together by central portion 220 extending laterally and horizontally at the front end. The left arm 218 has a horizontal portion 222 extending rearwardly and laterally outwardly from the left end of the central portion 220 to a vertical portion 224 of the left arm 218. The vertical portion 224 of the left arm 218 extends downwardly and laterally inwardly to the upper surface of left arm 206 of the lower frame member 202 near the rear end thereof. The right arm 218 has a horizontal portion 222 extending rearwardly and laterally outwardly from the right end of the central portion 220 to a vertical portion 224. The vertical portion 224 of the right arm 218 extends downwardly and laterally inwardly to the upper surface of right arm 206 of the lower frame member 202 near the rear end thereof. The lower ends of the left and right vertical portions 218 are respectively connected to the upper surfaces of the left and right arms 206 by welding. The horizontal 220 and vertical portions 218 are formed from a single tubular brace bent to form the structure describe above. The radiator 52 is mounted to the central portions 204 and 220 as can be seen in FIG. 1A.

A plate member 226 is connected to the horizontal portion 222 and extends downwardly and rearwardly therefrom. The plate member 226 is used to mount various components of the vehicle 10 such as the power steering unit, a battery 54 (shown schematically in FIG. 3A), a fuse box 56 (shown schematically in FIG. 3A), and the like.

The forward portion 200 also includes a left front suspension mounting bracket 230 and a right front suspension mounting bracket 230. The right front suspension mounting bracket 230 is generally a mirror image of the left front suspension mounting bracket 230, and as such, only the left front suspension mounting bracket 230 will be described herein. The left front suspension mounting bracket 230 includes two vertical members 232 connected together by three cross-members 234 extending horizontally therebetween. The members 232, 234 are formed by stamping metal sheets. The upper ends of the front and rear vertical members 232 are connected to the horizontal portion of the left arm 218 of the upper frame member 216. From their respective upper ends, the front and rear vertical members 232 each extend downwardly and laterally inwardly. The lower end of the front vertical member 232 is connected to the front cross-member 210 near the left end thereof. The lower end of the rear vertical member 232 is connected to the rear cross-member 212 near the left end of. One of the cross-members 234 extends between the front and rear vertical members 232 just above the left arm 206 of the lower frame member 202. Bolt holes 236 are defined in each of the front and rear vertical members 232 near the connection with the cross-member 234 for pivotally connecting the lower A-arm 74 of the left front suspension 70. Bolt holes 238 are defined in each of the front and rear vertical members 232 near their respective upper ends for connecting the upper A-arm 72 of the left front suspension 70.

A left shock absorber mounting bracket 240 is connected to the horizontal portion 222 of the left arm 218 of the upper frame member 216 between the front and rear vertical members 232 for connecting the upper end of the shock absorber 76 of the left front suspension assembly 70. The left shock absorber mounting bracket 240 is connected to the upper and laterally outer surface of the horizontal portion 222. The left shock absorber mounting bracket 240 extends upwardly and laterally outwardly from the horizontal portion 222. The left shock absorber mounting bracket 240 is U-shaped in cross-section with two spaced apart generally planar flanges extending parallel to each another and another planar flange extending between the two parallel flanges. A throughhole is defined in each of the two parallel flanges. The upper end of the shock absorber 76 is pivotally connected to the shock absorber mounting bracket 240 by a bolt inserted through the throughholes and the upper end of the shock absorber 76 disposed therebetween. A right shock absorber mounting bracket 240 is similarly connected to the horizontal portion 222 of the right arm 218 of the upper frame member 216 between the front and rear vertical members 232 for connecting the upper end of the shock absorber 76 of the right front suspension assembly 80. The right shock absorber mounting bracket 240 is generally a mirror image of the left shock absorber mounting bracket 240, and as such, will not be described herein.

A front left bracket 250 is connected to the horizontal portion 222 of the left arm 218 of the upper frame member 216 just rearwardly of the left shock absorber mounting bracket 240. The front left bracket 250 extends laterally inwardly from the horizontal portion 222. The front left bracket 250 has two vertical spaced apart flanges connected together at their lower ends by a horizontal plate having a central aperture. Similarly, a front right bracket 250 is connected to the horizontal portion of the right arm 218 of the upper frame member 216 just rearwardly of the right shock absorber mounting bracket 240. The front right bracket 250 is generally a mirror image of the front left bracket 250, and as such will not be described herein in detail. The brackets 250 are formed by stamping metal sheets. The brackets 250 are connected to the horizontal portion 222 by welding. A front portion of the engine 30 is connected to the left and right brackets 250 as will be described below in further detail.

The rearward portion 201 of the vehicle frame 12 includes a lower left frame member 260 extending rearwardly from the vertical portion 224 of the left arm 218 of the lower frame member 202 and a lower right frame member 260 extending rearwardly from the vertical portion 224 of the right arm 218 of the lower frame member 202. The lower left frame member 260 is formed of a tubular brace and extends generally horizontally. The front end of the lower left frame member 260 is connected to the vertical portion 224 just above the lower end thereof. From the front end, the lower left frame member extends generally horizontally and laterally inwardly towards a rear end portion 262. Just forward of the rear end portion 262, the lower left frame member 260 curves sharply laterally inwardly. The lower right frame member 260 is generally a mirror image of the lower left frame member 260 and as such, only the lower left frame member 260 will be described herein.

The rearward portion 201 includes a generally U-shaped rear upper frame member 270 disposed above the lower left frame member 260. The rear upper frame member 270 includes a left arm 272, a right arm 272 and a central portion 274 extending therebetween. The right arm 272 is generally a mirror image of the left arm 272 and as such, only the left arm will be described herein. The front end of the left arm 272 is connected to the vertical portion 224 of the left arm 218 of the lower frame member 202 above the lower left frame member 260. From the front end, left arm 272 extends generally longitudinally and laterally inwardly toward the central portion 274. A front portion 276 of the left arm 272 extends generally horizontally. A rear portion 278 of the left arm 272 extends upwardly and rearwardly away from the horizontal front portion 276 thereof. The central portion 274 extends generally laterally between the rear ends of the left and right arms 272. The central portion 274 is disposed vertically higher than the central portion 220. The rear upper frame member 270 is formed of a single tubular brace bent to form the portions 272, 274 described above.

Another U-shaped rear member 266 of the rearward portion 201 is connected to the rear portion 278 of the rear upper frame member 270. The rear member 266 is disposed below the upper frame member 270 and above the lower left and right frame members 260. The rear member 266 has a left arm 268, a right arm 268 and a central portion 269 connecting therebetween. A front end of the left arm 268 is connected to the rear portion 278 of the upper frame member left arm 272 and a front end of the right arm 268 is connected to the rear portion 278 of the upper frame member right arm 272. Each of the left and right arms 268 extend rearwardly and gently upwardly from the respective front ends to the central portion 269. The central portion 269 is disposed longitudinally forwardly of the rear upper frame member central portion 274. The rear member 266 is formed of a single tubular brace bent to form the portions 268, 269 described above.

A rear left bracket 252 is connected to the horizontal front portion 276 of the left arm 272 of the rear upper frame member 270 just forward of the bend where the left arm 272 begins to extend upwardly. Similarly, a rear right bracket 252 is connected to the horizontal front portion 276 of the right arm 272 of the rear upper frame member 270 just forward of the bend where the right arm 272 begins to extend upwardly. The transfer case 36 is mounted to the rear left and right brackets 252 as will be described below in further detail.

A left bracket 280 is connected between the left arm 268 of the rear member 266 and the lower left frame member 260. A left bracket 282 is connected between the left arm 268 of the rear member 266 and the left arm 272 of the upper frame member 270. A left bracket 283 extends upwardly from the left arm 272 above the left bracket 282. The vehicle frame 12 similarly includes a right bracket 280 connected between the right arm 268 of the rear member 266 and the lower right frame member 260. A right bracket 282 is connected between the right arm 268 of the rear member 266 and the right arm 272 of the upper frame member 270. A right bracket 283 extends upwardly from the right arm 272 above the right bracket 282. The brackets 280, 282 enhance the rigidity of the vehicle frame 12. The left and right bracket 283 are connected to the left and right sides respectively of the fuel tank 60 for mounting the fuel tank 60 to the vehicle frame 12 as can be seen in FIGS. 1B and 1C. A bracket 284 having a U-shaped cross-section extends downwardly from the central portion 274 of the rear upper frame member 270 for connecting a front end of the rear suspension assembly 24.

Figure 1E:
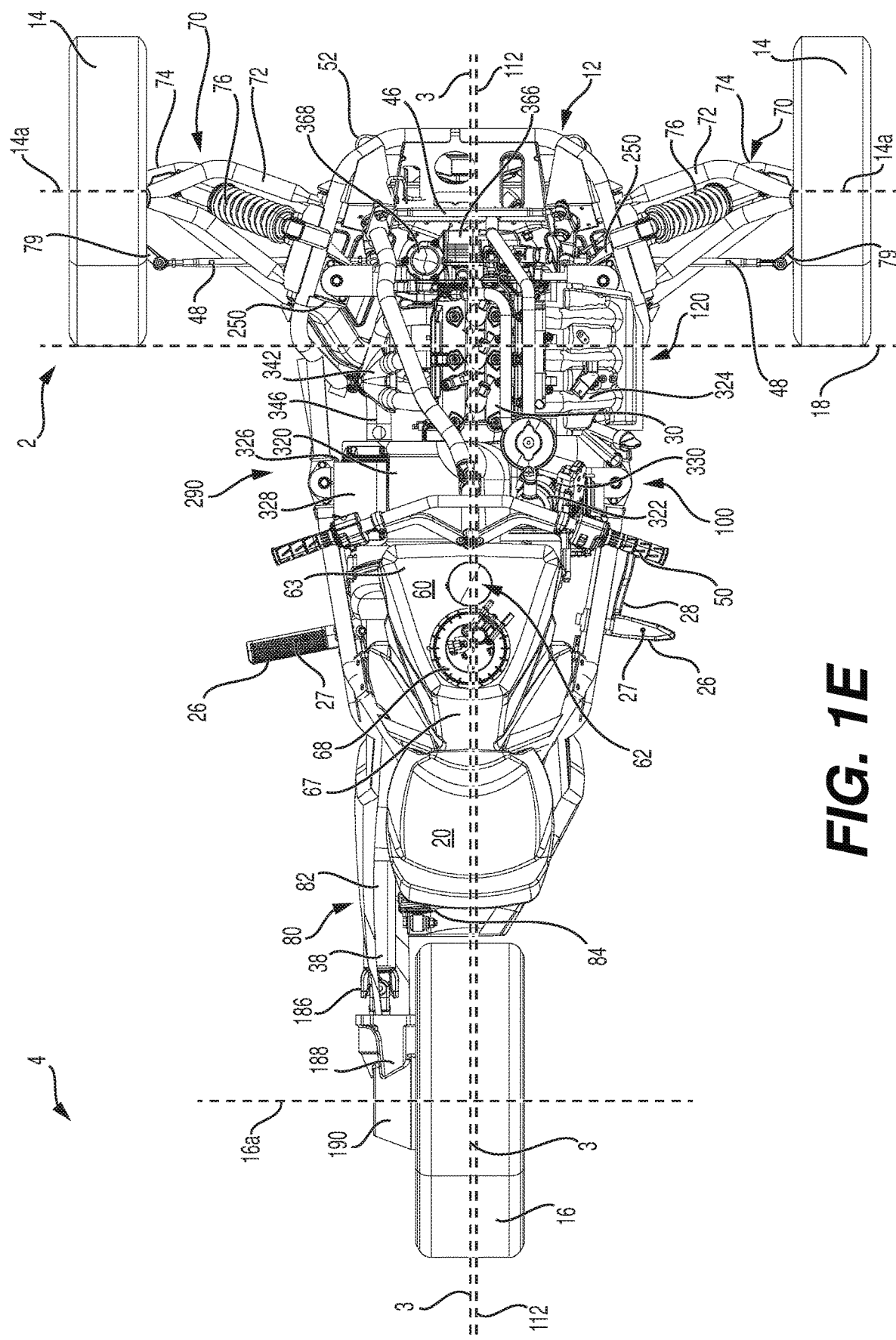
FIG. 1E is a top plan view of the vehicle of FIG. 1A.
Figure 1F:
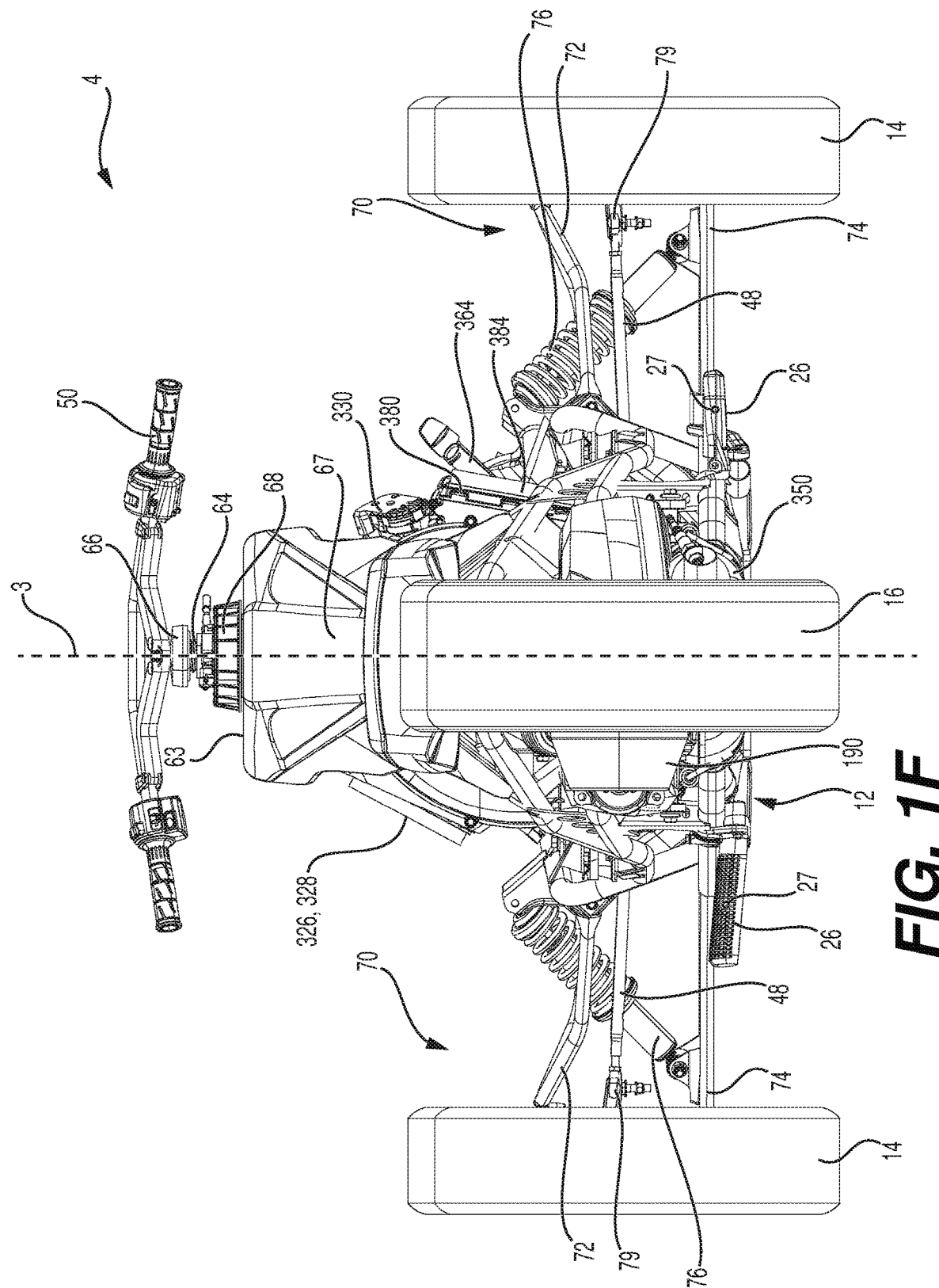
FIG. 1F is a rear elevation view of the vehicle of FIG. 1A.
Figure 1G:
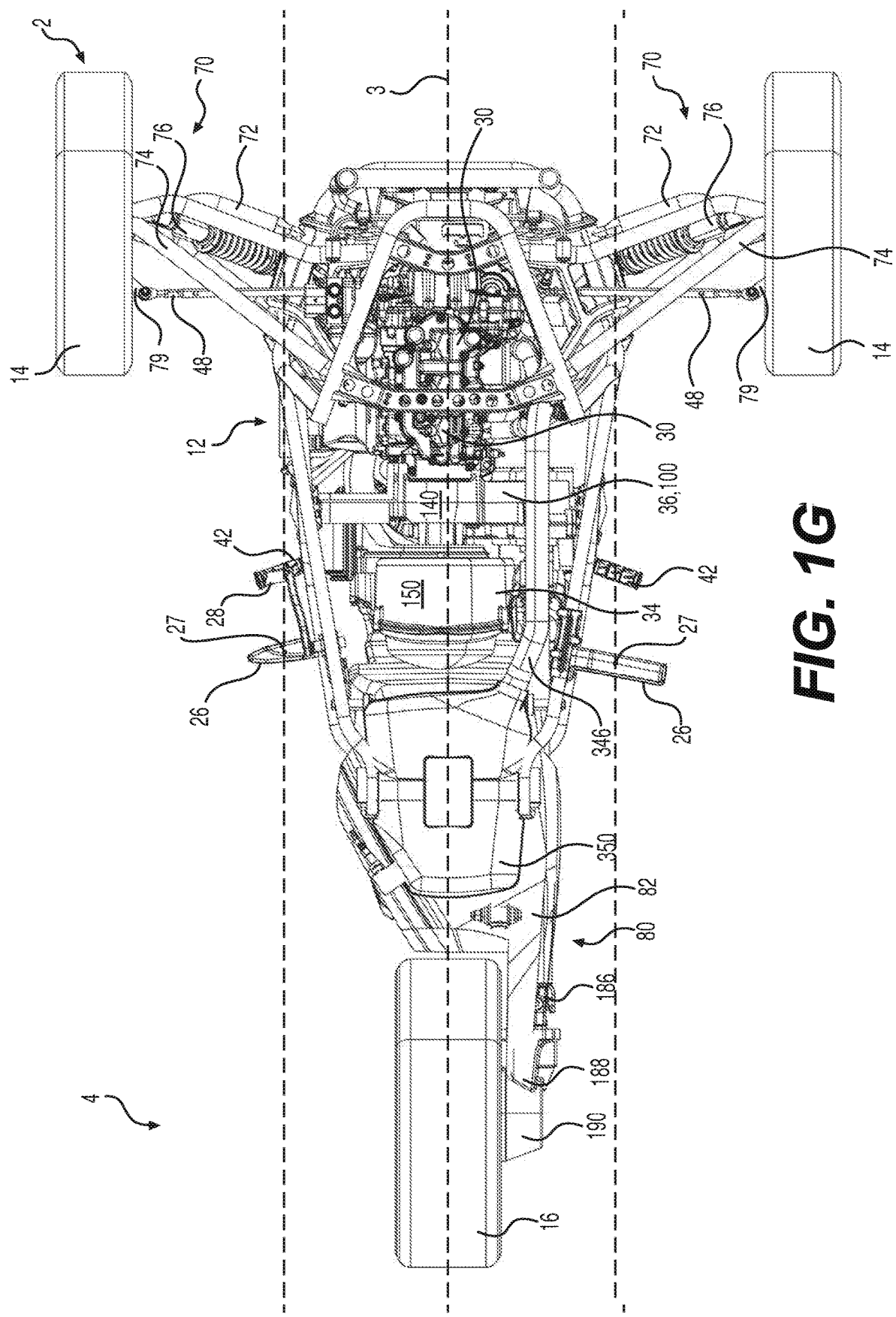
FIG. 1G is a bottom plan view of the vehicle of FIG. 1A.
Figure 1H:
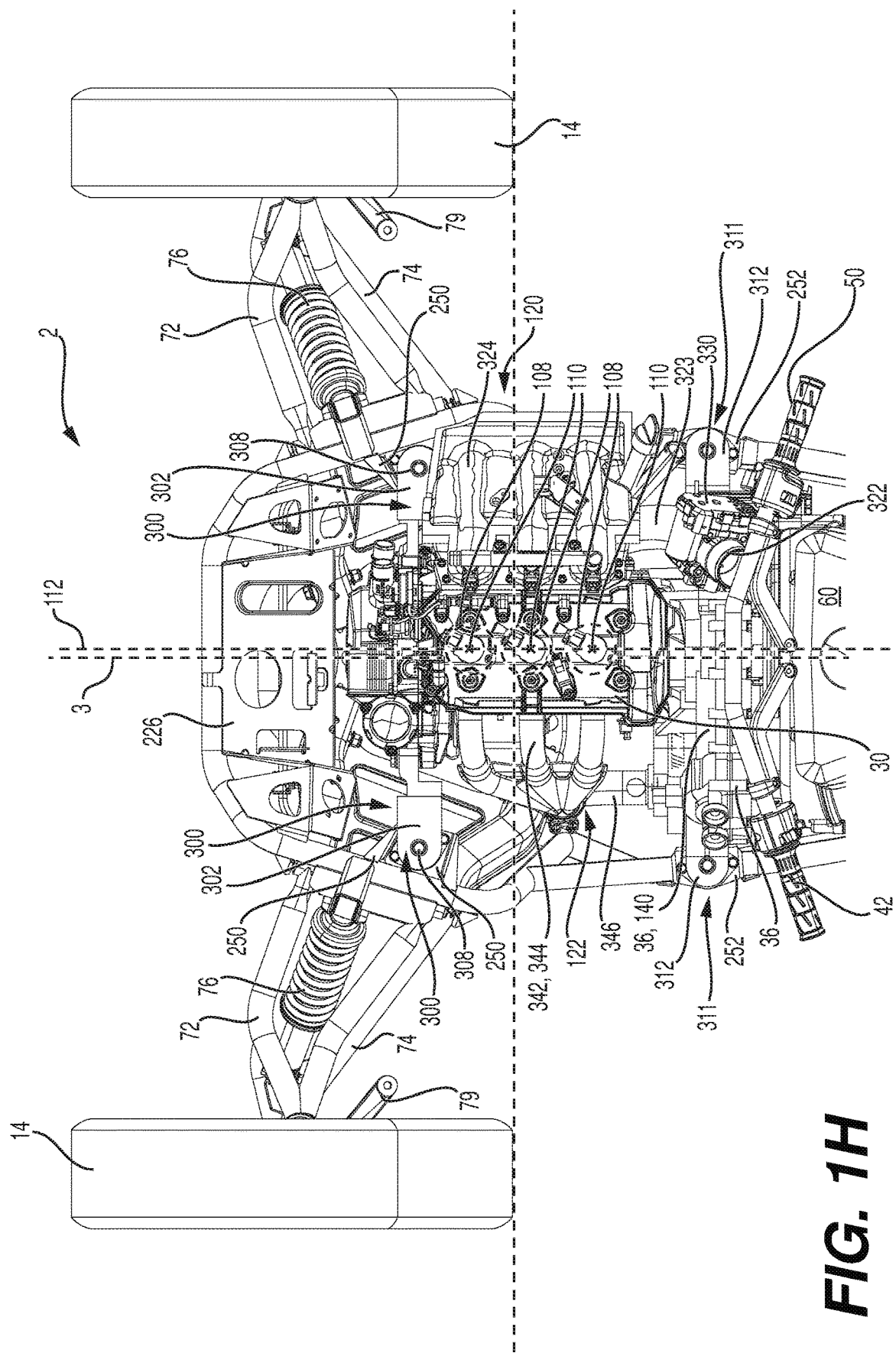
FIG. 1H is a close-up top plan view of a front portion of the vehicle of FIG. 1A.

The vehicle frame 12 defines an engine cradle 290. The engine cradle 290 is defined by the forward frame portion 200, the front portions 276 of the left and right upper frame members 270 and the respective front portions of the left and right lower frame members 260. The engine 30 is disposed in the engine cradle 290 and mounted to the vehicle frame 12 via the front left and right brackets 250 as can be seen in FIGS. 1E and 1H and described below in further detail. The rear brackets 252 are connected to the transfer case 36 as can be seen in FIGS. 1E and 1H and described below in further detail.

Powertrain

The powertrain 100 now be described with reference to FIGS. 1B, 1H, and 4A to 5E.

As mentioned above, the vehicle powertrain 100 is formed by the engine 30, the engine output shaft 32, the CVT 34, the transfer case 36 and the driveshaft 38 in the illustrated implementation of the vehicle 10.

The engine 30 has a crankcase 102, a cylinder block 104 disposed on and connected to the crankcase 102, and a cylinder head assembly 106 disposed on and connected to the cylinder block 104. The crankshaft 31 (shown schematically in FIGS. 5C and 5D) is housed in the crankcase 102.

The cylinder block 104 defines three cylinders 108 (shown schematically in FIG. 5A) d, including a rear cylinder 108, a middle cylinder 108, and a front cylinder 108, defined in the cylinder block 104. Each cylinder 108 defines a cylinder axis 110. A piston (not shown) is disposed inside each cylinder 108 for reciprocal movement therein along the cylinder axis 110. The lower end of each piston is linked by a connecting rod (not shown) to the crankshaft 31. A combustion chamber is defined in the upper portion of each cylinder 108 by the walls of the cylinder 108, the cylinder head assembly 106 and the top of the piston. Explosions caused by the combustion of an air/fuel mixture inside the combustion chambers cause the pistons to reciprocate inside the cylinders 108. The reciprocal movement of the pistons causes the crankshaft 31 to rotate, thereby allowing power to be transmitted from the crankshaft 31 to the rear wheel 16. The cylinder head assembly 106 also includes a fuel injector (not shown) for each cylinder. The fuel injectors receive fuel from a fuel tank 60 via a fuel rail 116. The engine 30 receives air from an air intake system 120 which will be described in further detail below. A spark plug 114 is provided in the cylinder head assembly 106 for each cylinder 108 ignite the air/fuel mixture in each cylinder 108. The exhaust gases resulting from the combustion of the air-fuel mixture in the combustion chamber are removed from the engine 30 and then released to the atmosphere via an exhaust system 122, also described below in further detail.

As can be seen in FIG. 1B, the engine 30 is mounted to the vehicle frame 12 such that, in a projection of the vehicle 10 onto a plane extending vertically and longitudinally, the crankshaft rotation axis 31a is disposed below the rotation plane 15 defined by the wheels 14, 16.

As can be seen in FIGS. 1H and 4B to 5B, the cylinders 108 are arranged in an inline configuration such that the cylinder axes 110 of the three cylinders 108 define a cylinder plane 112 extending generally vertically and longitudinally. In the illustrated implementation, the rotation axis 31a of the crankshaft 31 is contained in the cylinder plane 112. It is contemplated that the crankshaft axis 31a could be offset from the cylinder plane 112. It is also contemplated that the engine 30 could have more than three cylinders 108 or fewer than three cylinders 108. In general, the cylinder plane 112 is defined as a plane containing the respective cylinder axes 110 of the cylinders 108 and either extending parallel to the crankshaft axis 31a or containing the crankshaft axis 31a.

In the illustrated implementation, the cylinder plane 112 is parallel to the longitudinal centerplane 3 and laterally offset therefrom. The cylinder plane 112 is disposed slightly to the right of the longitudinal centerplane 3. It is contemplated that the lateral offset of the cylinder plane 112 with respect to the longitudinal centerplane 3 could be different from that shown herein. For example, the cylinder plane 112 could be disposed on a left side of the longitudinal centerplane 3, or aligned therewith, instead of being on a right side thereof. It is also contemplated that the cylinders 108 could be arranged in an inline configuration such that the cylinder plane 112 could be disposed at an angle with respect to the longitudinal centerplane 3.

As can be seen in FIG. 1H, the engine 30 is mounted to the vehicle frame 12 such that the forwardmost cylinder 108 and a forward portion of the middle cylinder 108 are disposed forward of the front wheel plane 18. It is contemplated that the longitudinal position of the cylinders 108 could be different from that shown herein as long as at least a portion of at least one cylinder 108 is disposed forward of the front wheel plane 18. In the illustrated implementation of the vehicle 10, the footrests 26 and the handlebar 42 are both disposed longitudinally rearwardly of the engine 30.

In the lateral direction, the cylinders 108 of the engine 30 are entirely disposed between the connection of the left footrest 26 to the vehicle frame 12 and the connection of the right footrest 26 to the vehicle frame 12 as can be seen in FIG. 1E. In general, the entire engine 30 is disposed between a center 27 of the left footrest 26 and a center 27 of the right footrest 26. The cylinders 108 of the engine 30 are disposed laterally between the front left and right suspension assemblies 70 in the illustrated implementation of the vehicle 10. In general, at least a portion of at least one cylinder 108 is disposed between the front left and right suspension assemblies 70.

Figure 5A:
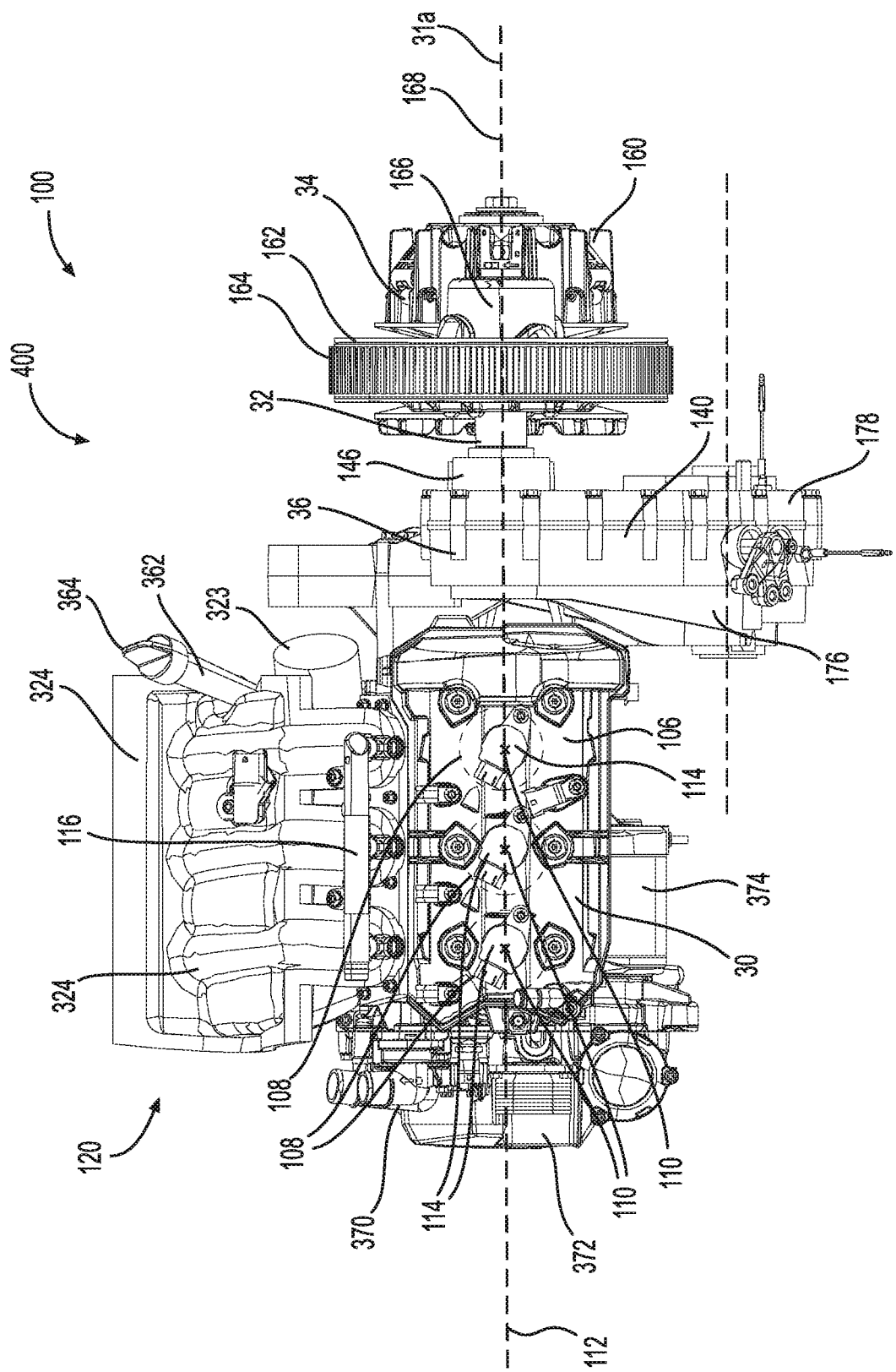
FIG. 5A is a top plan view of a portion of the powertrain of FIG. 4A showing the engine, engine output shaft, transfer case and continuously variable transmission (CVT) of the powertrain of FIG. 4A with the CVT housing being removed for clarity.
Figure 5B:
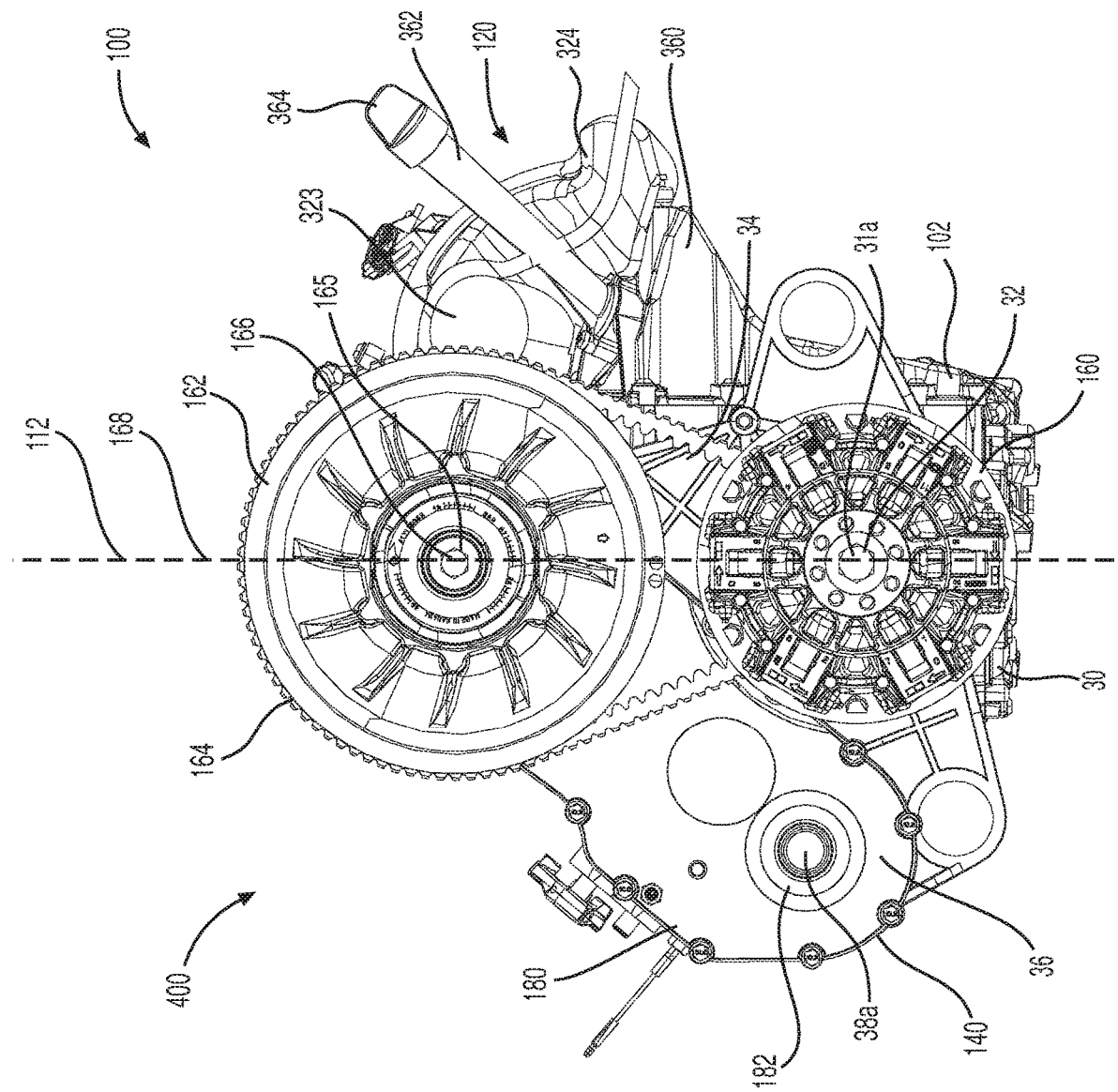
FIG. 5B is a rear elevation view of the powertrain portion of FIG. 5A.
Figure 5C:
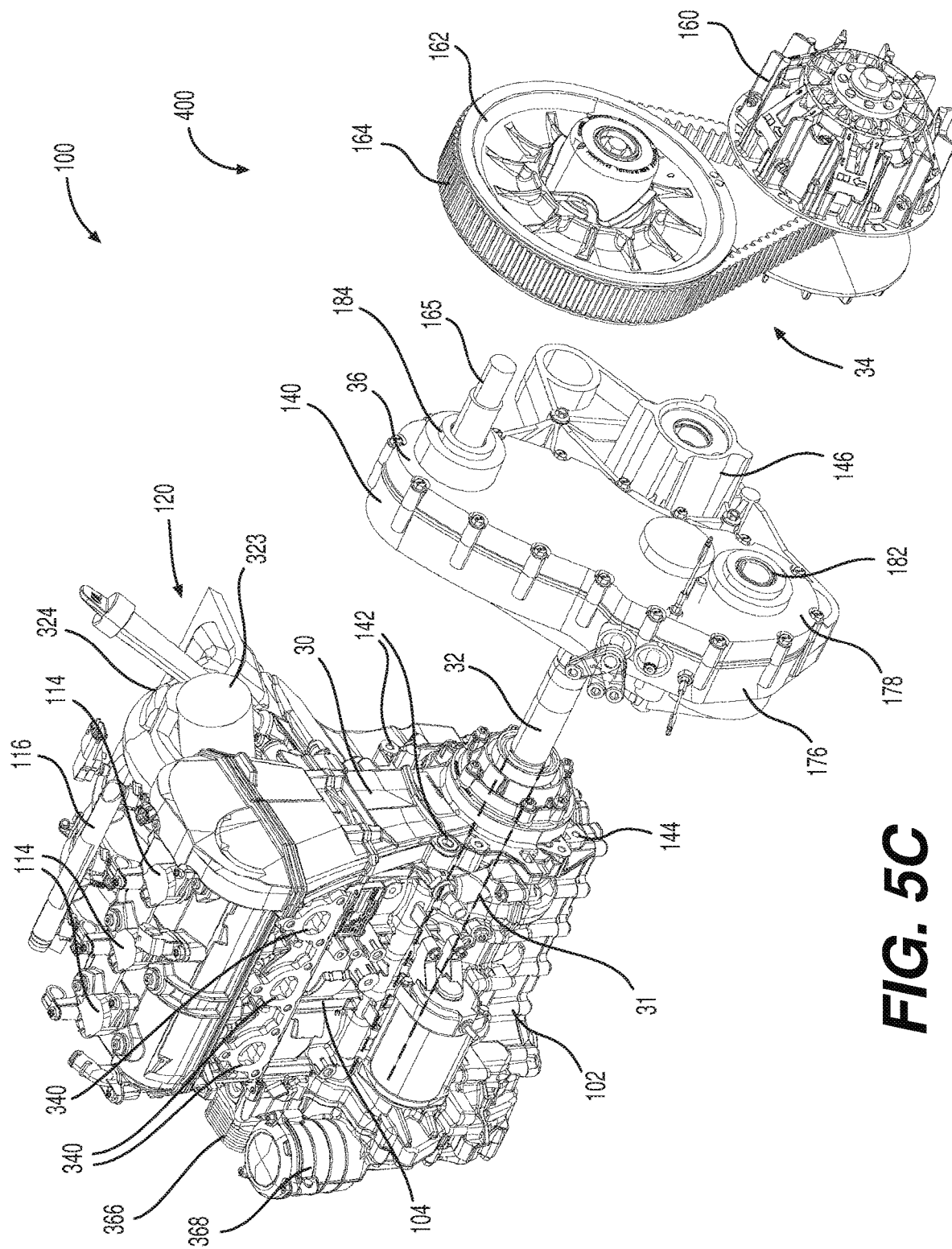
FIG. 5C is an exploded perspective view, taken from a rear, top and left side, of the powertrain portion of FIG. 5A.
Figure 5D:
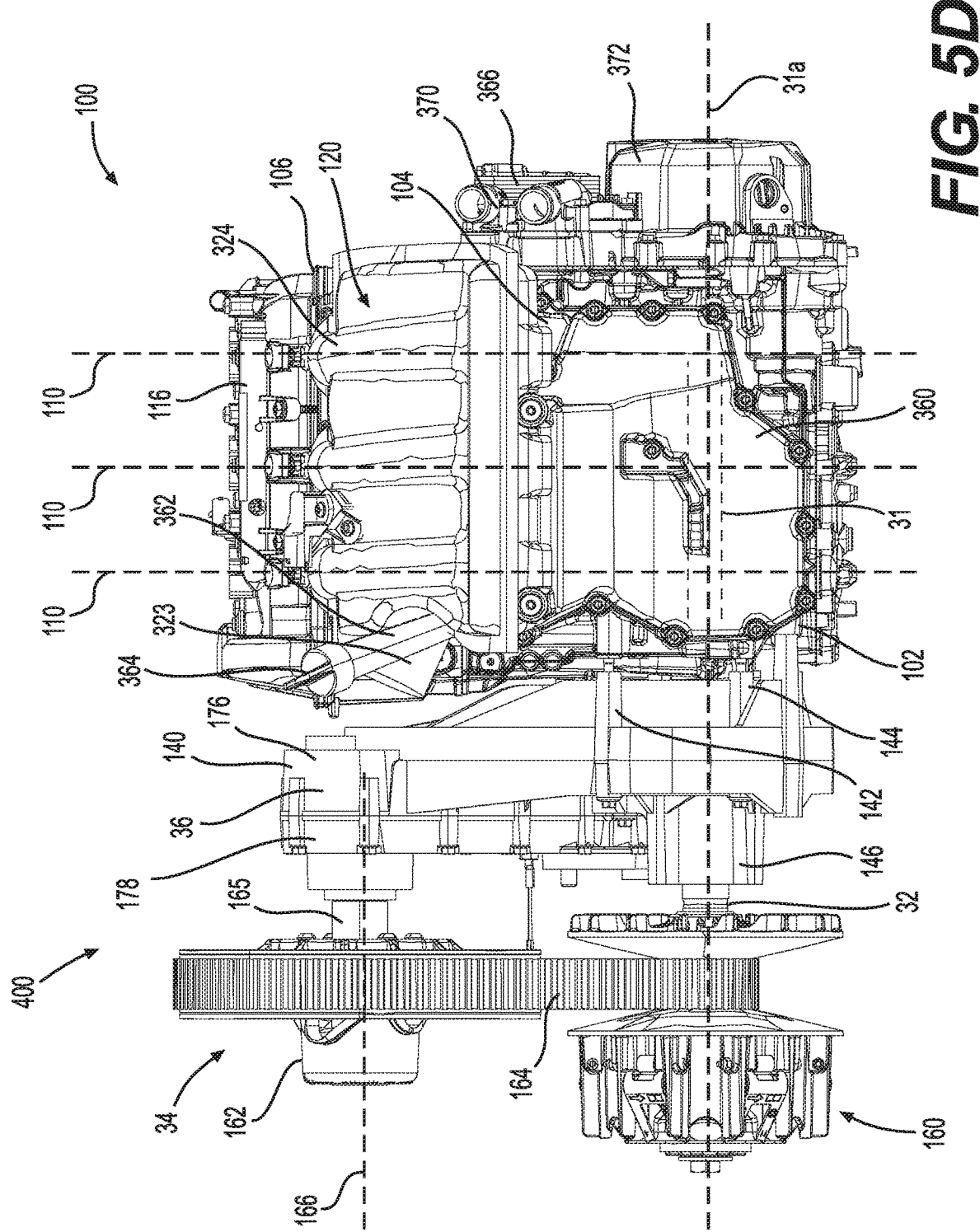
FIG. 5D is right side elevation view of the powertrain portion of FIG. 5A.

With reference to FIGS. 1H, 5C and 5D, the transfer case 36 is disposed longitudinally rearwardly of the engine 30. The transfer case 36 is disposed such that there is an overlap between the transfer case and the engine 30 in the lateral and vertical directions (i.e. when viewed from the rear or from a side). The transfer case 36 includes a transfer case housing 140 which is mounted to the rear end of the engine 30 via boltholes 142 of the cylinder block 104 and boltholes 144 of the crankcase 102 as can be seen in FIGS. 5C and 5D.

With reference to FIG. 5D, the engine output shaft 32 extends rearwardly from the rear end of the crankcase 102, through an engine output shaft housing 146 connected to the transfer case housing 140 to connect to the CVT 34. In the illustrated implementation, the engine output shaft 32 is connected directly to the crankshaft 31 and serves as an extension thereof, but it is contemplated that the engine output shaft 32 could be operatively connected to the crankshaft 31 via one or more gears. It is also contemplated that the engine output shaft 32 could be integrally formed with the crankshaft 31.

With reference to FIGS. 5D and 11D to 11F, the CVT 34 includes a CVT housing 150 disposed longitudinally rearwardly of the transfer case 36. The CVT 34 is disposed such that there is an overlap between the transfer case 36 and the CVT 34 in the lateral and vertical directions (i.e. when viewed from the rear or from a side). The CVT housing 150 includes a front cover 152 and a rear cover 156. The front cover 152 is mounted to the transfer case and the rear cover 156 is removably mounted to the front cover 152. The CVT housing 150 defines a CVT chamber 154 (FIGS. 11E and 11F) between the front and rear covers 152, 156. The front cover 152 includes a rearwardly extending rim that is bolted to a forwardly extending rim of the rear cover 156 by bolts. Two openings 158, 159 (FIG. 11D) are defined in the front cover 152. The engine output shaft 32 extends through the lower opening 158 of the front cover of the CVT housing 150.

With reference to FIGS. 5A to 5D and 11D to 11F, the CVT 34 includes a primary pulley 160, a secondary pulley 162, and a belt 164 wrapped around the primary pulley 160 and the secondary pulley 162 for rotating the secondary pulley 162. The primary pulley 160 is mounted to the rear end of the engine output shaft 32 extending rearwardly from the crankcase 102 so as to rotate therewith. The engine output shaft 32 and the primary pulley 160 are coaxial with the crankshaft 31 and rotate about the crankshaft rotation axis 31a. The primary pulley 160 is disposed in the lower portion of the chamber 154 enclosed by CVT housing 150. The secondary pulley 162 is mounted on the rear end of a shaft 165 (FIG. 5C) which extends through the upper opening 169 of the front cover 152. The secondary pulley 162 rotates about a rotation axis 166 extending parallel to the crankshaft rotation axis 31a. The secondary pulley 162 is disposed above the primary pulley 162 in the illustrated implementation of the vehicle 10. It is however contemplated that the secondary pulley 162 could be disposed in a different position with respect to the primary pulley 160. It is contemplated that the secondary pulley 162 could be disposed lower than the primary pulley 160, for example, if the primary pulley 160 was connected to the engine output shaft 32 indirectly instead of directly as shown herein. A CVT plane 168 (FIG. 5B) containing the respective rotation axes 31a, 166 of the primary pulley 160 and the secondary pulley 162 is disposed parallel to the longitudinal centerplane 3 and on a right side thereof. It is contemplated that the CVT plane 168 could coincide with the longitudinal centerplane 3 and not be laterally offset therefrom. It is contemplated that the CVT 34 could be configured such that the CVT plane 168 extends generally longitudinally and vertically but at a non-zero angle with respect to the longitudinal centerplane 3. In the illustrated implementation of the vehicle 10, the CVT plane 168 coincides with the cylinder plane 112. It is however contemplated that the CVT plane 168 could not coincide with the cylinder plane 112. For example, the CVT plane 168 could be disposed at an angle with respect to the cylinder plane 112. It is also contemplated that other types of continuously variable transmission be used.

As is known, each of the pulleys 160, 162 includes a movable sheave that can move axially relative to a fixed sheave to modify an effective diameter of the corresponding pulley 160, 162. The moveable sheave of the primary pulley 160 has centrifugal weights such that the effective diameter of the primary pulley 160 increases with the rotational speed of the primary pulley. The effective diameters of the pulleys 160, 162 are in inverse relationship. In the illustrated implementation, the CVT 34 is a purely mechanical CVT 34, in which the effective diameter of the primary pulley 160 depends on the rotational speed of the engine output shaft 32 and the crankshaft 31. The belt 164 is made of a fiber-reinforced rubber but it is contemplated that the belt 164 could be made of metal or other suitable material. The rear cover 156 is disposed spaced from the fuel tank 60 so that the rear cover 156 can be easily removed to access the components inside for maintenance and repair.

As can be seen in FIGS. 1A to 1D, 4A, 4B and 11D to 11F, the CVT housing 150 defines a CVT air inlet 380 disposed on a right side of the CVT housing 150 and a CVT air outlet 382 disposed on a left side of the CVT housing 150. Air flows into the CVT chamber 154 via the CVT air inlet 380 which is configured to direct air towards the primary pulley 160. Air flows out of the CVT chamber 154 via the CVT air outlet 382 which is configured to direct air out of the CVT chamber 154 in a downward direction. The CVT air inlet 380 is covered with an air filter 384 to prevent dust and debris from the entering the CVT chamber 156. As can be seen, the CVT air inlet 380 is facing rightwardly. In some implementations, the CVT air inlet 380 is connected to a CVT air duct 410 to direct air from a front of the vehicle 10 into the CVT air inlet 380. The CVT air duct 410 is connected to the CVT housing 150 such that an air outlet 412 of the CVT duct 410 connects to the CVT air inlet 380. From the CVT air inlet 380, the CVT air duct 410 extends forwardly on a right side of the transfer case housing 140 to a forwardly facing air inlet 414. In the illustrated implementation, the CVT air duct 410 is formed integrally with an engine air duct 420 which will be described below in further detail.

Figure 5E:
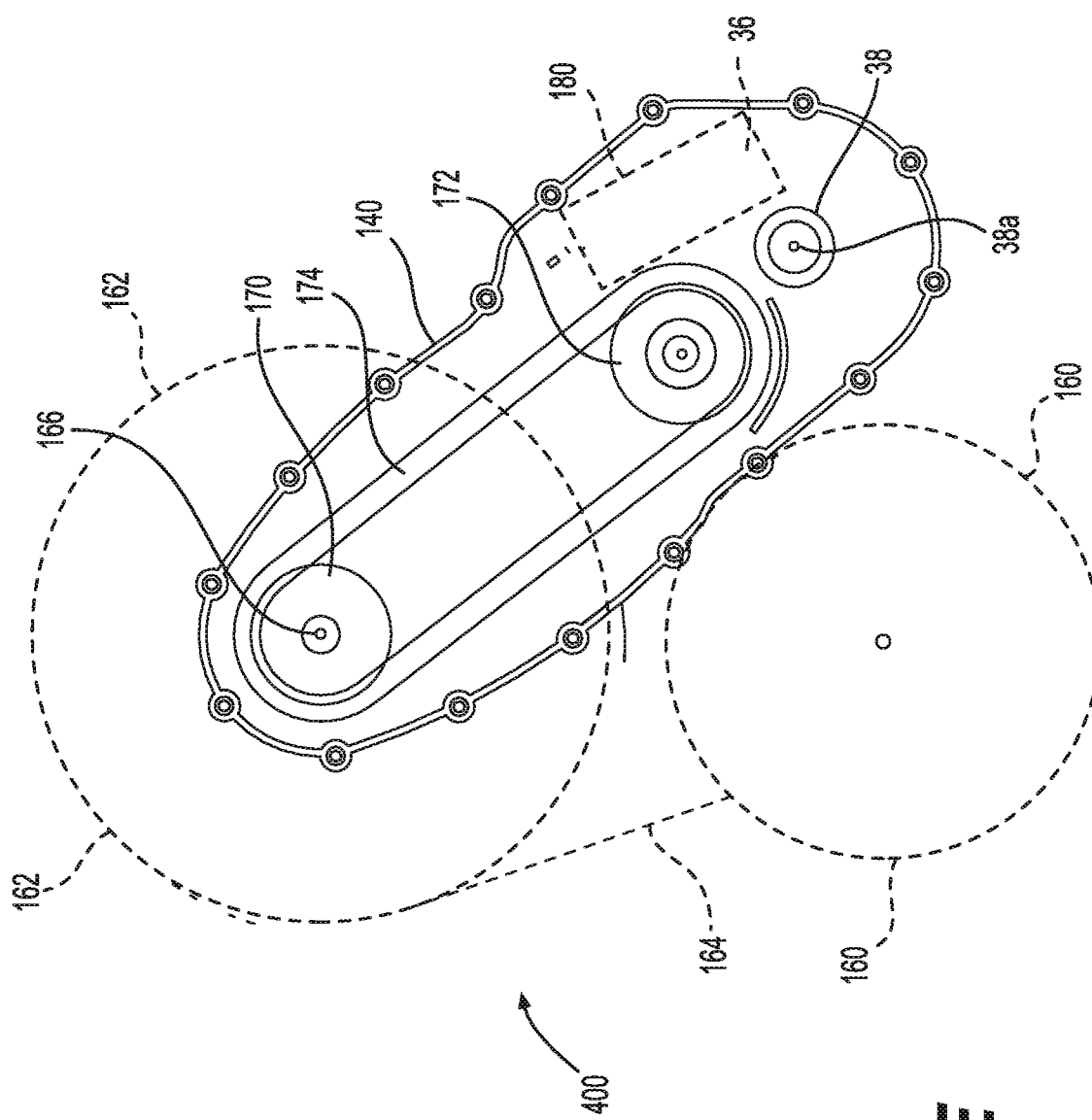
FIG. 5E is a schematic front elevation view of the transfer case, CVT, gear selection assembly and driveshaft of the powertrain of FIG. 4A.
Figure 6A:
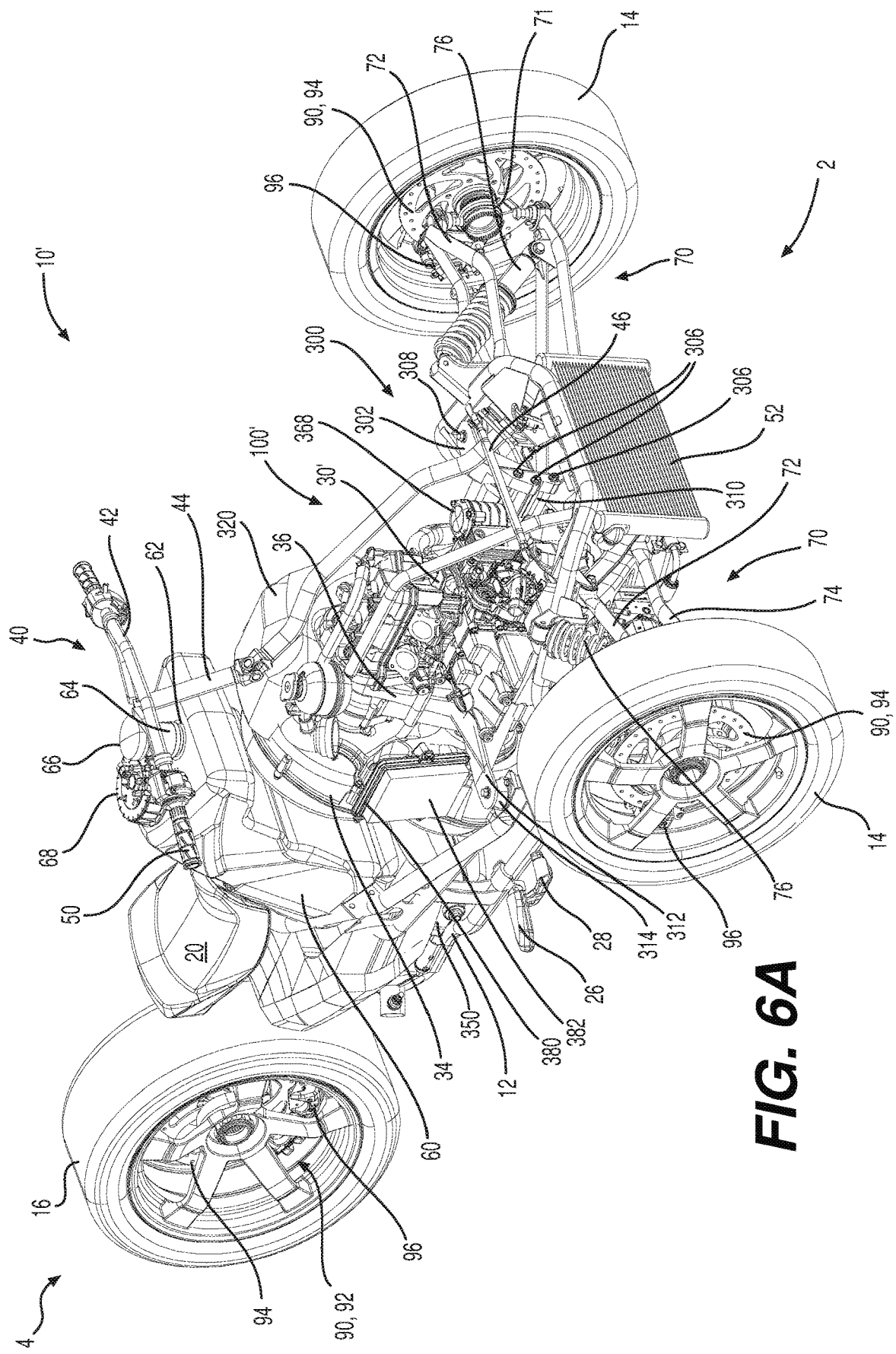
FIG. 6A is a is a perspective view, taken from a front, top and right side, of another three-wheeled straddle-seat vehicle in accordance with an implementation of the present technology with the fairings thereof being removed for clarity.
Figure 6B:
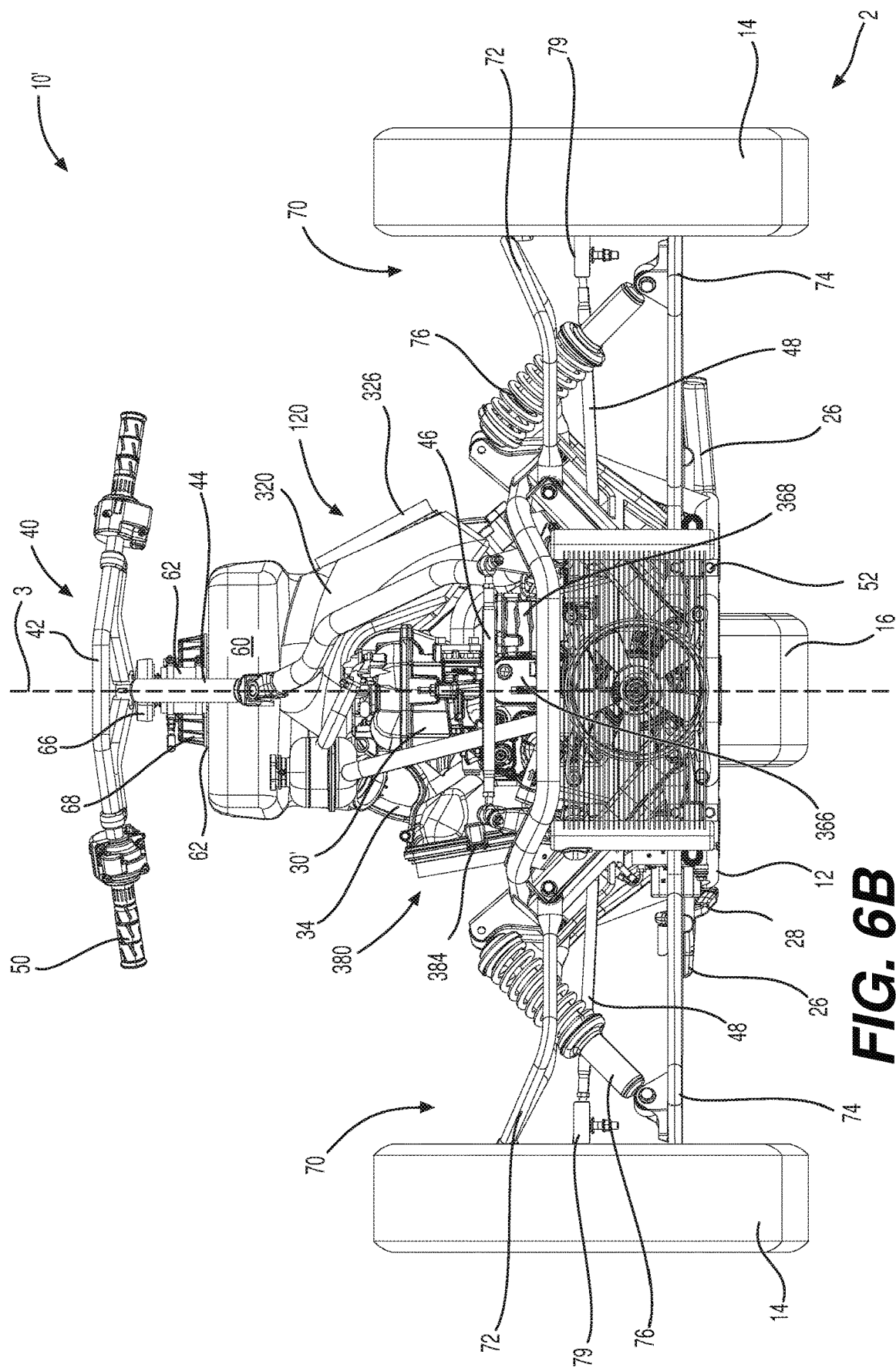
FIG. 6B is a front elevation view of the vehicle of FIG. 6A.

With reference now to FIG. 5E, the transfer case 36 includes an input sprocket 170, an output sprocket 172, and a chain 174 enclosed by the transfer case housing 140. The output sprocket 172 is operatively connected to the input sprocket 170 by the chain 174. It is also contemplated that the output sprocket 172 could be driven by the input sprocket 170 via a belt or a gear train. The input sprocket 170 is disposed coaxially with the secondary pulley 162 and forwardly thereof. The input sprocket 170 is mounted to the front end of the shaft 165 (FIG. 5C) so as to be driven by the secondary pulley 162. The output sprocket 172 is disposed vertically below the input sprocket 170 and laterally offset toward the left side thereof. As can be seen in FIGS. 5A and 5C, the transfer case housing 140 includes a front cover 176 that is bolted to the engine 30 and a rear cover 178 that is bolted to the front cover 152 of the CVT housing 150. The rear cover 178 has a forwardly extending rim that is bolted to a rearwardly extending rim of the front cover 176. The rear cover 178 defines an upper opening 184 (FIG. 5C) for receiving the shaft 165 and a lower opening 182 (FIGS. 5B and 5C) for receiving a front end of the driveshaft 38.

The output sprocket 172 selectively engages the driveshaft 38 via the gear selection assembly 180 (shown schematically in FIG. 5E) for rotating the driveshaft 38 and thereby the rear wheel 16. The gear selection assembly 180 is disposed inside the transfer case housing 140 in the illustrated implementation of the vehicle 10. It is however contemplated that the gear selection assembly 180 could be disposed outside the transfer case housing 140.

The front end of the driveshaft 38 is enclosed by the transfer case housing 140 and is splined to enable the gear selection assembly 180 to engage the driveshaft 38 for rotating the driveshaft 38. The driveshaft 38 extends longitudinally and rearwardly out of the opening 182 (FIGS. 5B and 5C) in the transfer case housing 140 towards the rear wheel 16.

Still referring to FIG. 5E, the gear selection assembly 180 causes selective engagement of the driveshaft 38 with the output sprocket 172 based on a gear selection operator (not shown). In the illustrated implementation of the vehicle 10, the gear selection operator is in the form of a paddle disposed near the left hand grip of the handlebar 42. The gear selection operator allows selection of one a forward gear, reverse gear and a neutral gear. It is contemplated that the gear selection operator could be in the form of a knob, a switch, one or more buttons, and the like. When the forward gear is selected, the output sprocket 172 engages the driveshaft 38 so as to rotate the driveshaft 38 in the same rotational direction as the output sprocket 172. When the reverse gear is selected, the output sprocket 172 engages the driveshaft 38 via an idler gear (not shown) so as to rotate the driveshaft 38 in the opposite direction as the output sprocket 172. When the neutral gear is selected, the output sprocket 172 is disengaged from the driveshaft 38. The gear selection assembly 180 therefore comprises a combination of gears, slidable sleeves, and the like for causing selective engagement of the driveshaft 38 by the output sprocket 172.

Figure 4A:
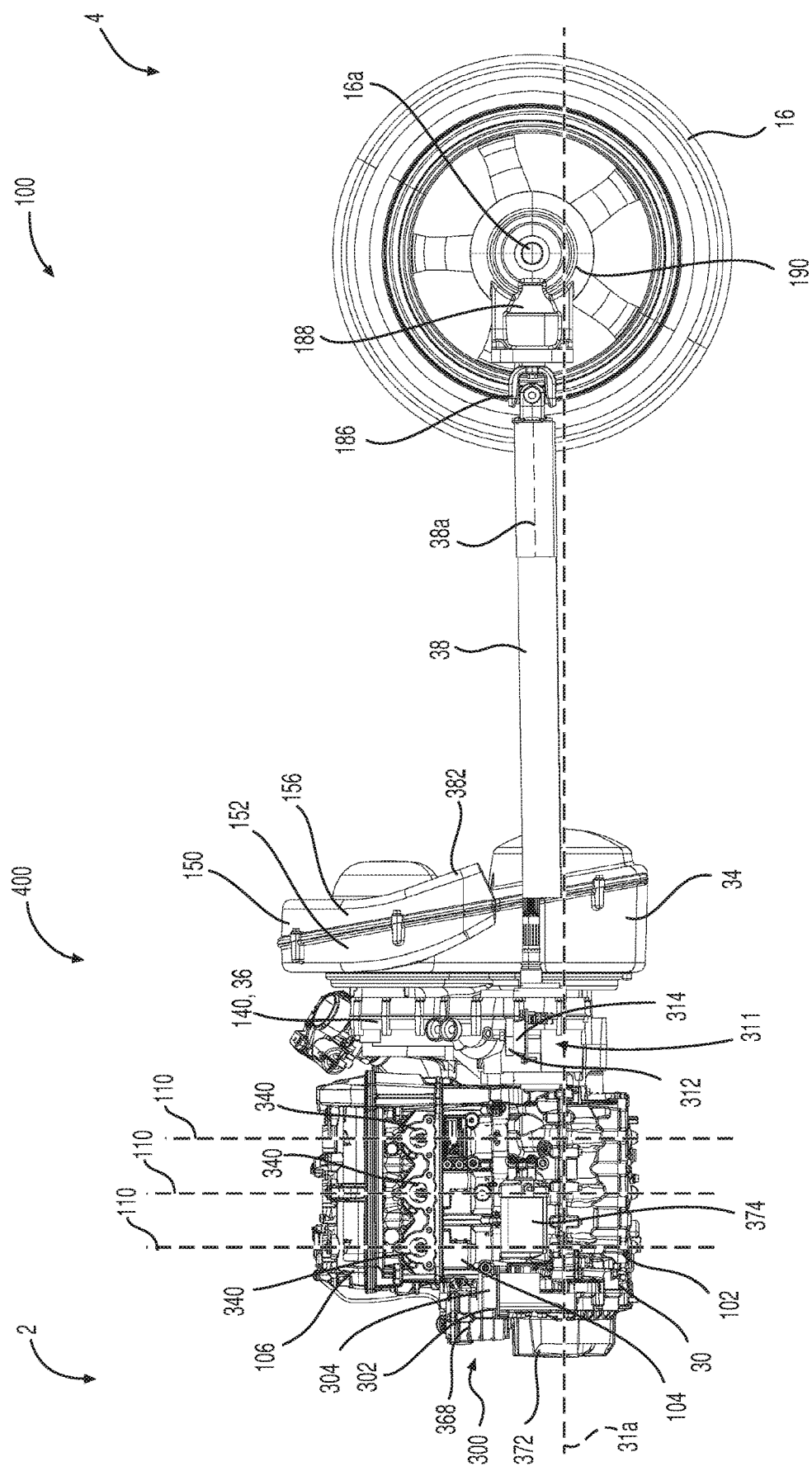
FIG. 4A is a left side elevation view of the powertrain, engine mounting assemblies, and rear wheel of the vehicle of FIG. 1A.
Figure 4B:
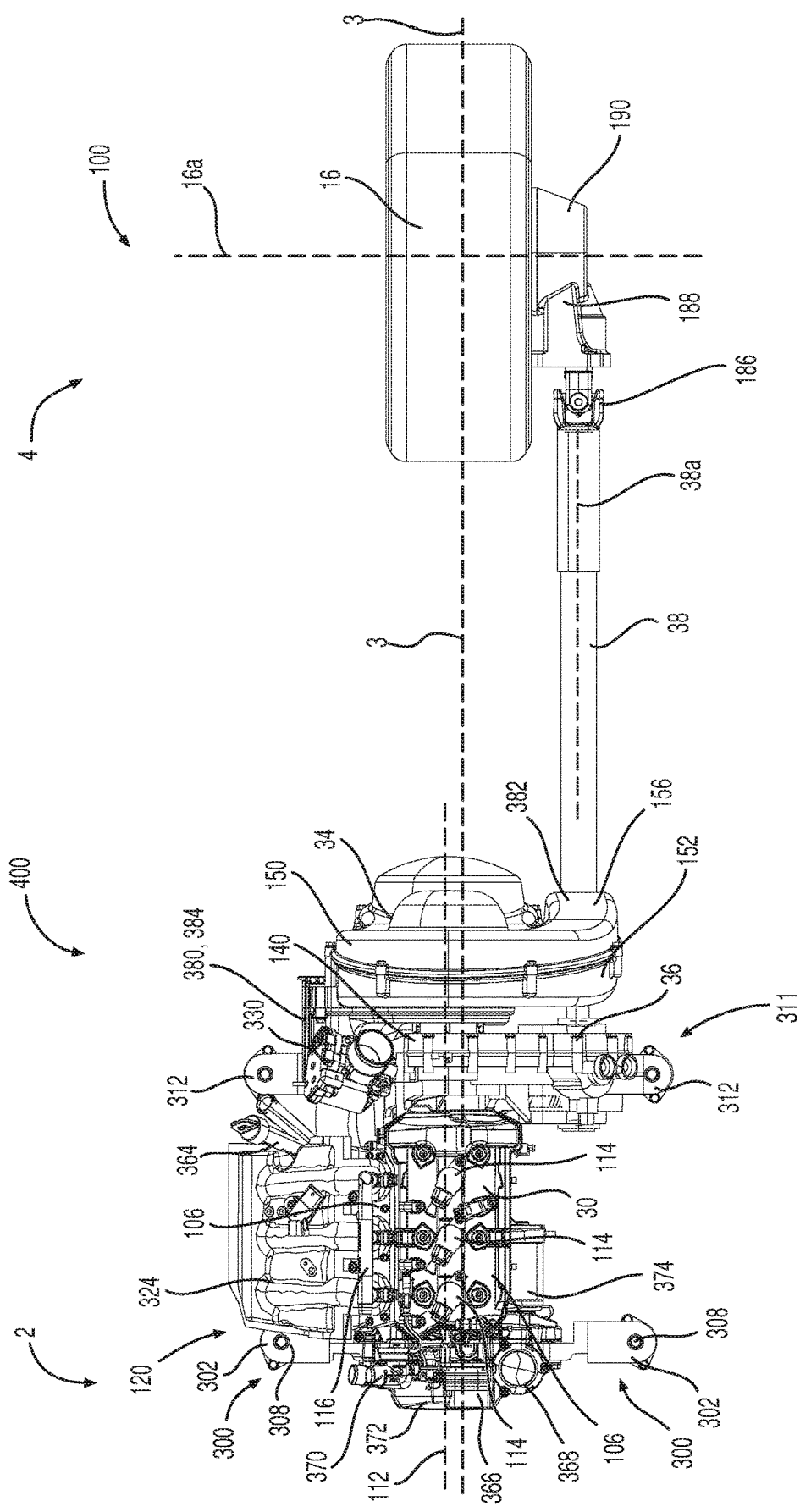
FIG. 4B is a top plan view of the powertrain, engine mounting assemblies, and rear wheel of FIG. 4A.

Referring now to FIGS. 4A and 4B, the driveshaft 38 extends longitudinally on a left side of the longitudinal centerplane 3. The rear end of the driveshaft 38 is connected via a universal joint 186 to a pinion 188. The pinion 188 engages a bevel gear 190 fixed to the hub of the rear wheel 16. It is contemplated that the universal joint 186 could be enclosed inside a flexible boot to prevent entry of dirt and debris into the joint. The universal joint 186 allows the rear end of the driveshaft 38 to drive the rear wheel 16 without inhibiting motion of the rear wheel 16 about the rear suspension assembly 80 as the vehicle 10 moves over uneven terrain. It is contemplated that the universal joint 186 could be connected to the front end of the driveshaft 38 instead of the rear end thereof. The pinion 188 transmits rotation of the driveshaft 38 about a generally longitudinal axis 38a to the rear wheel 16 which rotates about a generally lateral axis 16a.

With reference to FIG. 1B, the driveshaft 38 is disposed vertically higher than the footrests 26 when the vehicle 10 is placed on level ground with no driver, passengers, or cargo. With reference to FIG. 4A, a central rotational axis 38a of the driveshaft 38 is disposed vertically higher than a central rotational axis 31a of the engine output shaft 32 when the vehicle 10 is placed on level ground with no driver, passengers, and/or cargo.

It is contemplated that the driveshaft 38 could be omitted and the output sprocket 172 of the transfer case 36 could be connected to the rear wheel 16 via a chain or belt instead of the driveshaft 38.

In the illustrated implementation, the CVT 34, the transfer case 36 and the gear selection assembly 180 form a transmission assembly 400 of the vehicle 10. It is contemplated that the gear selection assembly 180 could be omitted from the vehicle 10. It is also contemplated that the vehicle 10 could have a transmission assembly 400 in which the CVT 34, the transfer case 36 and the gear selection assembly 180 are replaced by a discrete gear transmission.

Mounting of the Powertrain to the Vehicle Frame

The mounting of the powertrain 100 to the vehicle frame 12 will now be described with reference to FIGS. 1H, 4A, 4B and 10A.

As can be seen in FIG. 1H, a front portion of the engine 30 is mounted to the front left and right engine mounting brackets 250 of the vehicle frame 12 by a front left mounting assembly 300 and a front right mounting assembly 300 respectively.

Figure 4C:
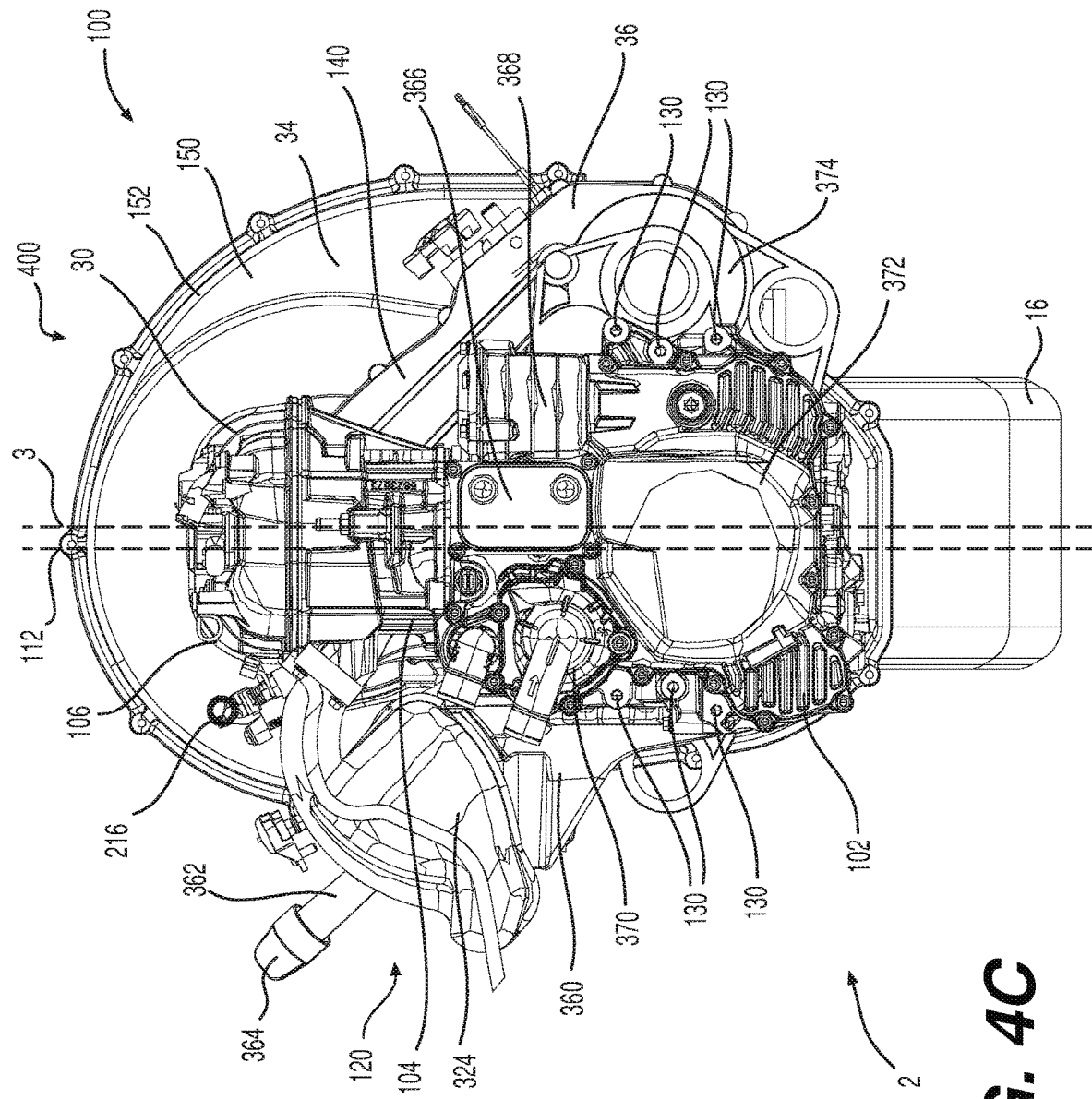
FIG. 4C is a front elevation view of the powertrain and rear wheel of FIG. 4A.

As can be seen in FIG. 4C, three left boltholes 130 are defined in the engine 30 in a front left portion of the crankcase 102 for connection to the left bracket 250 and three right boltholes 130 are defined in a front right portion of the crankcase 102 for connection to the right bracket 250.

Figure 10A:
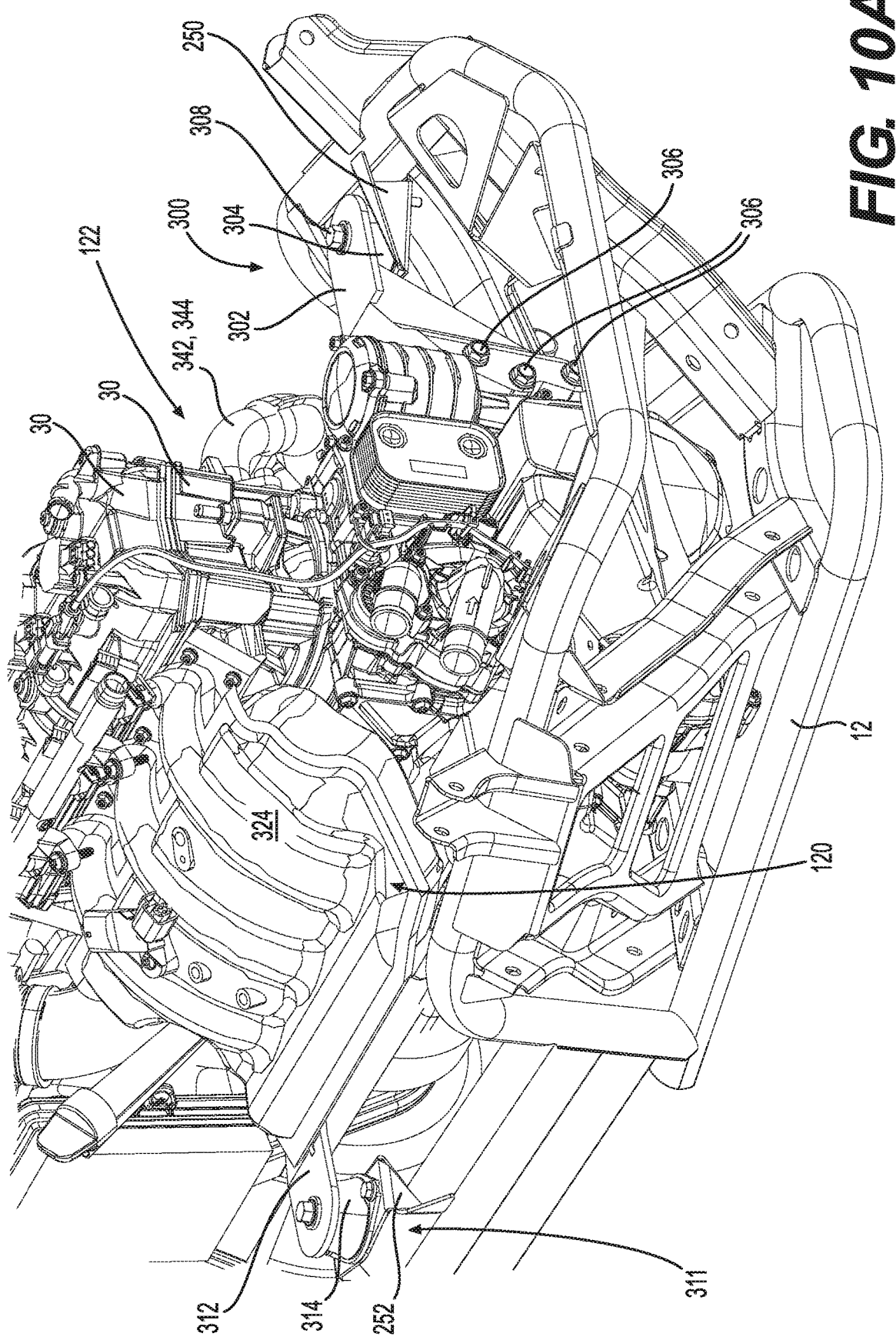
FIG. 10A is a close-up perspective view, taken from a front, top and right side, of a portion of the vehicle of FIG. 1A showing the mounting of the engine and transmission assembly to the vehicle frame.
Figure 10B:
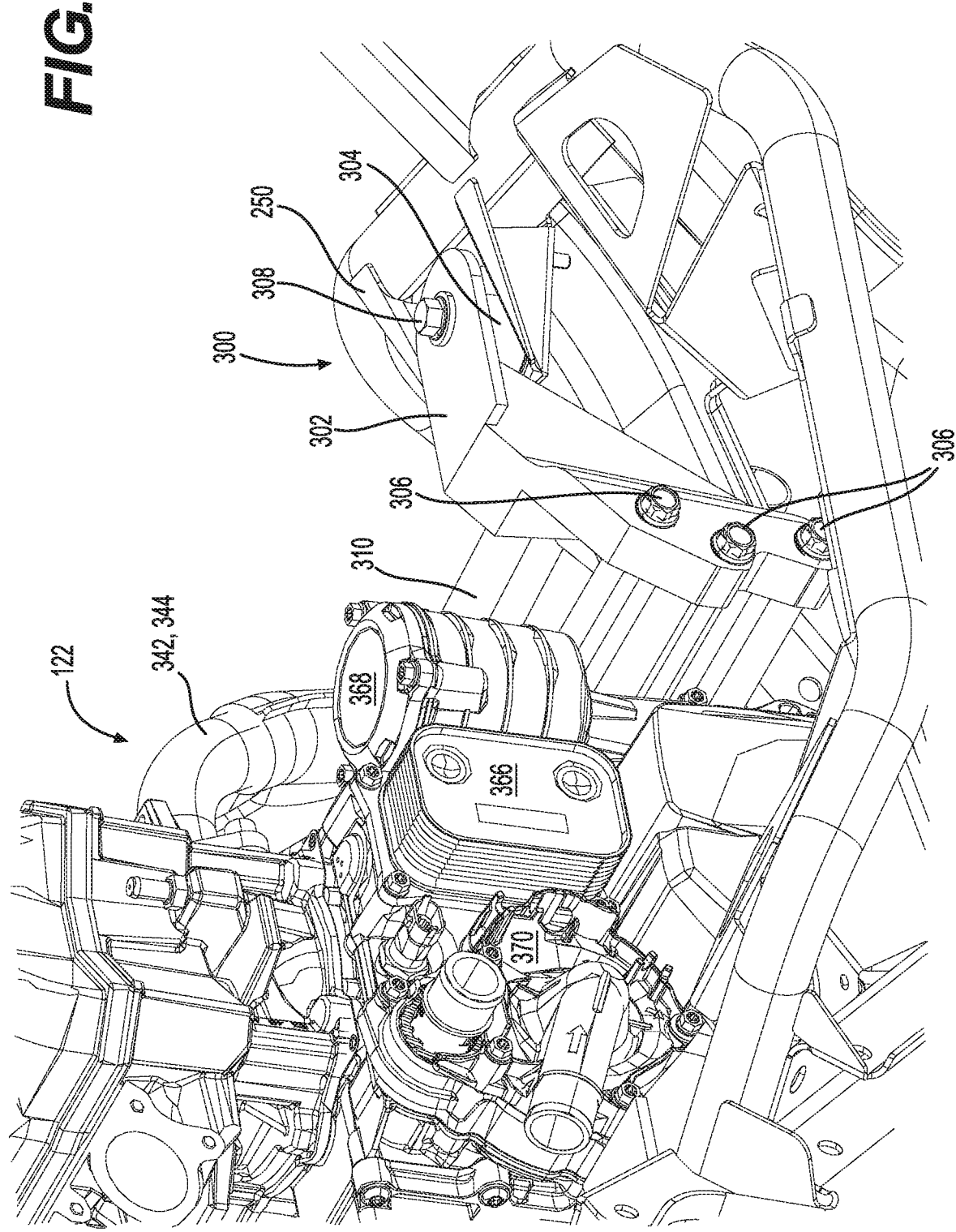
FIG. 10B is a close-up perspective view, taken from a front, top and right side, of a portion of the vehicle of FIG. 6A showing the mounting of the engine to the vehicle frame.
Figure 11A:
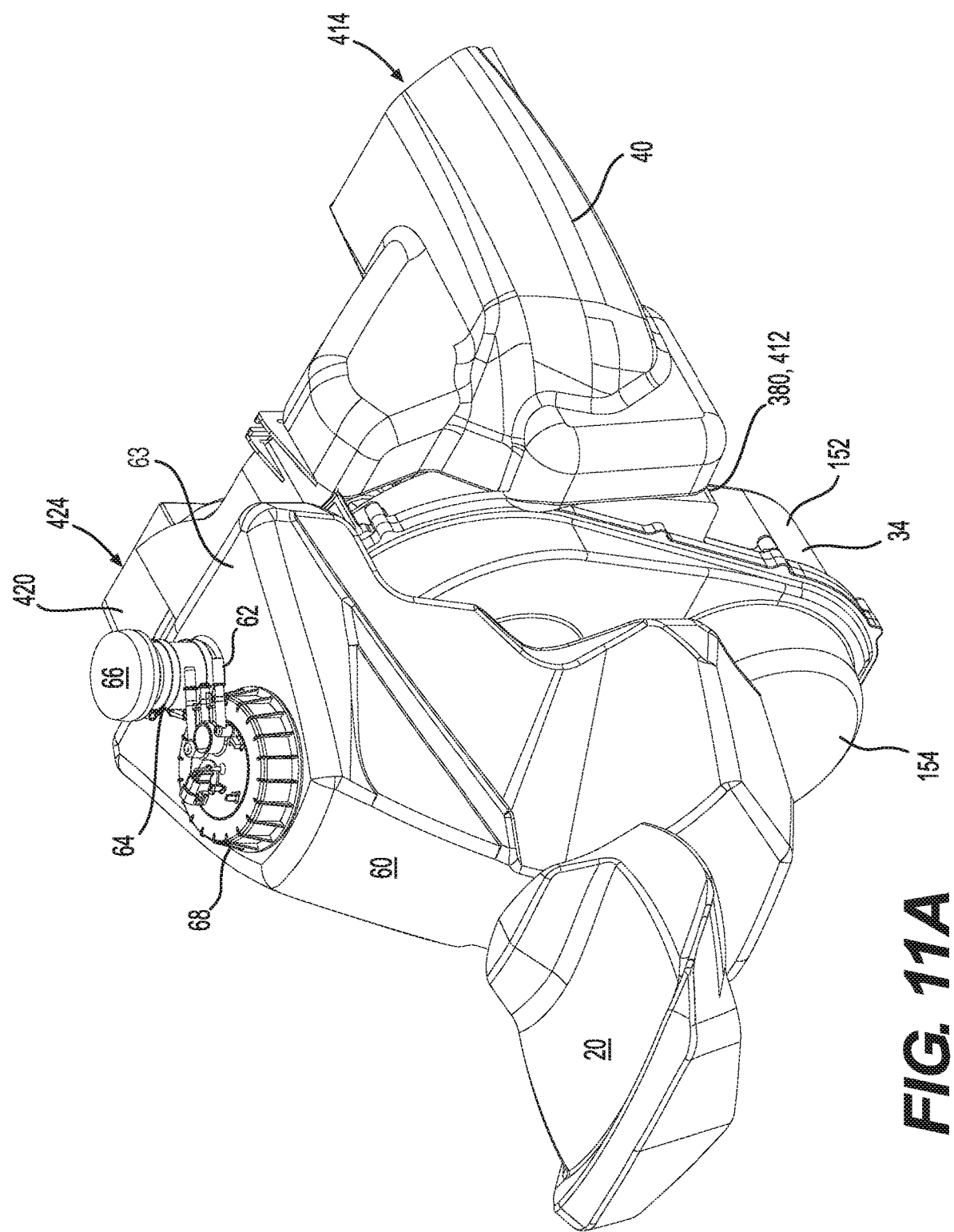
FIG. 11A is a perspective view, taken from a rear, top and right side, of the seat, fuel tank, CVT, a CVT air duct and an engine air duct of the vehicle of FIG. 1A.
Figure 11B:
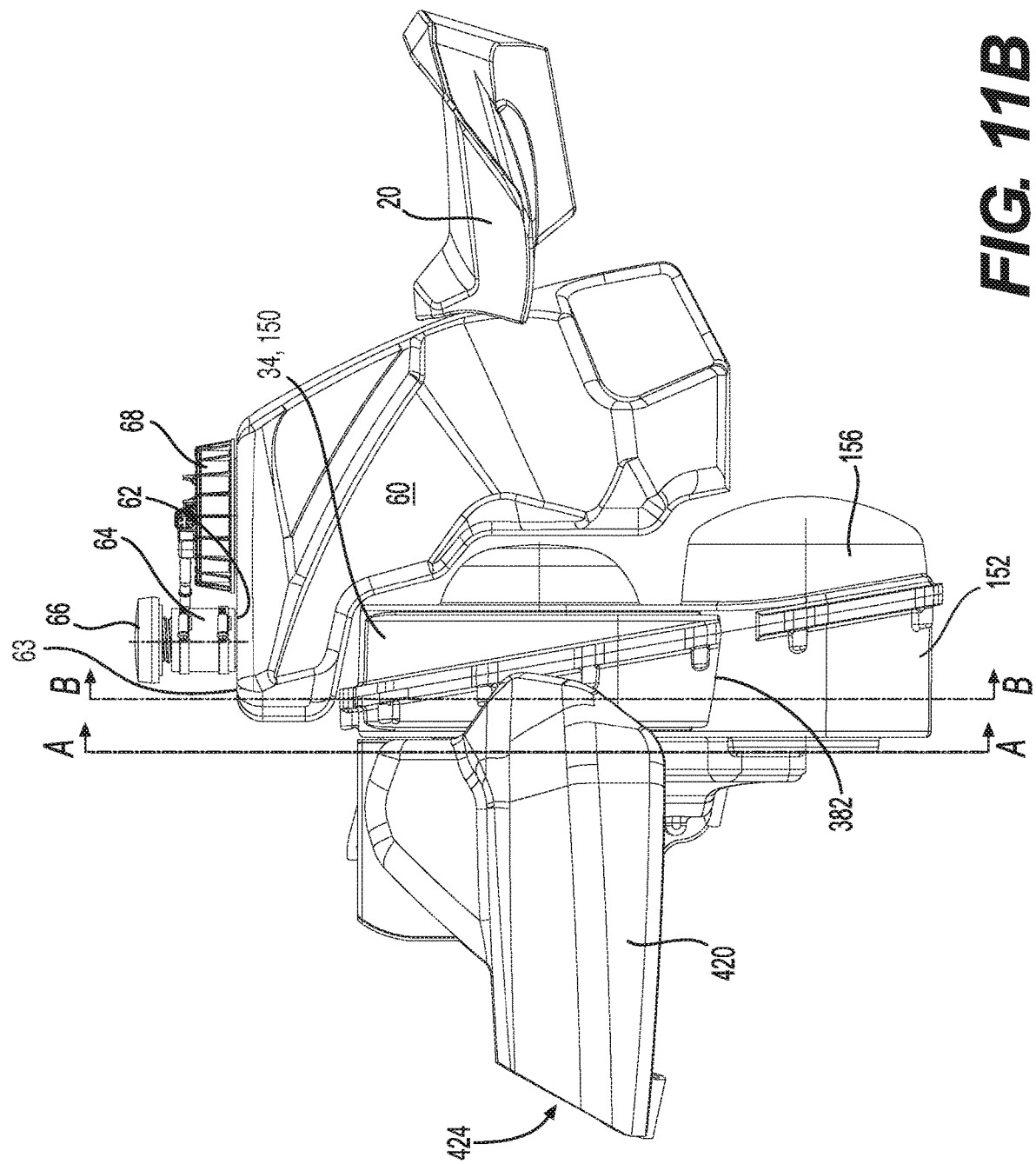
FIG. 11B is a left side elevation view of the seat, fuel tank, CVT, CVT air duct and engine air duct of FIG. 11A.
Figure 11C:
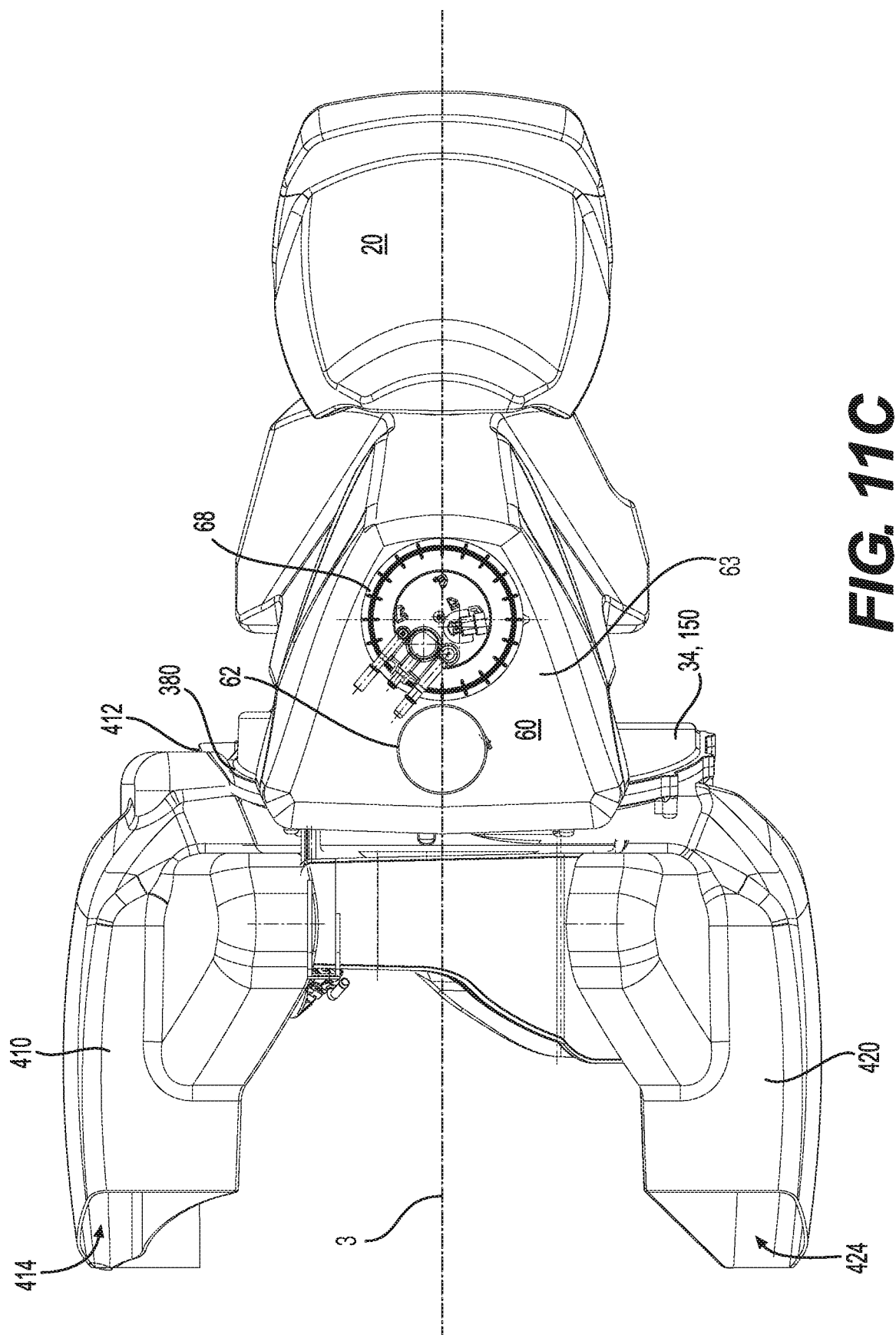
FIG. 11C is a top plan view of the seat, fuel tank, CVT, CVT air duct and engine air duct of FIG. 11A.
Figure 11D:
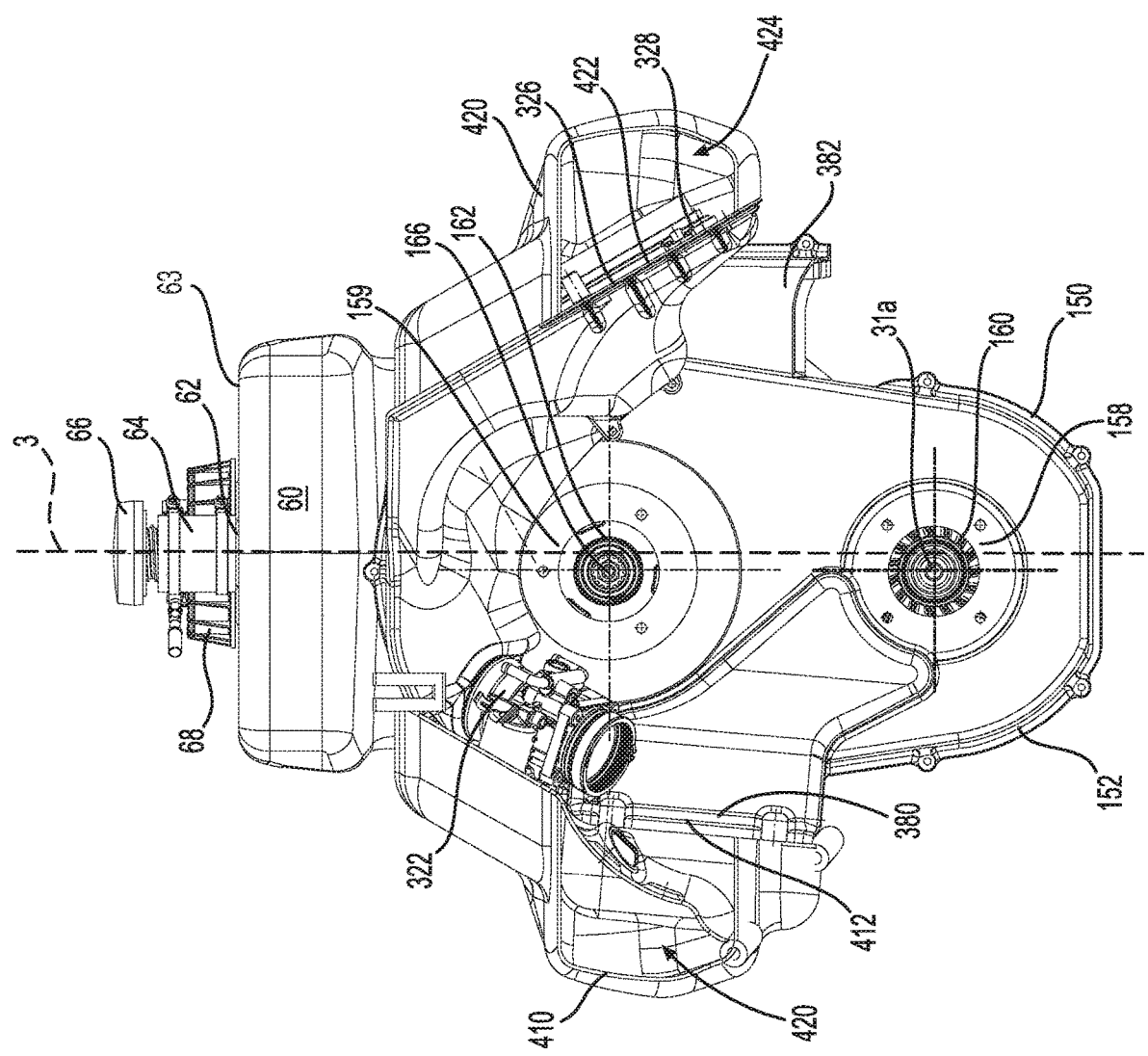
FIG. 11D is a front elevation view of the seat, fuel tank, CVT, CVT air duct and engine air duct of FIG. 11A.

With reference to FIG. 10A, the front left mounting assembly 300 comprises a bracket 302, a vibration damping element 304, three engine bolts 306 and a frame bolt 308. The bracket 302 has a horizontally extending flange with a central bolthole and a vertical flange (not shown) having three boltholes corresponding to the left boltholes 130 of the engine 30. The bracket 302 is made of metal or other suitable material. The vibration damping element 304 is in the form of a ring made of rubber. It is however contemplated that the vibration damping element 304 could be made of other suitable material. The vibration damping element is commonly referred to as a "motor mount".

The vibration damping element 304 is sandwiched between the engine mounting bracket 250 and the bracket 302 in order to isolate the engine 30 from the vehicle frame 12. The frame bolt 308 connects the vibration damping element 304 to the bracket 302 and the vibration damping element 304 is connected to the front left bracket 250 of the vehicle frame 12 by other bolts (not shown).

The engine 30 is disposed in the engine cradle 290 such that the left boltholes 130 are aligned with corresponding boltholes of the vertical flange of the bracket 302. The engine bolts 306 are inserted through the aligned boltholes of the bracket 302 and the left boltholes 130 of the engine 30 to secure the engine 30 to the vehicle frame 12.

The front right mounting assembly 300 comprises a bracket 302, a vibration damping element 304, three engine bolts 306 and a frame bolt 308 similar to the corresponding components of the front left mounting assembly 300. The front right mounting assembly 300 secures the engine 30 to the front right bracket 250 of the vehicle frame 12 in the same manner as described above for the front left assembly 300. As such, the front right mounting assembly 300 will not be described herein in detail.

It is contemplated that configuration of the left boltholes 130 on the left side of the crankcase 102 and/or the right boltholes 130 on the right side of the crankcase 102 could be different from that shown herein. It is also contemplated that the front portion of the engine 30 could be mounted to the vehicle frame 12 by a single bracket 250 disposed laterally centrally and a single mounting assembly 300 including a single vibration damping element 304 rather than the pair of left and right brackets 250 and the corresponding pair of left and right mounting assemblies 300 as shown herein.

With reference to FIGS. 1H, 4A and 4B, the left side of the transfer case housing 140 is connected to the rear left bracket 252 of the vehicle frame 12 using a bracket 312 and a vibration damping element 314 similar to the vibration damping element 304 described above. The vibration damping element 314 is disposed on the rear left bracket 252. The bracket 312 and the vibration damping element 314 form a rear left mounting assembly 311 which are secured to the rear left bracket 252 in the same manner as described above for the front left and right assemblies 300.

The right side of the transfer case housing 140 is connected to the rear right bracket 252 of the vehicle frame via a bracket 312 and a vibration damping element 314 of a rear right mounting assembly 311 similarly as described above for the left side of the transfer case housing 140, and as such will not be described again herein in detail.

In the illustrated implementation of the vehicle 10, the components of the powertrain 100, i.e., the engine 30, the CVT 34 and the transfer case 36, are all secured to the vehicle frame 12 via the four mounting points provided by the brackets 250, 252. It is contemplated that the CVT housing 150 and/or a rear portion of the engine 30 could be secured to the vehicle frame 12 instead of the transfer case housing 140. It is also contemplated that the rear portion of the engine 30 and/or the CVT housing 150 could be connected to the vehicle frame 12 in addition to the transfer case housing 140.

Air Intake System for Engine

The air intake system 120 connected to the engine 30 will now be described with reference to FIGS. 1A to 1C, and 11A to 11D.

As can be seen in FIG. 1C, the air intake system 120 includes an engine air intake conduit 320, a throttle body 322, and an airbox (also known as plenum) 324. The engine air intake conduit 320 receives air from an engine air inlet 326 disposed on a left side of the cylinder block 104. An engine air filter 328 is disposed over the engine air inlet 326 to prevent dust and debris from entering the engine 30. The engine air intake conduit 320 extends upwardly and then rightwardly between the engine 30 and the CVT 34. On the right side of the engine 30, the engine air intake conduit 320 connects to a rear end of a cylindrical throttle body 322. A throttle valve (not shown) disposed inside the throttle body 322 regulates the flow of air through the throttle body to the cylinders 108 of the engine 30. The throttle valve is operatively connected to a throttle actuator 330 in the form of an electric motor which is configured to control a position of the throttle valve based on a position of the throttle operator 112. The throttle actuator 330 controls the position of the throttle valve based in part on the position of the throttle operator 50. The front end of the throttle body 322 is connected via a conduit 323 to an inlet in the rear end of the airbox 324. As can be seen, the airbox 324 is disposed on the right side of the cylinder block 104. An air intake port (not shown) is defined in the right side of each cylinder 108. The airbox 324 has three outlets (not shown), each of which connects to the air intake ports of a corresponding cylinder 108. When the engine 30 is operating, air flows consecutively through the engine air inlet 326, the engine air conduit 320, the throttle body 322, the conduit 324, and the airbox 324 to the cylinders 108 of the engine 30.

As can be seen, the engine air inlet 326 is facing leftwardly. In some implementations, the engine air inlet 326 is connected to an engine air duct 420 to direct air from a front of the vehicle 10 into the engine air inlet 326. The engine air duct 420 is connected to the engine air conduit 320 such that an air outlet 422 of the engine air duct 420 connects to the engine air inlet 326. From the engine air inlet 326, the engine air duct 420 extends forwardly on a left side of the engine block 102 to a forwardly facing air inlet 424. As mentioned above, in the illustrated implementation, the engine air duct 420 is formed integrally with the CVT air duct 410. It is however contemplated that the engine air duct 420 could be formed separately from the CVT air duct 410.

Exhaust System for Engine

The exhaust system 122 connected to the engine 30 will now be described with reference to FIGS. 1B and 4A.

Each cylinder 108 has an exhaust port 340 defined in the left side thereof. The exhaust system 122 includes an exhaust manifold 342 having three conduits 344. Each conduit 344 is connected to the exhaust port 340 of a corresponding cylinder and extends leftwardly and downwardly therefrom. The exhaust manifold 342 connects the exhaust ports 340 to an exhaust conduit 346 extending longitudinally and rearwardly from the exhaust manifold 342 to a muffler 350 disposed under the seat 20. In the illustrated implementation, the muffler 350 is laterally centered with respect to the longitudinal centerplane 3. The muffler 350 is aligned with the seat 20 in the lateral and longitudinal directions. Thus, there is an overlap between the seat 20 and the muffler 350 when viewed from a top or bottom. It is however contemplated that muffler 350 could not be aligned with the seat 20 in the lateral and/or longitudinal directions. It is contemplated that the muffler 350 could not be laterally centered with respect to the longitudinal centerplane 3. In the illustrated implementation of the vehicle 10, the driveshaft 38 is disposed vertically higher than the muffler 350 when the vehicle 10 is placed on level ground without any driver, passenger, and/or cargo.

The engine 30 is also connected to other systems and components which aid in the functioning of the engine 30.

As best seen in FIGS. 4C and 5D, the front end of the crankcase 102 has bolted thereto a magneto cover 372 for covering a magneto (not shown). The magneto (not shown) is connected to the front end of the crankshaft 31. As is known, the magneto produces electrical power while the engine 30 is running to power some of the engine systems (for example, the ignition and fuel injection systems) and vehicle systems (for example, lights and display gauges).

As best seen in FIGS. 5A and 5C, a starter motor 374 is disposed on a left side of the crankcase 102 and disposed below exhaust ports 340 of the cylinders 108. The exhaust manifold 342 extends downwardly on a left side of the starter motor 374. As is known, the starter motor 374 is an electrical motor operatively connected to the crankshaft 31 in order to initiate rotation of the crankshaft 31 and to thereby start operation of the engine 30.

With reference to FIG. 4C to 5D, the engine 30 has a lubrication system which includes an oil tank 360 connected to the engine 10 on the right side of the engine 30 below the airbox 324. The oil tank 360 is shaped such that it follows the contour of the cylinder block 104 and the crankcase 102. In the illustrated implementation of the engine 30, the oil tank 360 is defined by a cover bolted to the right side of the cylinder block 104. An oil filler neck 362, through which oil is poured to fill the oil tank 360, extends upwardly from the oil tank 360 in order to be easily accessible from above the engine 30. An oil cap 364 is used to selectively close the upper opening of the oil filler neck 362. A dipstick (not shown) extends from the oil cap 364 and can be used to determine the level of oil in the oil tank 360. As best seen in FIGS. 4C, 5A and 5D, an oil cooler 366 is connected to the front end of the cylinder block 104 just above the left side of the magneto cover 372. An oil filter housing 368 is also provided at the front end of the cylinder block 104 on the left side of the oil cooler 366. As the name suggests, the oil filter housing 368 houses the oil filter (not shown). The oil filter housing 368 has a removable cap provided at the top thereof to allow for easy access to the oil filter for maintenance and replacement thereof.

The oil in the lubrication system is cooled by a water cooling system including a water pump 370 located at the front end of the cylinder block 104 on a right side of the oil cooler 366.

Other details regarding the engine 30 can be found in United States Patent Application Publication No. 2009/0007878, published on Jan. 8, 2009, and European Patent Application Publication No. 2348201 A1, published on Jul. 27, 2011, the entirety of which are incorporated herein by reference.

The configuration of the vehicle 10 provides a center of gravity positioned at a low and longitudinally forward position compared to other straddle-seat vehicles. The generally vertically oriented inline configuration of the engine 30, the generally vertically oriented CVT 34, the generally vertically oriented transfer case 36, and their longitudinal arrangement allows the vehicle 10 to have a slim profile in the lateral direction. The slim lateral direction profile allows the driver to ride in a foot-forward stance. The narrow lateral direction profile and the lower center of gravity of the vehicle 10 also provide are also dynamically advantageous for three-wheeled straddle-seat vehicles.

Family of Vehicles

The above described vehicle 10 is a member of a family of vehicles.

With reference to FIGS. 6A to 9B, another member 10' of the family of vehicles will now be described.

The vehicle 10' has many features that correspond to features vehicle 10 above. Corresponding and similar features of the vehicles 10 and 10' have been labeled with the same reference numbers and will not be described again herein in detail. Features of the vehicle 10' that are different from corresponding features of the vehicle 10 described above have been labeled with the same reference number followed by an apostrophe. The vehicle 10' will only be discussed in detail with regard to the differences from the vehicle 10.

The vehicle 10 and 10' have the same vehicle frames 12, wheels 14, 16, suspension assemblies 70, 80 and steering assembly 40.

A powertrain 100' of the vehicle 10' includes an engine 30' which is similar to the engine 30 except that the engine 30' has one cylinder 108 fewer than the engine 30. The engine 30' is an inline two cylinder engine 30', including a front cylinder 108 and a rear cylinder 108, instead of the inline three cylinder engine 30 of the vehicle 10. The engine 30' is mounted to the vehicle frame 12 such that the rear cylinder 108 of the engine 30' is in the same location as the rearmost cylinder 108 of the engine 30 in the vehicle 10, and the front cylinder 108 of the engine 30' is in the same location as the middle cylinder 108 in the vehicle 10. In the illustrated implementation, the cylinder axis 110 of the rear cylinder 108 of the engine 30' is in the same longitudinal position as the cylinder axis 110 of the rearmost cylinder 108 of the engine 30 in the vehicle 10, and the cylinder axis 110 of the front cylinder 108 of the engine 30' is in the same longitudinal position as the middle cylinder 108 in the vehicle 10. A forward portion of the front cylinder 108 of the engine 30' extends forward of the front wheel plane 18 as can be seen best in FIG. 7B.

It is contemplated that the engine 30' could be mounted to the vehicle frame 12 such that the front cylinder 108 of the engine 30' is in the same location as the front cylinder 108 of the engine 30 in the vehicle 10, and the rear cylinder 108 of the engine 30' is in the same location as the middle cylinder 108 in the vehicle 10. In the illustrated implementation, the cylinder axis 110 of the front cylinder 108 of the engine 30' is in the same longitudinal position as the cylinder axis 110 of the front cylinder 108 of the engine 30 in the vehicle 10, and the cylinder axis 110 of the rear cylinder 108 of the engine 30' is in the same longitudinal position as the middle cylinder 108 in the vehicle 10.

It is also contemplated that the engine 30' could have one cylinder 108 instead of two cylinders 108 as shown herein.

The vehicle 10' has a transfer case 36' that is different from the transfer case 36 of the vehicle 10. The transfer case housing 140 is the same in the respective transfer cases, 36 and 36', in both of the vehicles 10 and 10'. The transfer case housing 140 is mounted to the vehicle frame 12 in the same manner in both vehicles 10 and 10'. In the vehicle 10' however, the gear ratio defined by the input sprocket (not shown) and the output sprocket (not shown) of the transfer case 36' is different than the gear ratio defined by the input sprocket 170 and output sprocket 172 of the transfer case 36 in the vehicle 10. Thus, one or both of the input and output sprockets of the transfer case 36' could be different from the corresponding sprocket 170, 172 in the transfer case 36.

In the illustrated implementation of the vehicle 10', the exhaust manifold 342' is different from the exhaust manifold 342 connected to the engine 30. The exhaust manifold 342' has two conduits 344 corresponding to the two cylinders 108 of the engine 30'.

Similarly, the fuel rail (not shown) of the vehicle 10' is configured for connecting to two cylinders 108 rather than three cylinders 108 and is thus different from the fuel rail 216 of the vehicle 10.

In the illustrated implementation of the vehicle 10', the airbox 324 is identical to the airbox 324 of the engine 30 in the vehicle 10. In the vehicle 10' however, the forwardmost outlets of the airbox 324 is plugged while in the vehicle 10, the forwardmost outlet of the airbox 324 is connected to the third cylinder 108 of the engine 30. Using the same airbox 324 for both engines 30, 30' allows for a reduction in the number of different types of parts that need to be manufactured and stocked for the assembly of the vehicle 10, 10', thereby ultimately leading to an increase in efficiency and cost savings of assembly and/or manufacture. It is however contemplated that a different airbox could be used in the vehicle 10' than in the vehicle 10. The vehicle 10' could have an airbox having two outlets corresponding to the two cylinders of the engine 30' instead of the airbox 324 with three outlets used for the three-cylinder engine 30 of the vehicle 10.

Since the engine 30' is smaller than the engine 30, the oil tank 360 which is formed integrally with the engine 30' is smaller than the oil tank 360 formed integrally with the engine 30. The starter motor 374' of the vehicle 10' is also less powerful than the starter motor 374 in the vehicle 10. In the illustrated implementation of the vehicle 10 and 10', some of the components connected to the engine 30' are however identical to the corresponding components connected to the engine 30. For example, the magneto, the water pump 370, the oil cooler 366, and oil filter housing 368 are identical in the vehicles 10 and 10'. It is also contemplated that any of the magneto, the water pump 370, the oil cooler 366, and oil filter housing 368 used in the vehicle 10' could be different from the corresponding component used in the vehicle 10.

Components connected to the front of the engine 30' such as the magneto, the water pump 370, the oil cooler 366, and oil filter housing 368 are disposed in the same relative location with respect to the front cylinder 108 of the engine 30' as with the respect to forwardmost cylinder 108 of the engine 30. The respective locations of these components with respect to the vehicle frame 12 is thus different in the vehicle 10' compared to the vehicle 10. Relative to the vehicle frame 12, the position of each of these components, has been displaced longitudinally rearwardly in the vehicle 10' compared with their corresponding position in the vehicle 10' as can be seen in FIGS. 6A to 8B.

Figure 7A:
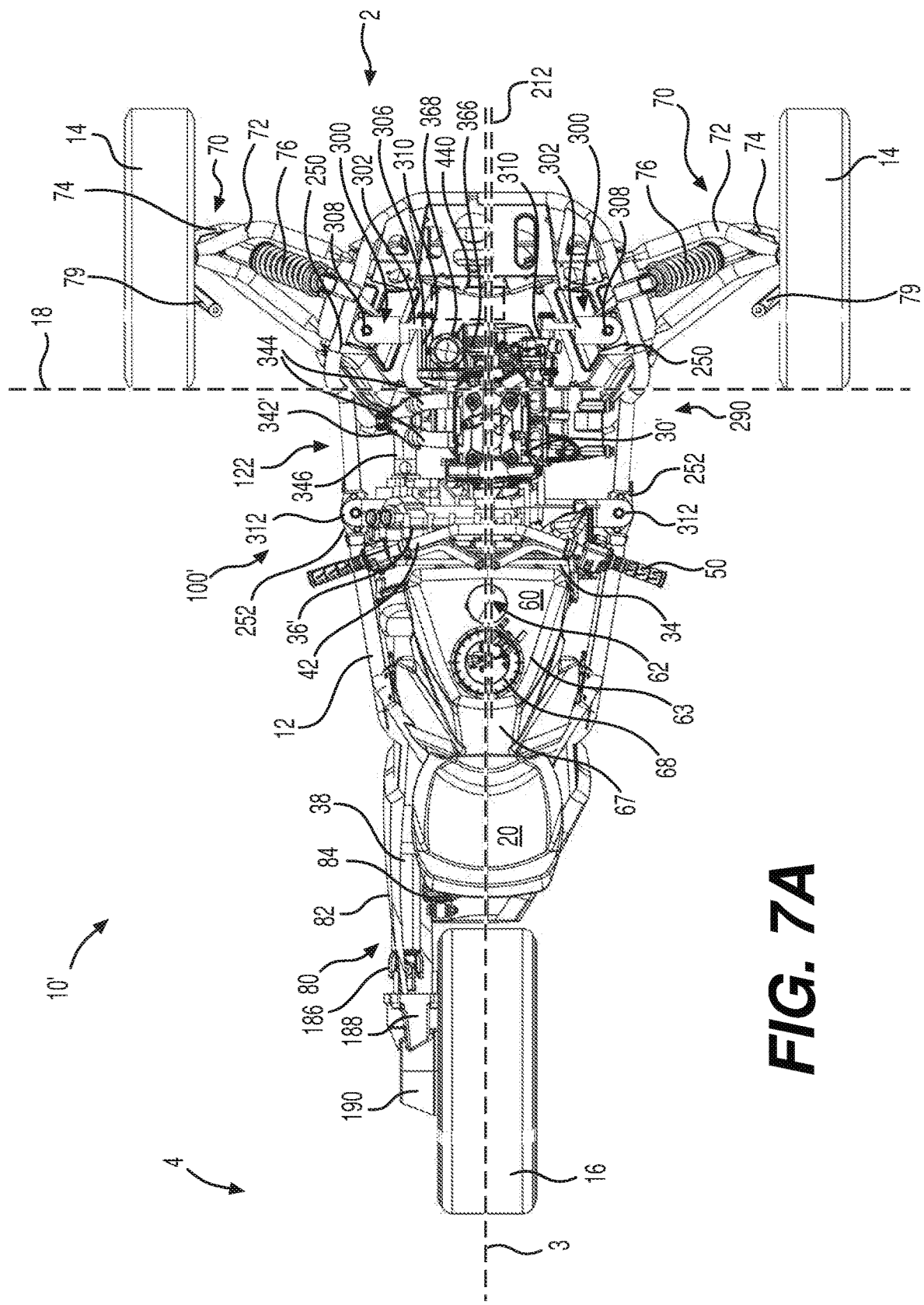
FIG. 7A is a top plan view of the vehicle of FIG. 6A with a portion of the steering assembly being removed for clarity.
Figure 7B:
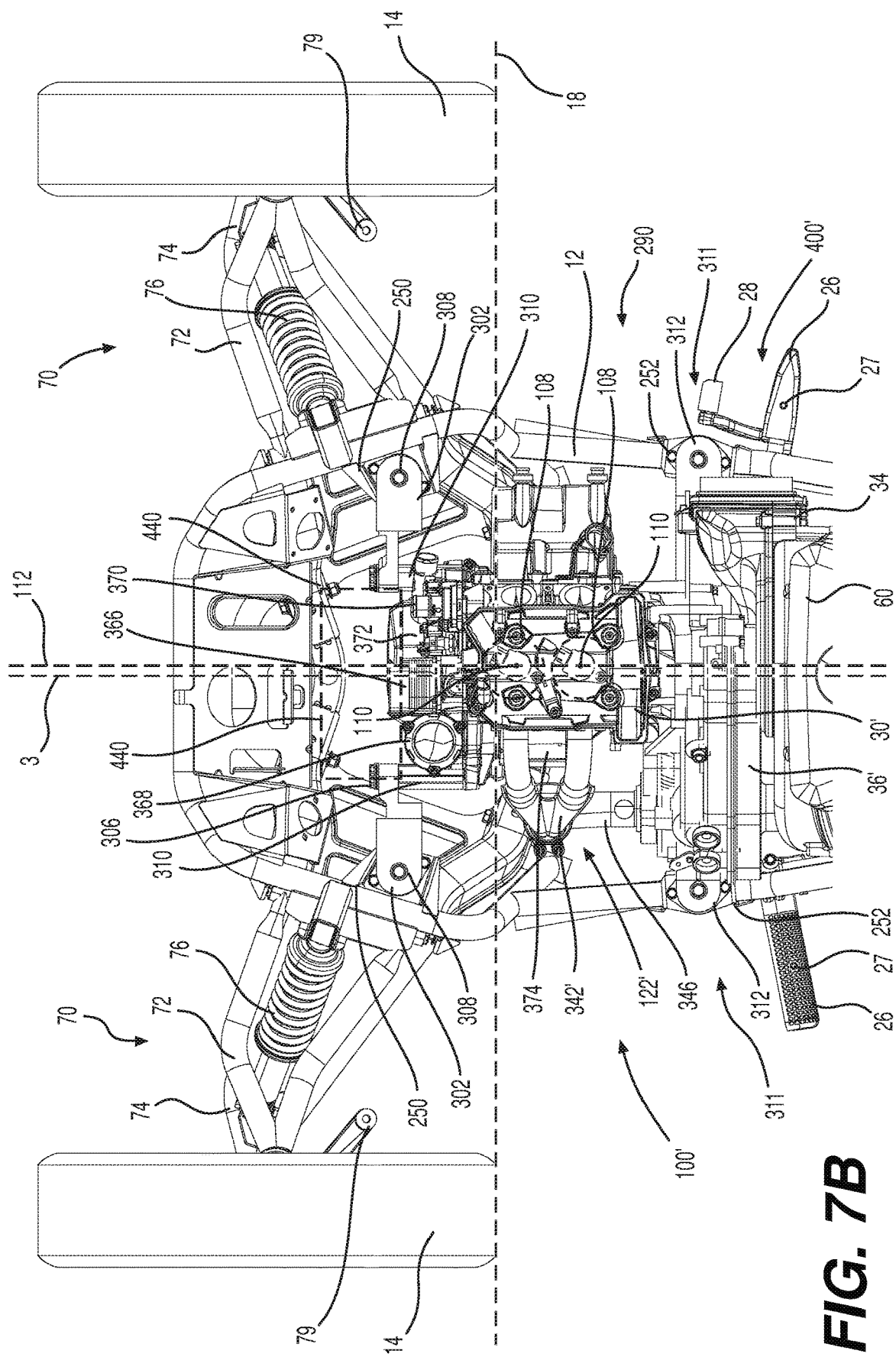
FIG. 7B is a close-up top plan view of the front portion of the vehicle of FIG. 7A.
Figure 8A:
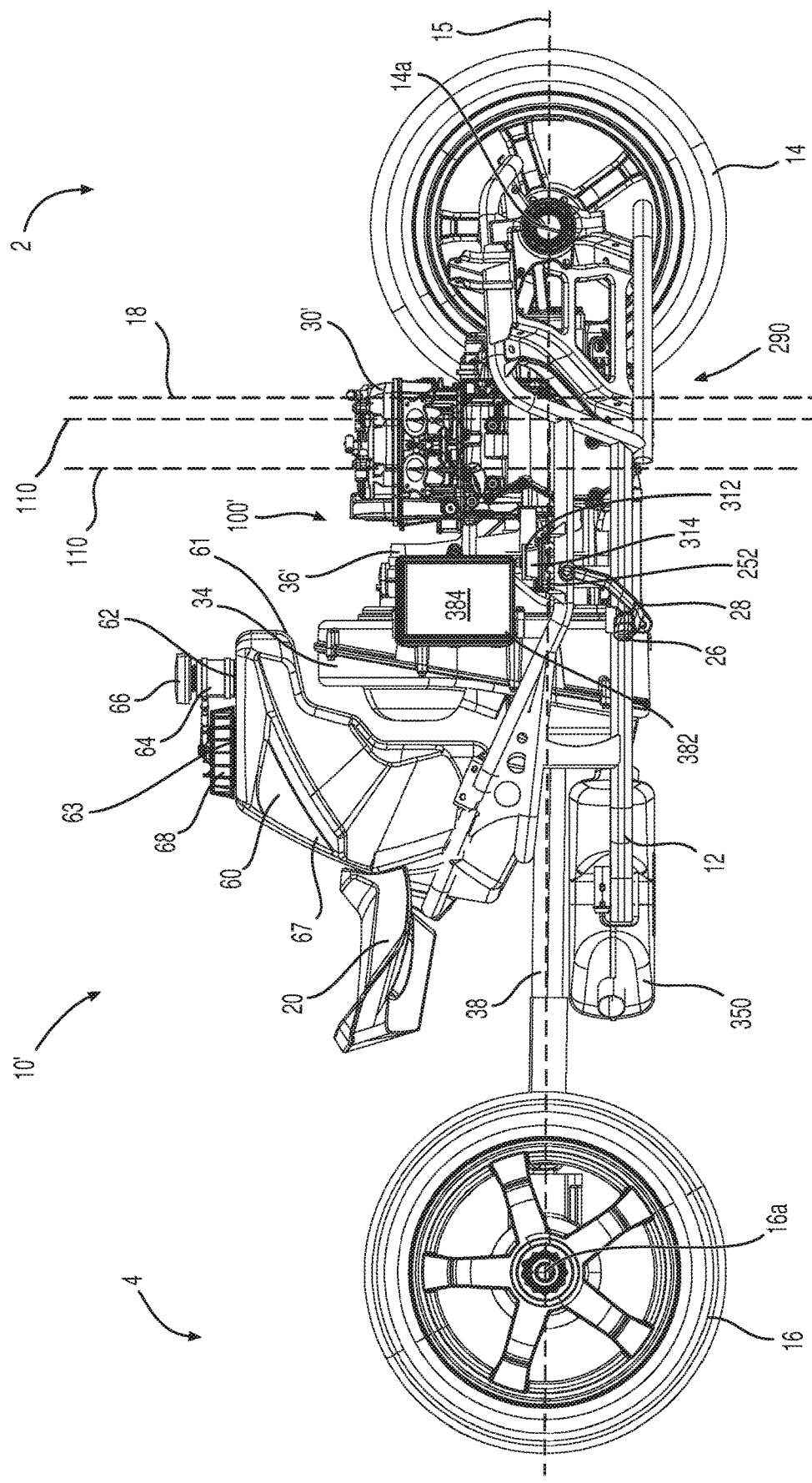
FIG. 8A is right side elevation view of the vehicle of FIG. 6A with the right front wheel, steering assembly and the front left and right suspension assemblies being removed for clarity.
Figure 8B:
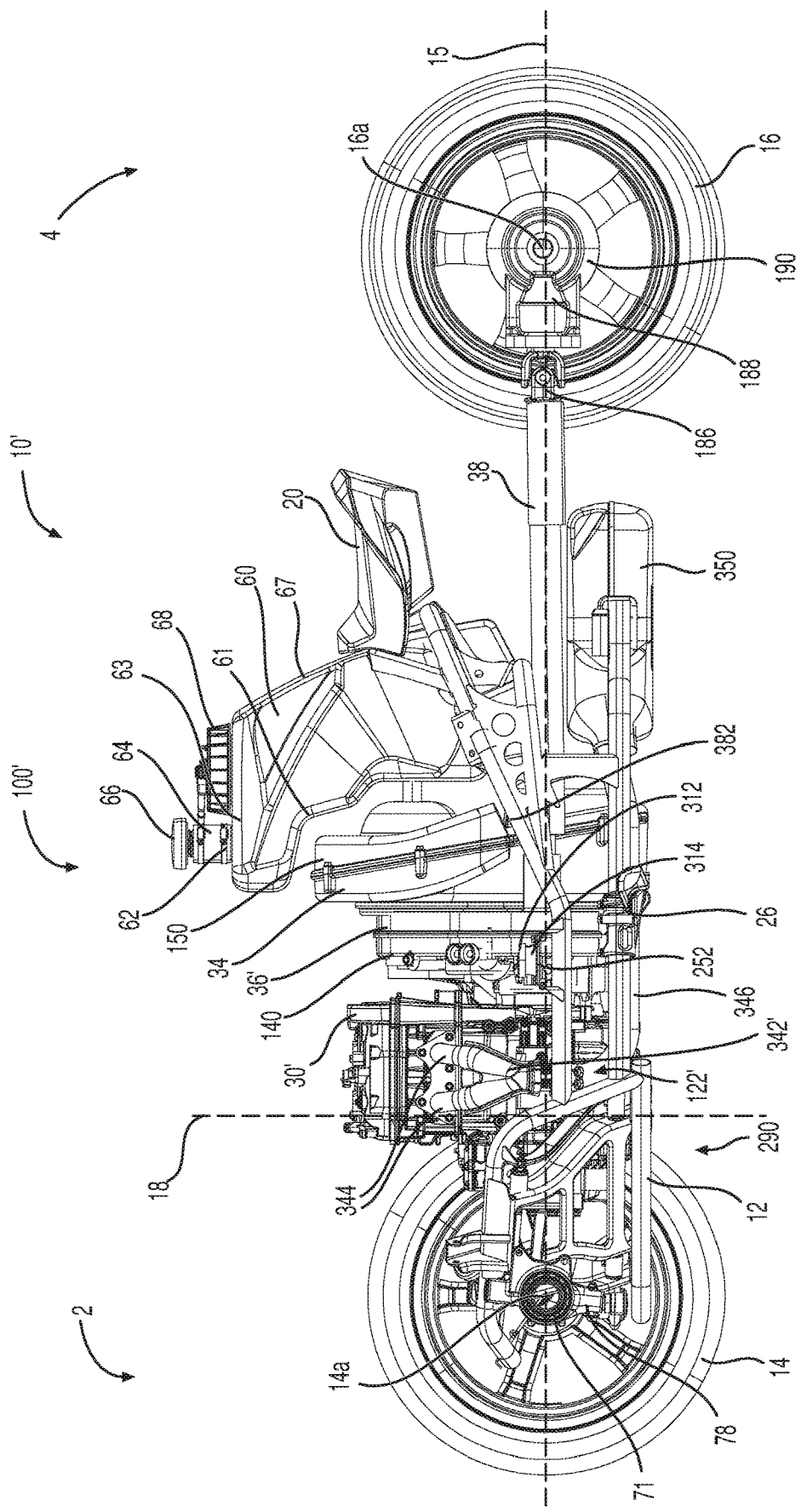
FIG. 8B is left side elevation view of the vehicle of FIG. 6A with the left front wheel, steering assembly and the front left and right suspension assemblies being removed for clarity.
Figure 9A:
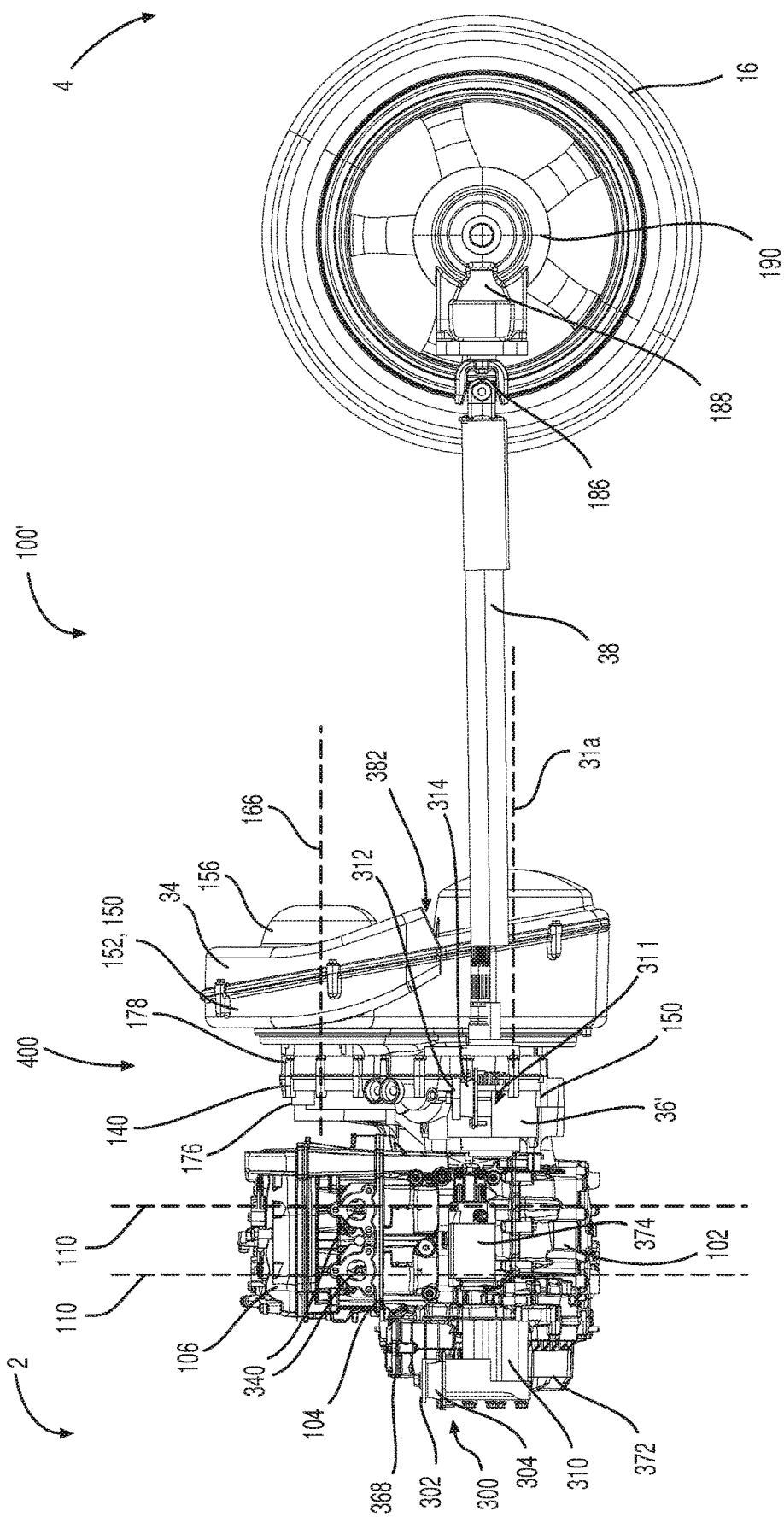
FIG. 9A is a left side elevation view of the powertrain, engine mounting assemblies, and rear wheel of the vehicle of FIG. 6A.
Figure 9B:
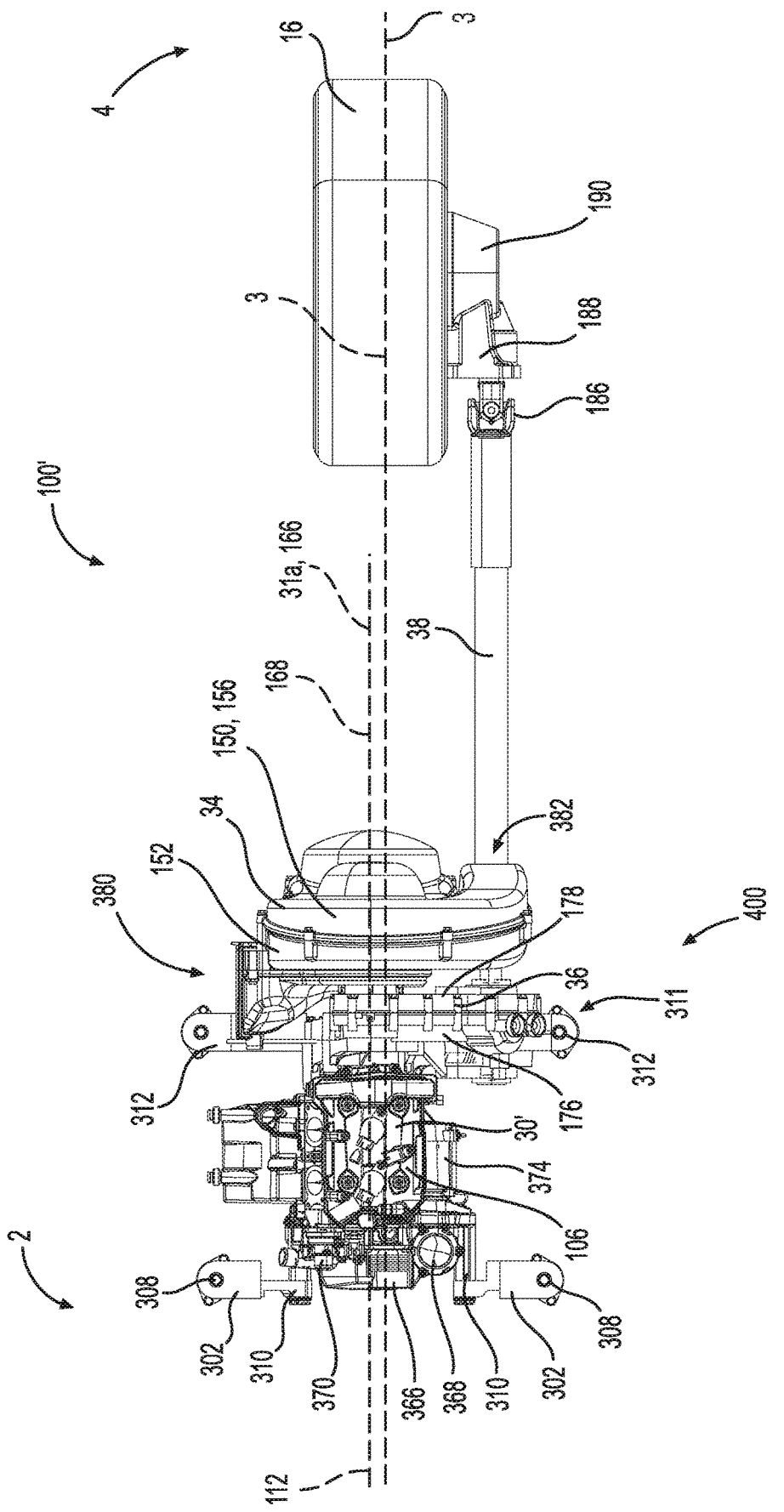
FIG. 9B is a top plan view of the powertrain, engine mounting assemblies, and rear wheel of FIG. 9A.

Since, in the illustrated implementation, the front of the engine 30' is disposed longitudinally rearwardly with respect to the engine mounting brackets 250, the engine 30' is mounted to the engine mounting brackets 250 using spacers 310 in addition to the brackets 302 of the mounting assembly 300 as can be seen best in FIG. 7B. A right spacer 310 has throughholes (not shown) corresponding to the right boltholes (not shown for the engine 30' but identical to the right boltholes 130 of the engine 30) of the engine 30' and the vertical flange of the bracket 302 of the right mounting assembly 300. As can be seen in FIG. 7B, engine bolts 306 are inserted through the vertical flange of the bracket 302, and through the right spacer 310 into the right boltholes disposed in the front of the engine 30' to connect the engine 30' to the vehicle frame 12.

Since the engine cradle 290 is dimensioned to house the larger engine 30, the engine cradle 290 (FIGS. 7A and 7B) has a space 440 in front of the engine 30' when the engine 30' is mounted in the engine cradle 290.

A left spacer 310, similar to the right spacer 310, has throughholes corresponding to the left boltholes (not shown for the engine 30' but identical to the left boltholes 130 of the engine 30) of the engine 30' and the vertical flange of the bracket 302 of the left mounting assembly 300. The left spacer 310 is used to connect the left side of the front of the engine 30' to the vehicle frame similarly as the right spacer 310 described above.

It is contemplated that the front of the engine 30' could be disposed in the same longitudinal position with respect to the engine mounting brackets 250 as the front of the engine 30'. In this case, it is contemplated that a spacer could be used to mount the transfer case housing 140 to each bracket 252. It is also contemplated that the CVT housing 150 and/or a rear portion of the engine 30' could be secured to the vehicle frame 12 instead of, or in addition to, the transfer case housing 140.

It is contemplated that the family of vehicles could have more than two members. All of the members of the family of vehicles are assembled using the same vehicle frame 12. In general, at least one member of the family of vehicles is assembled using a corresponding engine that is different from the engine used to assemble at least one other member of the family of vehicles. Thus the family of vehicles includes at least a first member (vehicle 10) with a first engine 30 and a second member (vehicle 10') with a second engine 30'. The engines 30, 30' of the first and second member have a different number of cylinders 108, but each engine 30, 30' is arranged in the corresponding vehicle 10, 10' in an inline configuration with the cylinder plane 112 extending generally vertically and longitudinally.

In general, individual components of the powertrain 100, 100' of each vehicle 10, 10' of the family of vehicles could be different from the corresponding components of the powertrain 100, 100' of another member 10, 10' of the family of vehicles. However, in each member 10, 10' of the family of vehicles, the components of the powertrain 100, 100' are arranged in the same configuration relative to other components of the powertrain 100, 100'. Thus, in each member 10, 10' of the family of vehicles, the engine 30, 30' is disposed longitudinally forward of the seat 20 and the transmission assembly 400 is disposed longitudinally rearward of the engine 30, 30' and longitudinally forward of the seat 20.

The manufacture and assembly of a family of vehicles including a plurality of members 10, 10' is made more efficient by using components that are common to more than one member 10, 10' of the family of vehicles. As will be understood, the use of common components also leads to a reduction in the numbers of parts that need to be manufactured which could result in a reduction in manufacturing costs.

Modifications and improvements to the above-described implementations of the present vehicle may become apparent to those skilled in the art. The foregoing description is intended to be exemplary rather than limiting. The scope of the present technology is therefore intended to be limited solely by the scope of the appended claims.

What is claimed is:

1. A method for assembling a vehicle of a family of vehicles including at least a first vehicle and a second vehicle, the method comprising:

providing a vehicle frame defining an engine cradle;
providing a left front wheel, a right front wheel, and a rear wheel;
providing a group of engines including at least a first engine and a second engine, the first engine corresponding to the first vehicle and the second engine corresponding to the second vehicle,
  the first engine including a first number of cylinders,
  the second engine including a second number of cylinders,
  the second number being greater than the first number, and
  the first number being at least one;
providing a transmission assembly;
providing a straddle seat;
providing a left footrest and a right footrest; and
forming the vehicle of the family of vehicles by:
  mounting each of the left front wheel, the right front wheel, and the rear wheel to the vehicle frame;
  selecting, from the group of engines, an engine corresponding to the vehicle, the engine being a selected engine;
  mounting the selected engine to the engine cradle such that:
    a crankshaft rotation axis of a crankshaft of the selected engine extends generally longitudinally,
    a cylinder plane extends generally vertically and longitudinally, the cylinder plane being defined by a respective cylinder axis of each cylinder of the selected engine and one of: a line disposed parallel to the crankshaft rotation axis and the crankshaft rotation axis, and
    at least one cylinder of the selected engine is disposed at least in part forward of a front wheel plane, the front wheel plane extending laterally, vertically and tangentially to a rear edge of the left and right front wheels when the left and right front wheels are mounted to the frame and disposed in a steered straight ahead configuration;
  mounting the transmission assembly to the vehicle frame so as to be disposed rearward of the selected engine when the selected engine is mounted to the vehicle frame, one of the transmission assembly and a front of the engine being disposed in a same location with respect to the vehicle frame when the selected engine is the first engine and when the selected engine is the second engine;
  operatively connecting the transmission assembly to the crankshaft;
  operatively connecting the rear wheel to the transmission assembly;
  mounting the straddle seat to the vehicle frame such that the straddle seat is disposed at least in part longitudinally rearward of the transmission assembly when the transmission assembly is mounted to the vehicle frame; and
  mounting the left footrest and the right footrest to the vehicle frame such that the selected engine is laterally disposed between a center of the left footrest and a center of the right footrest in the lateral direction when the selected engine is mounted to the vehicle frame.

2. The method of claim 1, further comprising:
providing an engine output shaft; and
operatively connecting the engine output shaft to the crankshaft of the selected engine such that the engine output shaft extends generally rearwardly from the engine,
wherein operatively connecting the transmission assembly to the crankshaft comprises operatively connecting the transmission assembly to the engine output shaft.

3. The method of claim 1, wherein:
the front of the selected engine extends further longitudinally forwardly with respect to the vehicle frame when the selected engine is the second engine than when the selected engine is the first engine; and
the transmission assembly is disposed in the same location with respect to the vehicle frame when the selected engine is the first engine and when the selected engine is the second engine.

4. The method of claim 3, wherein:
the vehicle frame includes an engine mounting bracket; and
mounting the selected engine to the engine cradle comprises:
  when the selected engine is the first engine, disposing the first engine in the engine cradle with a front portion of the first engine being spaced from the engine mounting bracket and connecting the first engine to the engine mounting bracket via a spacer; and
  when the selected engine is the second engine, disposing the second engine adjacent the engine mounting bracket and connecting the second engine to the engine mounting bracket without the spacer,
  the engine mounting bracket being disposed in the same location in the engine cradle when the selected engine is the first engine and when the selected engine is the second engine.

5. The method of claim 4, wherein the vehicle frame further comprises a rear mounting bracket,
the method further comprising:
  mounting one of the engine and the transmission assembly to the rear mounting bracket.

6. The method of claim 1, wherein:
a cylinder axis of a rearwardmost cylinder of the selected engine is in a same longitudinal position when the selected engine is the first engine and when the selected engine is the second engine.

7. The method of claim 1, wherein:
the vehicle frame includes a front engine mounting bracket, a rear mounting bracket and a spacer;
when the transmission assembly is disposed in the same location with respect to the vehicle frame when the selected engine is the first engine and when the selected engine is the second engine, mounting the selected engine to the engine cradle comprises:
  when the selected engine is the first engine, disposing the first engine in the engine cradle with a front portion of the first engine being spaced from the front engine mounting bracket and connecting the first engine to the front engine mounting bracket via the spacer;
  when the selected engine is the second engine, disposing the second engine adjacent the front engine mounting bracket and connecting the second engine to the front engine mounting bracket without the spacer; and
  mounting one of the selected engine and the transmission assembly to the rear mounting bracket; and when the front of the engine is disposed in the same location with respect to the vehicle frame when the selected engine is the first engine and when the selected engine is the second engine, mounting the selected engine to the engine cradle comprises:
disposing the selected engine adjacent the front engine mounting bracket and connecting the selected engine to the front engine mounting bracket without the spacer;
when the selected engine is the first engine, mounting one of the first engine and the transmission assembly to the rear mounting bracket via the spacer; and
when the selected engine is the second engine, mounting one of the second engine and the transmission assembly to the rear mounting bracket without the spacer.

8. The method of claim 1, wherein:
the transmission assembly comprises a continuously variable transmission (CVT) including a primary pulley having a primary pulley rotation axis, a secondary pulley including a secondary pulley rotation axis and a belt configured to be wrapped around the primary pulley and the secondary pulley for rotating the secondary pulley; and
mounting the transmission assembly to the vehicle frame comprises mounting the CVT to the vehicle frame such that each of the primary pulley rotation axis and the secondary pulley rotation axis extends generally longitudinally and horizontally in a CVT plane extending generally longitudinally and vertically, the primary pulley rotation axis being disposed vertically lower than the secondary pulley rotation axis.

9. The method of claim 1, further comprising:
providing a fuel tank;
mounting the fuel tank to the vehicle frame such that at least a portion of the fuel tank is disposed between the transmission assembly and the straddle seat when the transmission assembly and the straddle seat are each mounted to the vehicle frame.

10. The method of claim 1, further comprising:
providing a steering assembly including a steering column and a handlebar connected thereto;
mounting the steering assembly to the vehicle frame such that the selected engine is disposed longitudinally forward of the handlebar when the selected engine is mounted to the vehicle frame; and
operatively connecting the steering column to the left and right front wheels for steering the vehicle.

11. The method of claim 1, further comprising:
providing a radiator; and
mounting the radiator to the vehicle frame such that the radiator is disposed in front of the selected engine when the selected engine is mounted to the vehicle frame.

12. The method of claim 11, further comprising:
providing an engine mounting bracket; and
mounting the engine mounting bracket to the vehicle frame in the engine cradle,
wherein:
mounting the selected engine to the vehicle frame comprises mounting the selected engine to the engine mounting bracket; and
mounting the radiator comprises mounting the radiator to the vehicle frame such that the radiator is disposed longitudinally forward of the engine mounting bracket.

13. The method of claim 1, further comprising:
providing an exhaust system including a muffler, comprising:
providing a group of exhaust manifolds including at least a first exhaust manifold and a second exhaust manifold,
the first exhaust manifold having the first number of inlets, each inlet of the first exhaust manifold being configured to fluidly connect to a corresponding one of the first number of cylinders of the first engine,
the second exhaust manifold having the second number of inlets, each inlet of the second exhaust manifold being configured to fluidly connect to a corresponding one of the second number of cylinders of the second engine;
selecting an exhaust manifold of the group of exhaust manifolds corresponding to the selected engine, the exhaust manifold being a selected exhaust manifold; and
fluidly connecting each inlet of the selected exhaust manifold to a corresponding cylinder of the selected engine.

14. The method of claim 1, wherein the second number is greater than the first number by one.

15. A system for assembling a vehicle of a family of vehicles including at least a first vehicle and a second vehicle, the system comprising:
a vehicle frame defining an engine cradle;
a left front wheel, a right front wheel, and a rear wheel;
a group of engines including at least a first engine and a second engine, the first engine corresponding to the first vehicle and the second engine corresponding to the second vehicle;
the first engine including a first number of cylinders,
the second engine including a second number of cylinders,
the second number being greater than the first number, and
the first number being at least one;
a transmission assembly;
a straddle seat;
a left footrest;
and a right footrest,
wherein when the first vehicle is assembled using the first engine:
the left front wheel is mounted to the vehicle frame;
the right front wheel is mounted to the vehicle frame;
the rear wheel is mounted to the vehicle frame;
the first engine is disposed in the engine cradle;
a first engine crankshaft of the first engine is disposed such that a first engine crankshaft rotation axis of the first engine extends longitudinally,
a first engine cylinder plane extends generally vertically and longitudinally, the first engine cylinder plane being defined by a respective cylinder axis of each cylinder of the first engine and one of: the first engine crankshaft rotation axis and a line disposed parallel to the first engine crankshaft rotation axis,
at least a portion of at least one cylinder of the first engine is disposed forward of a first engine front wheel plane, the first engine front wheel plane extending laterally, vertically and tangentially to a rear edge of the left front wheel and the right front wheel when the first vehicle is steered straight ahead;
a transmission assembly is mounted to the vehicle frame so as to be disposed rearward of the first engine, the transmission assembly being operatively connected to the first engine crankshaft;

the rear wheel is operatively connected to the transmission assembly;

the straddle seat is mounted to the vehicle frame so as to be disposed at least in part longitudinally rearward of the transmission assembly;

the left and right footrests are mounted to the vehicle frame; and the first engine is disposed between a center of the left footrest and a center of the right footrest in the lateral direction, and wherein when the second vehicle is assembled using the second engine:

the left front wheel is mounted to the vehicle frame;
the right front wheel is mounted to the vehicle frame;
the rear wheel is mounted to the vehicle frame;
the second engine is disposed in the engine cradle;
a second engine crankshaft of the second engine disposed such that a second engine crankshaft rotation axis of the second engine extends longitudinally;

a second engine cylinder plane extends generally vertically and longitudinally, the second engine cylinder plane being defined by a respective cylinder axis of each cylinder of the second engine and one of: a line parallel to the second engine crankshaft rotation axis and the second engine crankshaft rotation axis;

at least a portion of at least one cylinder of the second engine is disposed forward of a second engine front wheel plane, the second engine front wheel plane extending laterally, vertically and tangentially to a rear edge of the left front wheel and the right front wheel when the second vehicle is steered straight ahead;

a transmission assembly is mounted to the vehicle frame so as to be disposed rearward of the second engine, the transmission assembly being operatively connected to the second engine crankshaft rotation axis;

the rear wheel is operatively connected to the transmission assembly;

the straddle seat is mounted to the vehicle frame so as to be disposed at least in part longitudinally rearward of the transmission assembly;

the left and right footrests are mounted to the vehicle frame; and the second engine is disposed between a center of the left footrest and a center of the right footrest in the lateral direction, one of the transmission assembly and the front of the engine being disposed in a same location with respect to the vehicle frame in the first vehicle and in the second vehicle.

16. The system of claim 15, wherein:
a front of the second engine extends further forward in the second vehicle with respect to the vehicle frame than the first engine in the first vehicle; and
the transmission assembly is disposed in the same location with respect to the vehicle frame in the first vehicle and in the second vehicle.

17. The system of claim 15, wherein the second number is greater than the first number by one.

18. A vehicle of a family of vehicles including at least a first vehicle and a second vehicle, the vehicle comprising:
a vehicle frame defining an engine cradle;
a left front wheel, a right front wheel, and a rear wheel;
an engine selected from a group of engines including at least a first engine and a second engine, the first engine corresponding to the first vehicle and the second engine corresponding to the second vehicle of the family of vehicles,
the first engine including a first number of cylinders,
the second engine including a second number of cylinders,
the second number being greater than the first number,
the first number being at least one,
the selected engine being disposed in the engine cradle such that:
a crankshaft rotation axis of a crankshaft of the selected engine extends generally longitudinally;
a cylinder plane extends generally longitudinally and vertically, the cylinder plane being defined by a respective cylinder axis of each cylinder of the selected engine and one of: a line disposed parallel to the crankshaft rotation axis and the crankshaft rotation axis;
at least one cylinder of the selected engine is disposed at least in part forward of a front wheel plane, the front wheel plane extending laterally, vertically and tangentially to a rear edge of the left and right front wheels when the vehicle is steered straight ahead;
a transmission assembly disposed rearward of the selected engine and operatively connected to the crankshaft, the rear wheel being operatively connected to the transmission assembly, one of the transmission assembly and a front of the selected engine being disposed in a same location with respect to the vehicle frame when the selected engine is the first engine and when the selected engine is the second engine;
a straddle seat disposed at least in part rearward of the transmission assembly; and
a left footrest and a right footrest mounted to the vehicle, the selected engine being disposed laterally between a center of the left footrest and a center of the right footrest.

19. The vehicle of claim 18, wherein:
a front of the selected engine extends further longitudinally forwardly with respect to the vehicle frame when the selected engine is the second engine than when the selected engine is the first engine; and
the transmission assembly is disposed in the same location with respect to the vehicle frame when the selected engine is the first engine and when the selected engine is the second engine.

20. The vehicle of claim 18, wherein the second number is greater than the first number by one.

* * * * *